United States Patent [19]

Sagisawa et al.

[11] Patent Number: 4,695,963
[45] Date of Patent: Sep. 22, 1987

[54] PRESSURE SENSE RECOGNITION CONTROL SYSTEM

[75] Inventors: Shinobu Sagisawa, Yokohama; Teizo Takahama, Yokosuka; Mitsuo Kobayashi, Fujisawa, all of Japan

[73] Assignee: Fuji Electric Corporate Research and Developement Ltd., Yokosuka, Japan

[21] Appl. No.: 721,804

[22] Filed: Apr. 10, 1985

[30] Foreign Application Priority Data

Apr. 13, 1984 [JP] Japan .................................. 59-75250

[51] Int. Cl.$^4$ ...................... G05B 19/42; G01L 1/16; G01L 5/16
[52] U.S. Cl. .................................. 364/513; 364/558; 901/33; 901/34; 901/35; 901/46; 414/5; 414/730; 73/862.04; 73/862.05; 73/777
[58] Field of Search ................... 364/513, 558; 901/32, 901/33, 34, 35, 9, 46; 414/4, 5, 730; 73/862.04, 862.05, 862.06, 777

[56] References Cited

U.S. PATENT DOCUMENTS

| | | | |
|---|---|---|---|
| 3,270,554 | 9/1966 | Pfann | 73/77 |
| 3,509,583 | 5/1970 | Fraioli | 901/33 |
| 3,662,234 | 5/1972 | Ishii | 73/777 |
| 3,948,093 | 4/1976 | Folchi et al. | 73/862.03 |
| 3,952,880 | 4/1976 | Hill et al. | 414/5 |
| 4,132,318 | 1/1979 | Wang et al. | 73/862.04 |
| 4,414,984 | 11/1983 | Zarudiansky | 414/5 |
| 4,471,369 | 9/1984 | Anthony et al. | 73/862.04 |
| 4,478,089 | 10/1984 | Aviles et al. | 901/46 |
| 4,483,203 | 11/1984 | Capper | 73/862.04 |
| 4,488,441 | 12/1984 | Ramming | 73/862.04 |
| 4,521,685 | 6/1985 | Rebman | 901/33 |
| 4,526,043 | 7/1985 | Boie et al. | 901/46 |
| 4,555,953 | 12/1985 | Dario et al. | 901/33 |
| 4,577,513 | 3/1986 | Harwood et al. | 901/46 |
| 4,588,348 | 5/1986 | Beni et al. | 901/46 |

Primary Examiner—Jerry Smith
Assistant Examiner—John R. Lastova
Attorney, Agent, or Firm—Spencer & Frank

[57] ABSTRACT

A pressure sense recognition control system having at least one pressure sensor module for detecting the two-dimensional distribution of the component forces in the three directions in the rectangular coordinate system of a force applied to the pressure receiving surface of the pressure sensor modules. The pressure sensor module has at least one pressure sensor cell having a pressure sensing member made of single crystal silicon, and a plurality of diffusion type strain gauges provided on the surfaces of the pressure sensing member which are substantially perpendicular to the pressure receiving surface and for detecting the three component forces applied to the pressure surfaces in response to the changes of an output of a bridge composed of the strain gauges. These members are mounted on an object, the drive of which is to be controlled. The detection signals derived from the pressure sensor module are processed and converted into pressure sense detection data corresponding to the pressure surfaces for each of the component forces. The data is further processed to produce pressure sense recognition data. Data for controlling the drive of the object is obtained from the pressure sense recognition data.

38 Claims, 136 Drawing Figures

FIG. 6A Prior Art
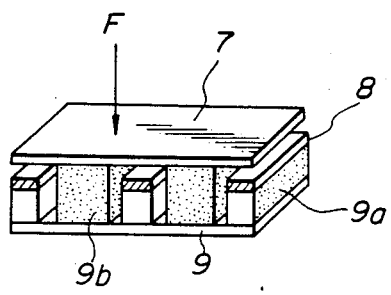
FIG. 6B Prior Art
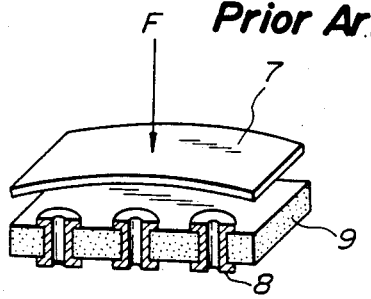
FIG. 6C Prior Art
FIG. 6D Prior Art
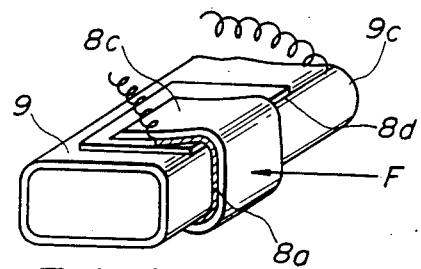
FIG. 7 Prior Art
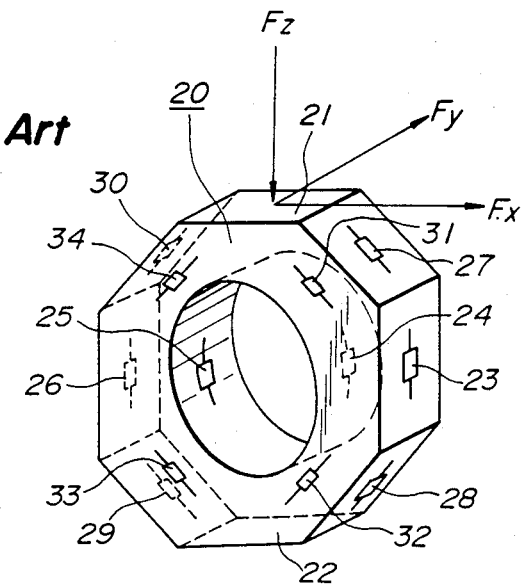

FIG.15A  FIG.15B  FIG.15C
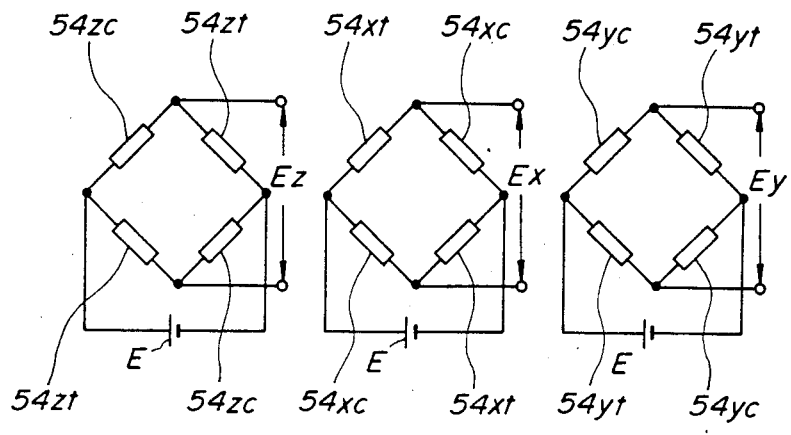
FIG.16
|    | 54xt | 54xc | 54yt | 54yc | 54zt | 54zc |
|----|------|------|------|------|------|------|
| Fx | + + − − | + − + − | 0 0 | 0 0 | 0 0 | 0 0 |
| Fy | 0 0 0 0 | | + + − − | | 0 0 | 0 0 |
| Fz | 0 0 0 0 | | 0 0 0 0 | | − − | + + |
FIG.17
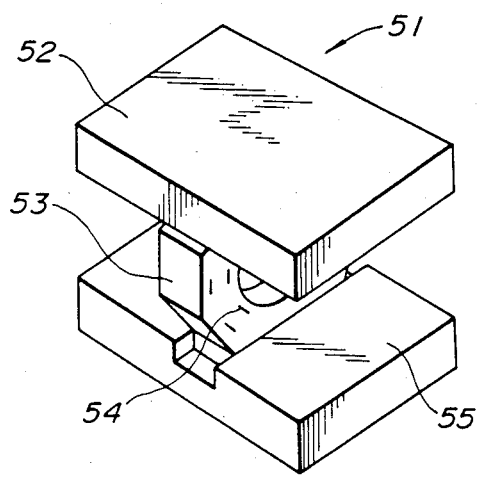

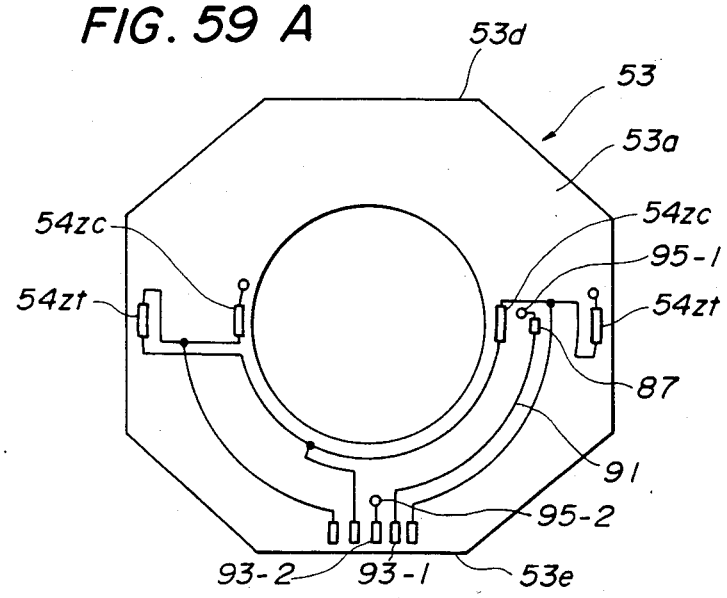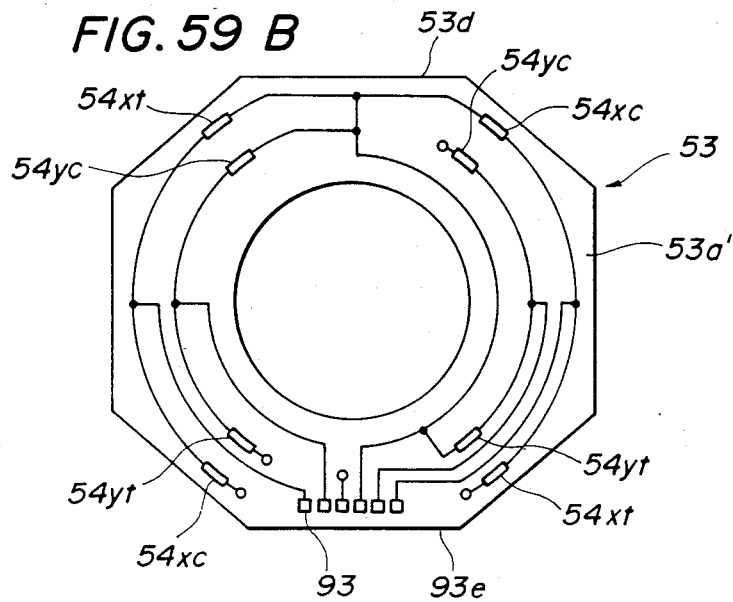

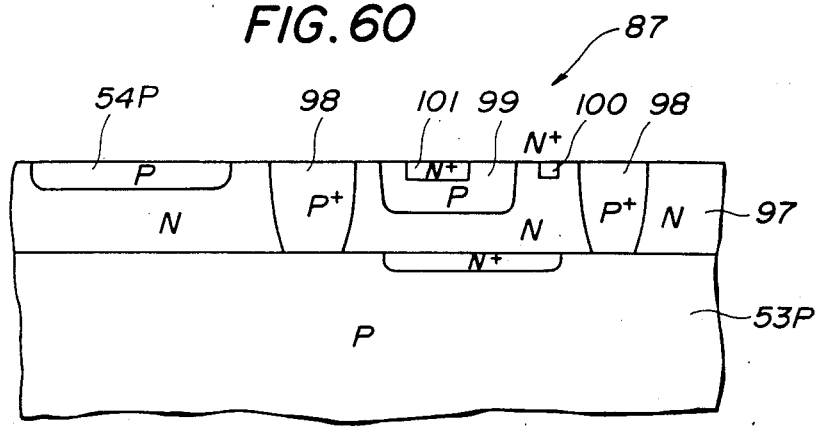
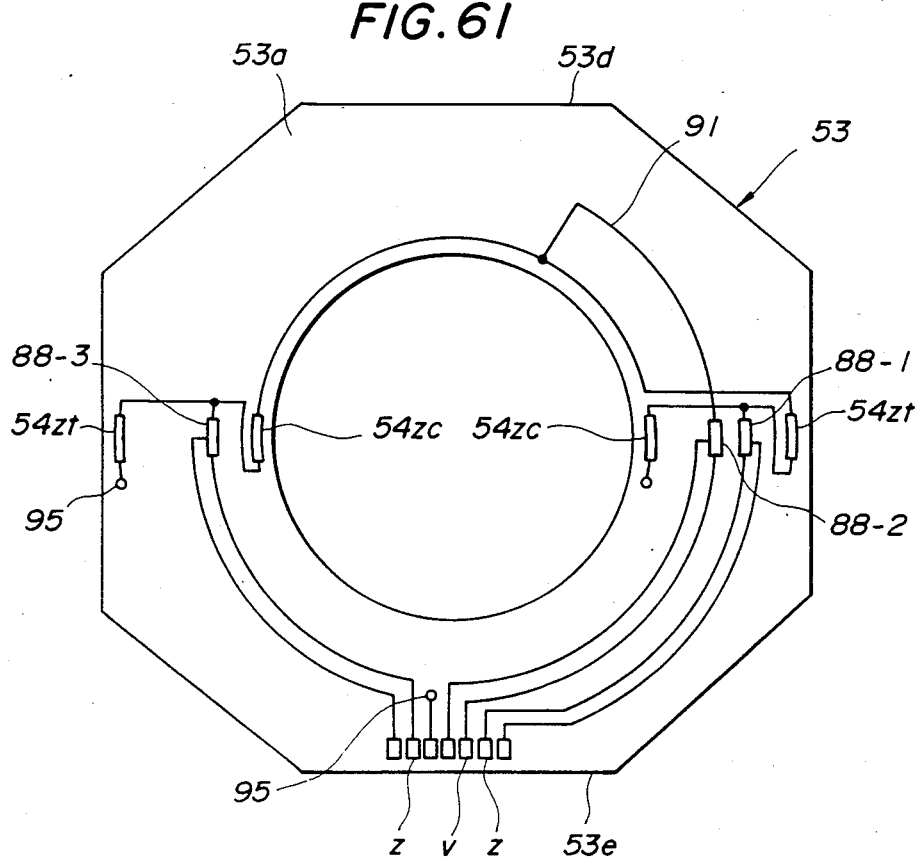

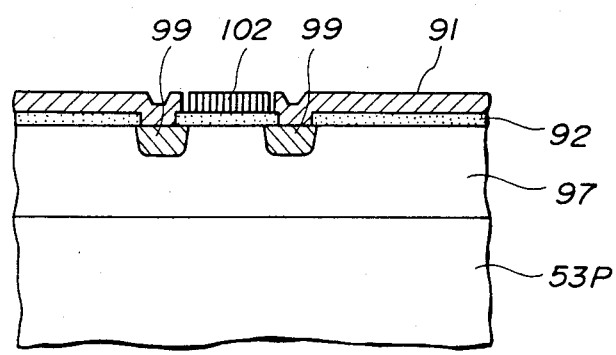
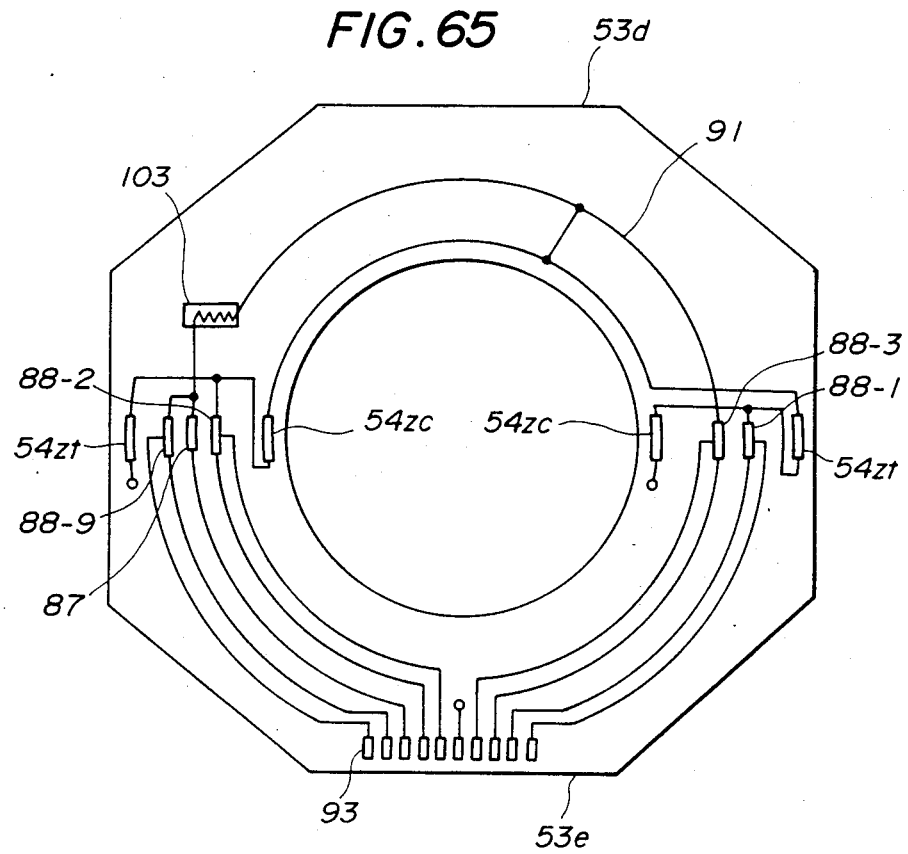

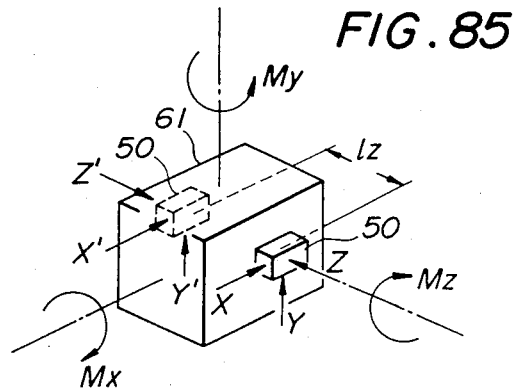
FIG. 85
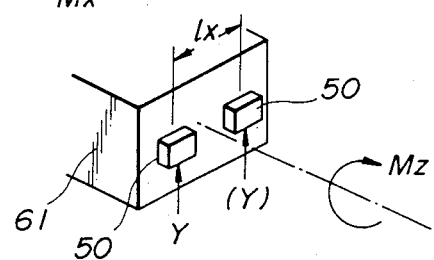
FIG. 86
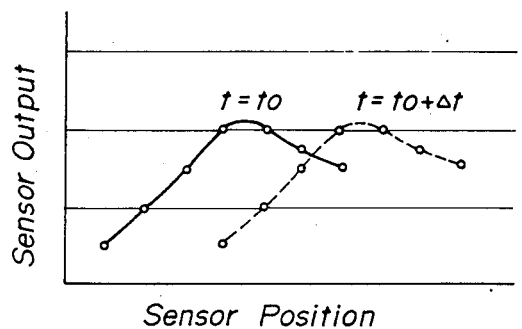
FIG. 88
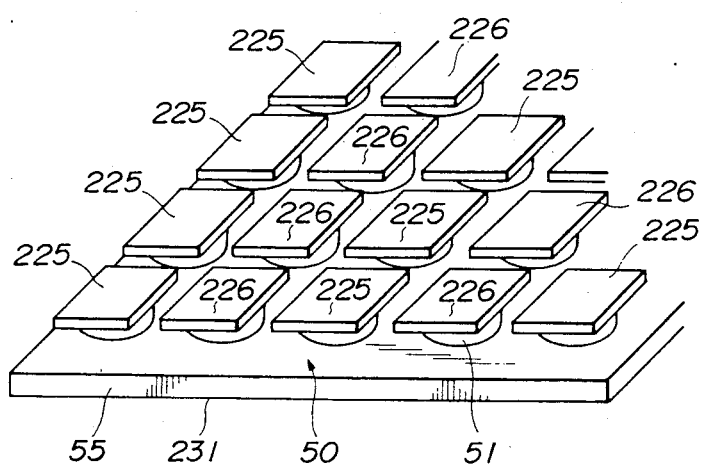

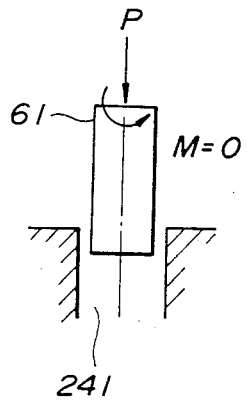 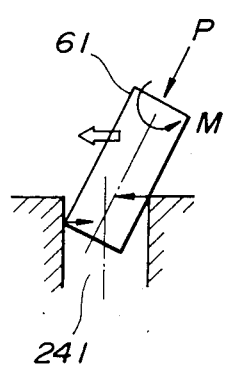 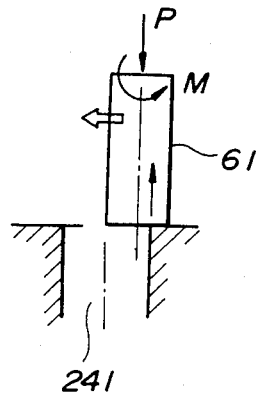
FIG.98 A  FIG.98 B  FIG.98 C
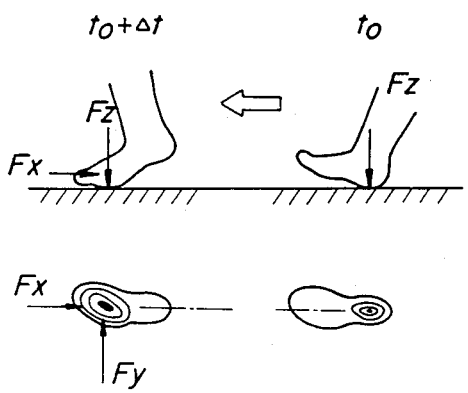
FIG.99

PRESSURE SENSE RECOGNITION CONTROL SYSTEM

BACKGROUND OF THE INVENTION

1. Field of the Invention

The present invention relates to a pressure sense recognition control system in which a pressure sensor is attached to the hand of an intelligent robot, the manipulator remote control system, the bottom of a movable robot foot, and so on, to make the hand, manipulator or foot recognize senses similar to those of the human being such as sense of touch, pressure, slippage, hardness, or the like; and controls the hand, manipulator or foot based on that recognition. In the specification, the term "pressure sense" is used in a broad sense and should be defined to include tactile or tactual sense.

2. Description of the Prior Art

Forces applied to the hands or the feet of robots, which work in place of human beings, are three-dimensional and have a certain distribution. An amount and a direction of the applied force and a distribution of the force on the pressure surface varies as the hands (manipulators) or feet move. A human being senses not only this force, i.e., pressure, but also a combination of touch, slippage, hardness, and so on, as pressure sense or tactile or tactual sense. With this in view, a machine requires these senses to control the hands and feet to the high degree equivalent to those attained by human beings. Of these senses, it is required to sense a pressure in a three-dimensional manner and to recognize a distribution of the pressure as the most basic sensing.

Here, the three-dimensional sensing of a pressure means the sensing of three components of a force in three directions in the rectangular coordinate system including the sensing of a vertical component force on a pressure surface and the sensing of two-directional component forces on the pressure surface. It is also desired to additionally sense moments in the three directions resulting from hand or foot operations.

Sensors as shown in FIGS. 1, 2, 3A and 3B have been proposed as sensors sensing in the three directions. These prior art sensors consist of an elastic member 1 such as elastic ring, cross leaf spring, elastic block or the like and a plurality of strain gauges 3 adhered to the elastic member 1 in the respective directions. Since the size of the sensor is substantially equal to or larger (e.g., the length of each edge of the sensor is approximately from 100 mm to 200 mm) than the object gripped by the hand, the sensor is not attached to the pressure surface of the hand or foot, but is merely attached to an ankle or wrist 5 only to detect an entire working force of the hand or foot. As a result, these prior art sensors do not sense touch, slippage and hardness. Accordingly, it is necessary to provide a special sensor separately if sense information of touch, slippage or hardness is required. However, since such a special sensor is also relatively large and provides no more than general sense information in areas corresponding to the palm of the hand resulting from the differences or the like in a space to which a pressure is applied or a position for sensing. The sensor cannot provide delicate sense information from portions corresponding to fingers.

As described above, one of the distinctive features of the human senses is the capability of recognizing a pressure distributed over a surface. The pressure surface of a robot, etc., is of a limited size and if the gripped object is not a flat surface or when a hand or foot moves in a certain manner, a force applied to the pressure surface will not be uniform. For that reason, it is necessary to recognize the sense of pressure in a distributed state. As a result of that recognition, an area of the pressure surface, a center of the working force and changes thereof with time are sensed.

Sensors as shown in FIGS. 4A, 4B, 5 and 6A–6D have been proposed as having the senses of recognizing the distribution of that applied force. The sensor shown in FIG. 4A has a silicone rubber cord 15, which is made of electrically conductive rubber, and a metal electrode 17. An area of the contact between the surface of the rubber cord 15 and the electrode 17 varies in accordance with a pressure applied to the cord 15, so that a resistance value is varied.

In the sensor shown in FIG. 4B, the metal electrodes 17 are laid across silicone rubber cords 15 in lattice form and a scanning system in ITV (industrial television) system is used for detection.

In the sensor shown in FIG. 5, points of a plurality of small pins 19 move upward and downward in the vertical direction following the shape of a three-dimensional object being detected and a differential coil and a hole element (not shown) cooperate to detect and recognize the shape of the three-dimensional object.

The sensors shown in FIGS. 6A to 6D use electrically conductive rubber etc. and can be applied as force sensing sensors in robots.

The sensor shown in FIG. 6A has a combination of a conductive rubber sheet 7 and metal electrodes 8. Insulating electrode supports 9a are arranged on a base plate 9 in distributed locations and the metal electrodes 8 are disposed on the top of the electrode support 9a. Each of resilient members 9b, e.g., sponge rubber member, is placed between the electrode supports 9a and the conductive rubber sheet 7 is adhered to or disposed on the top of resilient and conductive member 9b. It is easily understood that the resilient member 9b in the portion receiving a load F is compressed downward in the drawing and the deflection is detected by an electrical contact between the conductive rubber sheet 7 and the electrode 8, so that the location and distribution of load F are determined.

In FIG. 6B, a plurality of cylindrical electrodes 8 are fabricated in a distributed manner over the surface of the base plate 9, which is disposed under the conductive or pressure sensitive rubber sheet 7 as the resilient sheet. A distribution and a position of load F is detected by the electrode 8 which is electrically in contact with the conductive rubber sheet 7 at a position to which load F is applied.

In the sensor shown in FIG. 6C, a series of the conductive rubbers 7a are embedded in the form of row into the bottom surface of the insulating rubber sheet 7. The strip electrodes 8 are attached to the top surface of the insulating substrate 9 in the form of column in opposition to the conductive rubbers 7a. The electrode 8 and the conductive rubber 7a are in electrical contact at the junction of the column and the row corresponding to the portion of the insulating rubber sheet 7 where load F is applied, so that the load distribution can be determined from the distribution of contact points.

FIG. 6D shows the sensor in which a thin metal plate made of beryllium copper or foil etc. is used for the strip electrode 8a. Here, use is made of the elasticity of the electrode 8a itself or the elasticity of an insulating cover 8c covering the strip electrode 8a. A base 9, to which this combination of the members 8a and 8c is attached, is made of metal, for example. A peripheral portion 9c of the base 9 forms an electrode surface. An insulating plate 8d insulates the foil electrode 8a from the base 9. If a plurality of foil electrodes 8a are arranged along the base 9, a load distribution is detected, because the combination of the electrodes 8a and the insulating cover 8c is deflected when a load F is applied to the combination so that the foil electrode 8a electrically contacts the electrode surface 9c of the base 9.

However, all these conventional sensors sense only in the direction perpendicular to the sensor pressure surface. In order to precisely detect the distribution, each sensor module must be small, but structural limits prevent the modules from being made small enough. The sensors described above can only be used for contact detection and pressure surface detection, i.e., as contact sensing sensors, and are inadequate as pressure sensor substitutes for human senses due to their use of conductive rubber as the principal detection mechanism. Conductive rubber has a non-linear characteristics to applied force and a narrow dynamic range. Consequently, conventional sensors do not permit sense recognition control close to that achieved by the human senses.

FIG. 7 shows an octagonal stress ring sensor conventionally used as a ring type loadcell for detecting three-directional force components. As strain gauges, resistance wire gauges 23–26, 27–30 and 31–34 are adhered to the two vertical side surfaces, the surface of the inner periphery and the six surfaces (excluding a pressure surface 21 and a substrate 22) on the outer periphery of a metal octagonal ring 20 in a manner that the sets of the gauges 23–26, 27–30 and 31–34 detect each of the three-directional components independently. The strain gauges 23 and 26 and 24 and 25 are adhered to the two vertical pressure surfaces on the outer periphery of the octagonal ring and to the two vertical surface of the inner periphery of the ring, respectively, so that a vertical force component Fz in the vertical direction z perpendicular to the pressure surface 21. The strain gauges 27–30 are adhered to the four diagonal surfaces on the outer periphery of the octagonal ring to detect a horizontal force component Fx in the horizontal direction x of the horizontal force applied to the pressure surface 21. The strain gauges 31–34 are adhered to both vertical side surfaces of the ring, at the same angle as the outer diagonal edges of the octagonal ring, and are positioned at an optimum position, which is substantially at the center between the inside and outside edges of the ring, to detect a horizontal force component Fy in the direction y of the horizontal force applied to the pressure surface 21.

The three-directional force component sensors detect a force in the form of component forces in the fundamental rectangular coordinates system, i.e., in the form of the three-directional components Fx, Fy and Fz, as shown in FIG. 7. An amount and a direction of the force can be obtained by calculating component force equations for vectorically adding the three component forces. Furthermore, a force in any direction desired can be obtained.

The simple resolution and composition of a force is a major feature of the three-directional component force sensors.

The octagonal stress ring sensor shown in FIG. 7 is used for detecting components of three-directional force, but has the following disadvantages, so that this ring sensor is especially inadequate when the ring sensors are arranged in the form of a two-dimensional array in order to detect a load distribuion distributed over the two-dimensional surface. The disadvantages follow:

(1) It is difficult to reduce a sensor size, since a plurality of strain gauges are adhered to the surfaces in various directions of the ring body.

(2) Sensing characteristics are not stable because the strain gauges are adhered to the ring and the adhered layer produces creep.

(3) A large interference output is produced, depending upon the adhered positions of the strain gauges.

(4) The fabrication of the sensor is relatively difficult. It is particularly difficult to adhere the strain gauges to the inner periphery of the ring.

(5) The sensor does not fit to mass-production and accordingly the sensor is expensive.

On the other hand, in order to realize a robot hand having advanced pressure sensing functions that resemble, as closely as possible, the level of pressure sensing functions in the palm and finger of the human hand, pressure sensors of the robot hand must sense three-directional component forces and a plurality of sensors must be arranged in a plane array manner at a high density, so that the distribution of the applied force, the center of that force and the resultant force that works at the center are obtained accurately. The following performances are required as a pressure sensor for those purposes.

(a) One load detecting unit must be extremely small having dimensions of several millimeters or less. Units in one distributed-load detector must be integrated at the highest possible density.

(b) Component forces of a load must be detected separately without mutual interference.

(c) A relationship between detection output and load must be linear. There must be no hysteresis error in measurement. A dynamic range, i.e., measurement range, must be wide.

(d) The load distribution detector itself must have a high rigidity, so that the detector is not deformed and the load distribution does not change when a load is applied.

SUMMARY OF THE INVENTION

With the above problems of prior art and the requirements stated above in view, it is an object of the present invention to provide a pressure sense recognition control system which directly detects three-directional pressure and the distribution thereof.

It is a second object of the present invention to provide a pressure sense recognition control system which recognizes not only three direction component forces, but also the moment of the three direction, the point of application of the force, and the entire working force and also recognizes the senses of touch, slippage and hardness.

It is a third object of the present invention to provide a pressure sense recognition control system which controls robot hand or foot functions in a sophiscated manner by recognizing the senses of touch, slippage and hardness at a high speed.

It is a fourth object of the present invention to provide a pressure sense recognition control system which simultaneously recognizes sense information to control high level operations comparable to the operations of the human hand and foot such as gripping with a minimum of grip force so that the gripped object is not deformed, lifting and releasing of the gripped objects without shock, insertion of objects into holes in the gripped object, rotation of the gripped object and so on.

In order to achieve these objects, a presure sense recognition control system according to the present invention comprises:

pressure detection means including at least one pressure sensor module for detecting the two-dimensional distribution of the component forces in the three directions in the rectangular coordinate system of a force applied to the pressure receiving surface of the pressure sensor modules, the at least one pressure sensor module having at least one pressure sensor cell having a pressure sensing member made of single crystal silicon, and a plurality of diffusion type strain gauges provided on the surfaces of the pressure sensing member which are substantially perpendicular to the pressure receiving surface thereof and for detecting the three component forces in the directions applied to the pressure surfaces in response to the changes of an output of a bridge composed of the strain gauges, the pressure detection means being mounted on an object, the drive of which is controlled by the pressure sense recognition control system;

signal processing and storing means for deriving the detection signals from the pressure detection means sequentially, for precessing the detection signals to be converted into pressure sense detection data, and for storing the converted pressure sense detection data corresponding to the pressure surfaces for each of the component forces in the three directions;

primary arithmetic operation and storage means for processing the pressure detection data derived from the signal processing and storing means in accordance with a predetermined basic arithmetic/logic operation algorithm to obtain basic data with respect to pressure and required for pressure recognition and for storing the basic data;

secondary arithmetic operation and storage means for processing the basic data read out from the primary arithmetic operation and storage means and the pressure sense detection data read from the signal processing and storing means in accordance with a predetermined pressure recognition algorithm to obtain pressure sense recognition data and for storing the pressure recognition data;

tertiary arithmetic operation and storage means responsive to command data from an external control means for controlling the drive of the object for processing the pressure sense detection data read out from the signal processing and storing means, the basic data read out from the primary arithmetic operation and storage means and the pressure sense recognition data read out from the secondary arithmetic operation and storage means in accordance with a predetermined control algorithm to obtain control data required to control the drive of the object and for outputting the control data to the external control means; and data communication means for communicating data between the tertiary arithmetic operation and storage means and the external control means.

Here, the object may be the hand or foot of a robot or the manipulator of an automatic assembler. The basic data may be the data for the three total pressures of the respective component forces in the respective three directions, the one total resultant pressure of the component forces in the three directions, the center of pressure, the pressure distribution, the pressure receiving area, and moments in the three direction. The pressure sense recognition data may be the data relating to the sense of touch, the sense of slippage, the sense of hardness, form recognition and material substance recognition. The control data may be the data relating to gripping, lifting, insertion, rotation, releasing, and walking. The command data may be the data relating to grasp, lifting, insertion, rotation, releasing and walking.

It is preferable that the primary arithmetic operation and storage means computes the total resultant pressure, the center of pressure, the pressure distribution, the pressure receiving area and the moments in the three direction from the pressure sense detection data stored in the processing and storing means and the computed results are time sequentially stored.

It is preferable that the signal processing and storing means sequentially derives, in every column and in every row, electrical signals corresponding to the size of the three component forces from the pressure detection means, the derived signals are converted into digital, signals, the digital signals are compensated for temperature and sensitivity characteristics of sensor, and corrected for interference from component forces in other directions, and the compensated and corrected signals are converted into the pressure sense detection data which is stored time sequentially.

The signal processing and storing means may comprise:

a plurality of the bridges having inherent addresses consisting of first addresses and second addresses;

a temperature detector for detecting the temperature of the module;

a first analog switch connected to the bridges and to the temperature detector, for switching the outputs from the bridges and the detector, so that the outputs are transmitted to the signal lines which belong to the second addresses of the bridge;

a second analog switch connected to each of the signal lines for switching the signal lines;

an address generator for sequentially generating the first addresses and the second addresses of the bridge;

a first switch driver for driving the first analog switch belonging to the first addresses supplied from the address generator;

a second switch driver for driving the second analog switch belonging to the second addresses supplied from the address generator;

an analog to digital converter for converting analog pressure signals and analog temperature detection signals into digital pressure signals and digital temperature detection signals, the analog signals being outputted from the bridge and the temperature detector, the addresses of which are selected by the address generator and the signals passing through the first analog switch and the second analog switch; and a microprocessor receiving the digital temperature signal and the digital pressure signal which are obtained from the analog-to-digital converter for computing to compensate for the characteristics of the strain gauge in the digital pressure signals in accordance with a predetermined arithmetic operation equations.

Here, the bridges may be arranged at the crossing points of matrix wiring consisting of control lines for driving the first analog switch and the signal lines which cross the control lines.

The address generator, the first switch driver, the second switch driver and the analog-to-digital converter can be included in the microprocessor.

It is preferable that the signal processing and storing means has a power supply switch which switches the power supply to the bridges, belonging to the second addresses in a unit of the first addresses, and to the temperature detector, and the first switch driver switches the first analog switch, belonging to the first addresses that are supplied from the address generator and the power supply switch.

The bridges may have two output lines. Inherent addresses composed of first and second addresses can be allotted to the bridges, and the second analog switch can be connected to a cathode of a switching diode, the anode of which is connected to one of the output lines of the bridge, to the output line of the first analog switch which is connected to the output line of the temperature detector, and to the other of the output line of the bridge, so that the output from the module having the same second addresses and the output from the temperature detector are switched.

It is preferable that the pressure detection means has a pressure sensor array having the plurality of pressure sensor modules arranged in array form in the column and row directions on a base plate, and the pressure sensor modules detect a force applied to the pressure receiving surface in the form of three component forces in the three directions consisting of a component force Fz in the direction perpendicular to the pressure receiving surfaces and the two component forces Fx and Fy perpendicular to each other in the pressure surface.

Here, the pressure sensor modules may consist of at least one pressure sensor cell which has a pressure sensitive structure formed of a single crystal semiconductor having a surface layer of one conductivity type on which a plurality of strain gauge regions of the other conductivity type is formed, and the strain gauges may form bridge circuits which correspond to the three component forces Fx, Fy and Fz and which produce an output voltages when a pressure is applied to each of the pressure sensor modules in a manner that the output voltages produced by the bridge circuits detect a two-dimensional distribution of each of the three component forces of the applied force.

The pressure sensor array may have a plurality of diffusion type strain gauge groups that are formed along the longitudinal direction of a surface of rectangular single crystal silicon which is perpendicular to the pressure receiving surface. A plurality of cell holes and at least one cell-separation holes may be opened in the rectangular single crystal silicon alternately, corresponding to the strain gauge groups. The plurality of cells can be separated by cut grooves communicating with the cell separation holes to form a plurality of independent modules, so that a force applied to the pressure receiving surface is divided into three component forces which are detected as changes in output voltages by the bridge. The cells formed by the rectangular single crystal silicon can be arranged in array form on a base plate in a manner that the pressure surface is disposed upward.

The pressure sensor array may form a pressure sensor unit in which a plurality of the pressure sensor modules are arranged in single or plural rows on a base plate, and terminals which are attached to the base plate and connected to the bridges can be mechanically connected to terminals on a motherboard, so that a required number of the pressure sensor units are obtained.

The pressure sensor array may have a base plate having a plurality of grooves running in parallel with each other in the column direction; the pressure sensor cells which are engaged in the grooves on the base plate so that a predetermined number of cells are distributed in each groove and aligned in the row direction, and are connected by conductors to the base plate; a pressure receiving plate of the pressure sensor modules formed by dividing a base pressure plate provided in common to the plurality of pressure sensor cells which are fixed to the base plate into each of the pressure sensor modules.

The pressure sensor array may have a differential amplifier which differentially amplifies the respective outputs from the bridge circuit and a switching device which switches the output from the differential amplifier. Both are incorporated in the pressure sensor module. The output conductors of the switching device can be led to the output scanner arranged outside the pressure sensor array in common to the output conductors of the switching devices corresponding to the respective ones of a plurality of sensor modules in the same column. The control conductors of the switching device can be led to the control scanner arranged outside the pressure sensor array in common to the control conductors of the switching devices corresponding to the respective ones of a plurality of pressure sensor modules in the same row.

Here, the differential amplifier and the switching device may be formed on a first base plate separated from a second base plate for mounting the pressure sensor cells and the first base plate can be incorporated via a buffer in a portion of the pressure sensor cells.

Each of the pressure sensor modules may consist of at least two pressure sensor cells.

Here, the pressure sensor modules may be so configured that two of the pressure sensor cells are arranged between a pressure receiving plate and a base plate which are in parallel to each other, and the sides of the pressure sensor cells may be disposed in parallel to each other and fixed to the base plate and the pressure receiving plate in a manner that the surfaces of the pressure sensor cells are substantially perpendicular to the base plate and the pressure receiving plate.

A plurality of the pressure sensor cells may be fixed to and disposed between a pressure receiving plate and a base plate which are in parallel to each other in a manner that the sides of the pressure sensor cells are substantially perpendicular to the base plate and the pressure receiving plate, so that component forces of a load applied to the pressure receiving plate is divided for measurement, at least two of the pressure sensor cells are so arranged that the surfaces of the at least two pressure sensor cells are substantially perpendicular to each other, and only an output signal in response to a component force in the direction parallel to the surface of the pressure sensor cell is obtained from the pressure sensor cell.

Here, four pressure sensor cells can be arranged to form a box. Alternatively, two pressure sensor cells can be arranged to form a T shape. Alternatively, three pressure sensor cells can be arranged to form an I shape.

Each of the pressure sensor modules may have two pressure sensor cells having the pressure sensitive structure, each of which has one half of the strain gauge region forming a bridge for detecting three component forces.

The pressure sensor module may have two pressure sensor cells. The pressure sensitive structure of one of the pressure sensor cells may have a strain gauge region for detecting two of the three component forces of a force applied to the upper surface of a pressure receiving plate. The pressure sensitive structure of the other pressure sensor cell may have a strain gauge region for detecting the remaining one component force.

In the pressure sensor cell, the strain gauges for detecting two of the three component forces can be formed on the surface on one side substantially perpendicular to the pressure receiving surface and the strain gauges for detecting the remaining one component forces can be formed on the surface on the other side substantially perpendicular to the pressure receiving surface.

The surface which is substantially perpendicular to the pressure receiving surface and on which the diffusion type strain gauges of the pressure sensor cells formed can be lattice plane {111}.

Here, N-type silicon can be used for the single crystal silicon and P-type diffusion layer can be used for the diffusion type strain gauges. The pressure sensor cell may have a ring like form.

A temperature sensor region can be formed in the pressure sensor cell. The temperature sensor can be a diffusion resistance, diode or transistor. The temperature sensor region may locate in a region where a strain is low when a force is applied to the pressure receiving surface of the pressure sensor cell.

The analog switches can be formed in the pressure sensor cells and can be connected to input/output conductors.

The pressure sensor cells can be provided on a base plate made of a material having a thermal expansion coefficient substantially equal to or similar to that of the material of the pressure sensor cells.

Alternatively, the pressure sensor cells can be provided on a base plate made of single crystal semiconductor in which conductors and a control circuit for processing signals outputted from resistance elements of the bridge formed by the strain gauges are integrated.

The pressure sensor cell may have output terminals on the surface of the pressure sensor cells for deriving output signals from the strain gauges. A base plate for supporting the pressure sensor cells may have input terminals for receiving output signals from the pressure sensor cells. The output terminals and the input terminals can be connected to each other through conductors provided on a flexible film.

Here, at least one terminal group of the output terminals of the pressure sensor cells and the terminals of the conductors on the flexible film can be formed as raised conductors and are engaged with and connected to the other terminal group.

The above and other objects, effects, features and advantages of the present invention will become more apparent from the following description of preferred embodiments thereof taken in conjunction with the accompanying drawings.

BRIEF DESCRIPTION OF THE DRAWINGS

FIGS. 1, 2, 3A, 3B, 4A, 4B, 5, 6A, 6B, 6C and 6D are perspective views showing various conventional sensors;

FIG. 7 is a perspective view showing an octagonal stress ring fabricated using prior art technology;

FIGS. 14A, 14B, 14C, 15A, 15B and 15C are circuit diagrams showing various connections of strain gauges in FIGS. 13A, 13B and 13C;

FIG. 16 s a table diagram illustrating results of distributed measurement of load components in the pressure sensor cell in FIG. 13;

FIG. 17 is a perspective view showing a cell-type pressure sensor module;

FIGS. 59A and 59B are schematic views showing one main surface and the other main surface of a pressure sensor cell in a further embodiment;

FIG. 60 is a cross sectional view showing a pressure sensor cell in a yet further embodiment;

FIG. 61 is a schematic view showing the front main surface of the pressure sensor cell in the present invention;

FIG. 64 is a cross sectional view showing and another embodiment of the analog switch used in the pressure sensor cell in the present invention;

FIG. 65 is a schematic view showing a main surface of a pressure sensor cell in a further embodiment;

FIGS. 85, 86, 87A, 87B and 87C are explanatory diagrams used to explain the contents of various types of algorithms in the present invention;

FIGS. 88, 89 and 90 are partial perspective views showing various embodiments of the arrangement of elastic pads for which material assumption algorithms used in the present invention are executed;

FIGS. 96A, 96B, 96C, 98A, 98B, 98C and 99 are explanatory diagrams used to explain the contents of further various types of algorithms in the present invention.

DETAILED DESCRIPTION OF PREFERRED EMBODIMENTS

Figure 1:
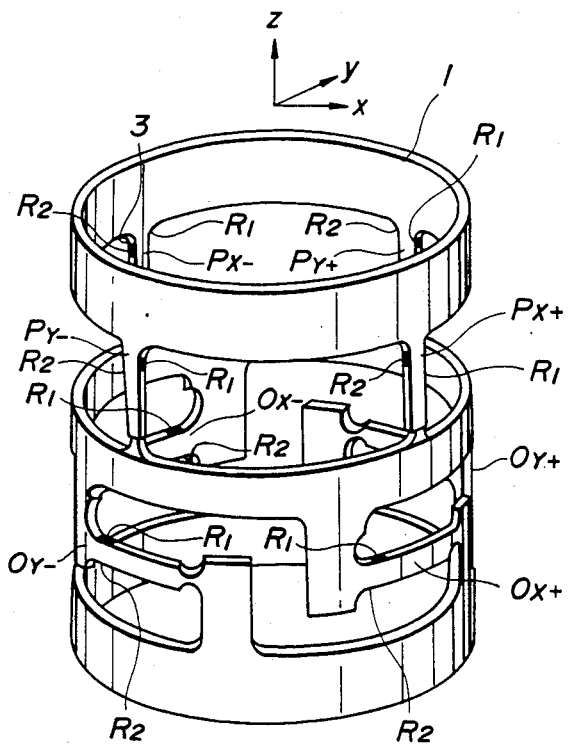
Figure 2:
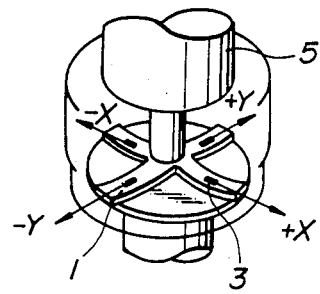
Figure 3:
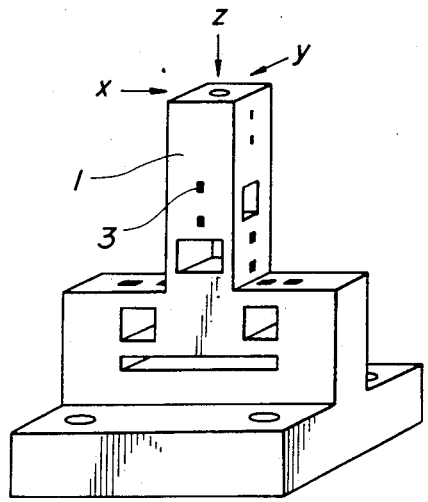
Figure 3:
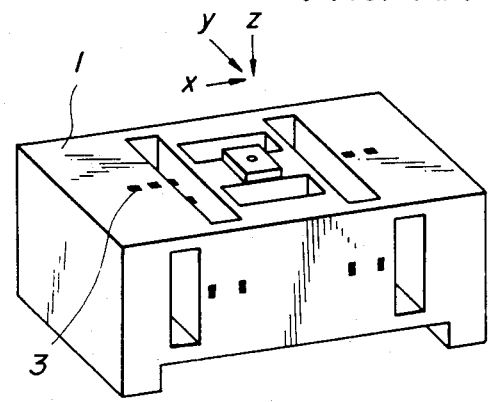
Figure 4:
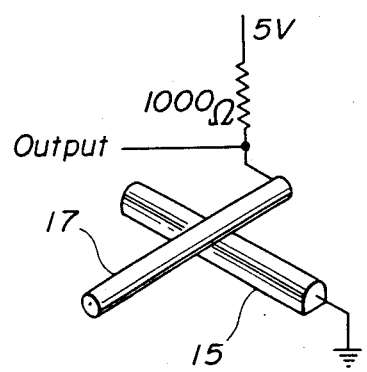
Figure 4:
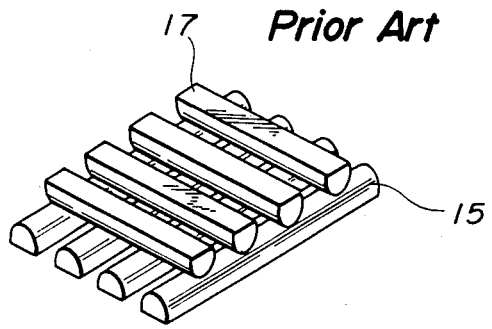
Figure 5:
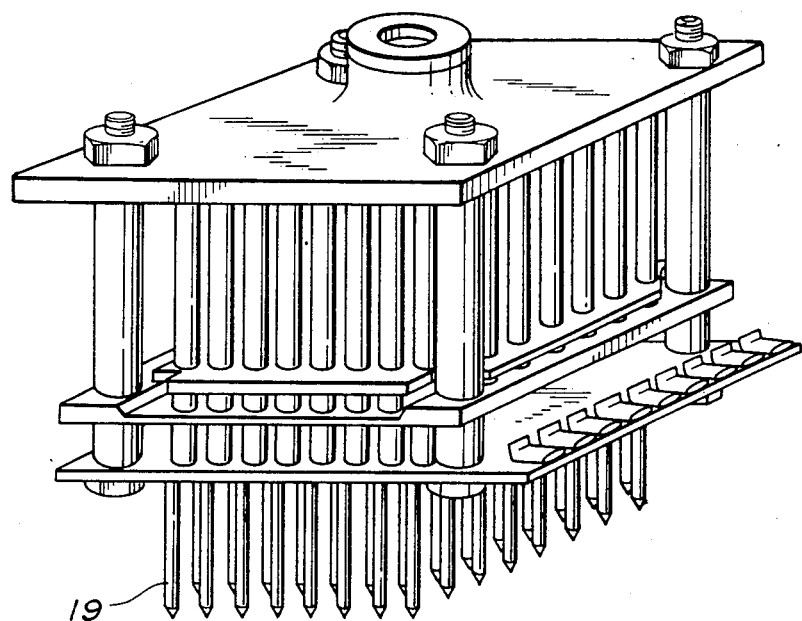
Figure 8:
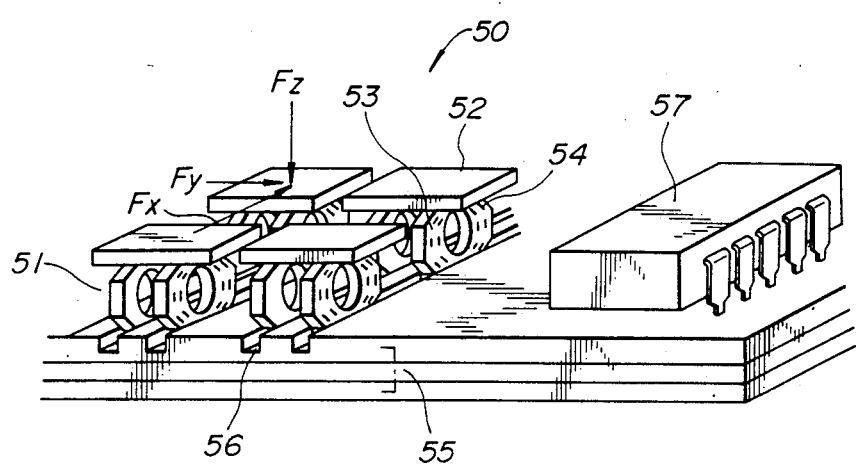
FIG. 8 is a perspective view showing the main section of an embdiment of the present invention.

First, explanation will be made of a general overview of the wafer type pressure sensor array as an element in the present invention. In FIG. 8, reference numeral 50 denotes an entire pressure sensor array, which is a basic block in the present invention, and reference numeral 51 denotes a pressure sensor module used as a unit micromodule forming the pressure sensor array 50. The pressure sensor module 51 has a dimension of several millimeters or less and consists of a pressure receiving plate 52, which receives an applied pressure, and two (or one, three or four) wafer type pressure sensor cells 53, firmly attached to the bottom of the pressure receiving plate 52. The pressure sensor cell 53 has a pressure sensitive structure made of single crystal silicon in ring like form such as circular ring, polygonal ring including rectangular or octagonal ring, and a plurality of diffusion type semiconductor strain gauges 54 are formed on the surfaces of the pressure sensitive structure (i.e., on the surfaces perpendicular to the surface which is in contact with the pressure receiving plate 52). The changes in resistance values of the diffusion type strain gauges 54 are detected to determine three force components, Fz, Fx and Fy applied to the pressure receiving surface. A plurality of pressure sensor modules 51 are attached to the top of a base plate 55 at a high density in the form of array or matrix to form a pressure sensor array 50.

Here, it is preferable that the lower end of the pressure sensor cells 53 are fitted vertically into parallel grooves 56 formed into the top of the base plate 55, or into attachment holes (not shown) formed for each cell in order to ensure a firm attachment. The output signals from the pressure sensor module 51 are sequentially scanned by a scanner amplifier (in the form of integrated circuit) 57, which is disposed on or adjacent to the base plate 55, so that the output signals are amplified by the scanner amplifier 57 to facilitate easy processing by a CPU (central processing unit) in a microcomputer that will be described later.

The pressure sensor cells 53 can be made of single crystal silicon. Since diffusion type strain gauges 54 are fabricated on that silicon, the cells can be easily formed by conventional planar technology, to provide an extremely small (viz., several millimeters to one millimeter in diameter) unit having good characteristics. Accordingly, the pressure sensor modules 51 shown in FIG. 8 can be integrated on the base plate 55 at a high density, for example, from 25 to 100 units per square centimeter.

Also, as stated above, since the pressure sensor modules 51 which independently detect the three components of a force applied to the pressure receiving surface are fabricated in the form of a planar array at a high density to form a pressure sensor array 50, the modules separate the applied force into three-directional component force and can independently detect, at high density, each of the two-dimensional distributions in three-directional component force. There are also following advantages: the diffusion type strain gauges 54 are placed in locations in the pressure sensor cell 53 where the sensitivity is high and the other two component forces do not affect, the component force of the force applied to the pressure receiving surface is sufficiently separated from other component forces and is detected without mutual interference; excellent linearity between the applied pressure and the detected output, a wide dynamic range and no hysteresis in measurement because very superior single crystal silicon is used in the pressure sensitive structure; and a couple of tension and compression can be detected by combining the strain gauges 54 into a bridge.

The form of the pressure sensor cell 53 is not limited to that shown in FIG. 8 and various forms can be used to form the pressure sensor cell 53. For example, in case of rectangular pressure sensor cell group in which either the tops or the bottoms of the respective cell are integrally linked in the respective rows, there is an advantage that the positioning and fixing of combined cells are simplified. The outputs from the semiconductor strain gauges 54 in the pressure sensor cell 53 are derived from the conductors on the base plate 55. Since an extremely large number of conductors extended from high-density pressure sensor array 50 would be required, it is necessary to improve the manner of wiring and connections in the interface between the pressure sensor cells 53 and the base plate 55. For example, the diffusion type strain gauges 54 are dispersedly arranged on both sides of the pressure sensor cells 53 for each detection. The diffused layer and the substrate are formed as parts of the power supply conductors for the strain gauges 54 by fabricating an type epitaxial layer, having a conductivity type opposite to that of the substrate, on the single crystal silicon substrate, fabricating the strain gauges 54 in the epitaxial layer and then fabricating a diffused layer through the epitaxial layer. Alternatively, the base plate 55 is formed as multiple-layered so that the power lines and signal lines are wired in the separate layers and the power conductors are connected from the grooves 56 to the pressure sensor cells 53.

The two-dimensional distribution of the three component forces can be more precisely measured by providing a temperature detector, such as a thermistor, in the vicinity of the pressure sensor module 51, and by compensating temperature and correcting unniformity in gauge resistances by a CPU of a microcomputer.

It should be noted that an elastic, comparatively thin, protective film, having dust-resistant and water-resistant functions, may cover the surface of the pressure receiving plate 52, or the thin film may be directly attached to the cell 53. Alternatively, the base plate 55 having the power lines and the signal lines to the cell 53, may be a flexible substrate having a certain degree of flexibility so that the base plate 55 can be adhered to the curved surface. Furthermore, the entire pressure sensor cell may be fitted into a body made of an elastic material such as rubber. It is also preferable to provide a scanner having a scanner amplifier 57 which scans row addresses (in the vertical direction in the drawing) and column addresses (in the horizontal direction in the drawing) so that the number of wirings is reduced.

Figure 9:
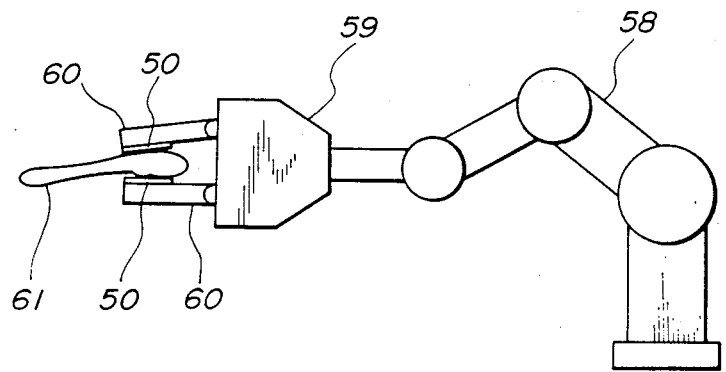
FIG. 9 is an explanatory diagram of an embodiment where the pressure sensor array in FIG. 8 is used as a sensor for controlling a robot hand.

FIG. 9 shows an embodiment of the present invention in which the pressure sensor array 50, described above, is attached to each of a pair of fingers 60 of a robot hand 59, which is, in turn, attached to a multiple-jointed arm 58, to measure the gripping force of the fingers 60 against the gripped object 61, i.e., to measure the component force of the load applied to the fingers 60 and the distribution (surface distribution) of that force. That gripping force can be accurately controlled by the control means to be described later. Since the distribution of a load force differs depending on what section of the object is being gripped, if the gripped object 61 is comparatively long and thin, as shown in FIG. 9, the grip will be judged to be improper, if the distribution is abnormal. If a soft object (e.g., fruit) is gripped by a relatively light gripping force, it is predicted that the object will fall, judging from the time transition of the load components.

The pressure sensor 53 detects horizontal forces Fx and Fy and a vertical force Fz applied to the pressure receiving plate 52, when the pressure sensor array 50 is arranged in a path on which people walk, so that the sensor array 50 detects an amount and a distribution of force Fx corresponding to the kick in the rear direction and force Fy corresponding to pushing out in the lateral direction perpendicular to the walking direction, in addition to a body weight distribution on the pressure sensor array 50. Since the surface distribution of a load during walking and the time transition of the component forces can be accurately measured, individual differences in walking and manners of body defect can be effectively observed and determined. As will be discussed later, a robot can be provided having advanced walking control functions by attaching the pressure sensor array 50 in the robot leg.

Next, a detailed discussion of specific embodiments of the arrangement of the pressure sensor array 50 will be given with referring to the attached drawings.

Further, the diffusion type strain gauges 54 are provided on the pressure sensor cell 53 at positions that a high sensitivity is expected and that the other two-directional component forces do not affect theoretically.

Figure 10:
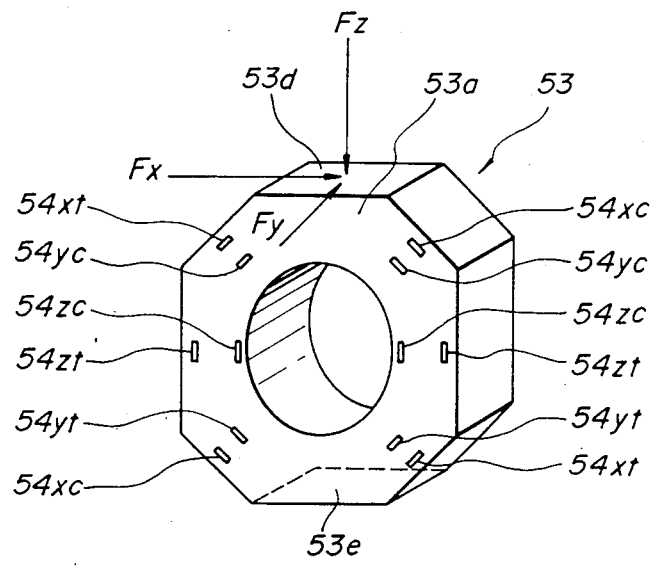
FIG. 10 is a perspective view showing a strain gauge arrangement and applied load components on the pressure sensor cell shown in FIG. 8.
Figure 11:
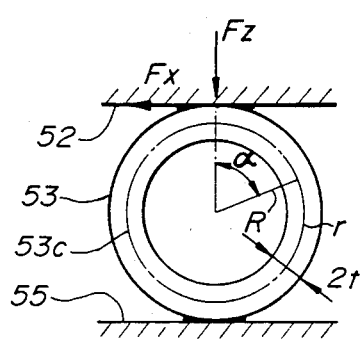
FIGS. 11A and 11B are front and side views showing the shapes and dimensional relationships in the cell to demonstrate the principle of the pressure sensor in the present invention, respectively.
Figure 11:
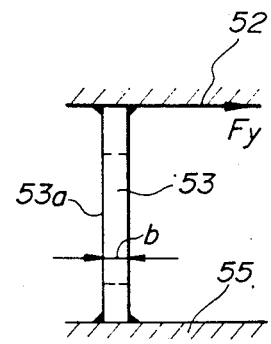
Figure 12A:
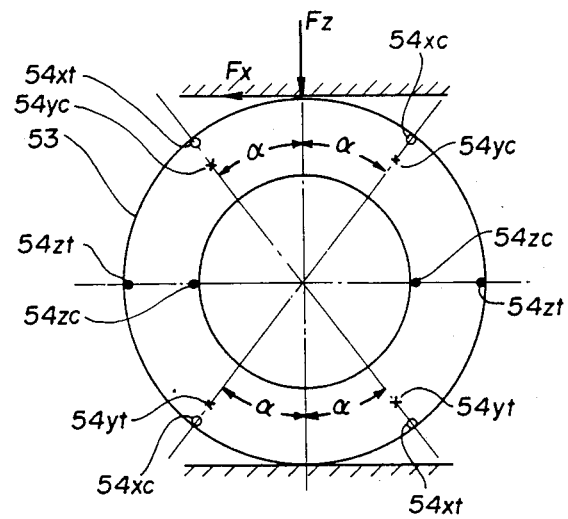
FIG. 12A is a diagram showing the location of strain gauges arranged in the pressure sensor cell shown in FIGS. 11A and 11B.

FIG. 10, shows an embodiment of the locations of the strain gauges 54. FIGS. 11A, 11B and 12A show the principle of the locations of the strain gauges 54. In FIGS. 11A and 11B, when the loads Fx, Fy and Fz are independently applied to the strain gauges 54 in the three different directions, stresses produced in the pressure sensor cell 53 are derived by the following equations, assuming that the pressure sensor cell 53 is fixed to the surfaces of the base plate 55 and the pressure receiving plate 52 and R>>t.

$$\sigma = \frac{3}{4} \frac{R}{bt^3} Fx \frac{r}{R+r} \cos \alpha \quad (1)$$

$$\sigma = R \frac{b}{I} Fy \cos \alpha \quad (2)$$

$$\sigma = \frac{3}{4} \frac{R^2}{bt^3} Fz \left( \frac{2}{\pi} - \sin \alpha \right) \frac{r}{R+r} \quad (3)$$

Where
$\sigma$: stress in the peripheral direction,
R: average circle 53c of the cell, i.e., radius of the neutral axis when the cell is treated as a beam.
2t: cell width
b: cell thickness
I: moment of inertia of the respective sections in the direction of Fy
r: variable of the cell in the diameter direction
$\alpha$: angle variable taken from the top edge of the cell.

In order to detect the strain based on this stress, strain gauges are arranged at positions on the cell 53 as shown in FIG. 12A. First, considering the load Fx, gauges 54xt and 54xc which are used to measure Fx are located at the positions of r=t. Note that the gauges may be located at the inner periphery of the cell. Also, as will be described later, if the angle $\alpha$=39.6° is selected to prevent interference of component force Fz, the following equation is obtained from equation (1).

$$\sigma = 0.58 \frac{R}{bt^2} Fx \quad (4)$$

Tension strain occurs in the gauge 54xt and compression strain occurs in the gauge 54xc. Since $\alpha$=90° in gauges 54zt and 54zc for measuring load Fz and r=0 in the gauges 54yt and 54yc for measuring load Fy. The strains in equation (1) are 0 and the gauges produce no detection signal.

Next, the gauges 54zt and 54zc for measuring Fz are at the positions of $\alpha$=90° around the inner and outer peripheries when only load Fz is applied to the cell, so that the following equation is obtained.

$$\sigma = 0.28 \frac{R}{bt^2} Fz \quad (5)$$

The gauge 54zt detects tension strain and the gauge 54zc detects compression strain. Since the position of the gauges 54xt and 54xc for detecting Fx and the gauges 54yt and 54yc for detecting Fy, are $\alpha$=39.6°, the term $(2/\pi - \sin \alpha)$ in equation (3) are 0, so that the strains are 0 and these gauges produce no detection signal.

Next, the gauges 54yt and 54yc for measuring Fy are at the position of $\alpha$=39.6° and r=0. When only lood Fy is applied to the cell, the following equation is obtained:

$$\sigma = 0.77R \frac{b}{I} Fy. \quad (6)$$

Tension strain occurs in the gauge 54yt and compression strain occurs in the gauge 54yc. Since the position of the gauges 54zt and 54zc for detecting Fz are $\alpha$=90°, strain in equation (2) is zero.

Figure 14:
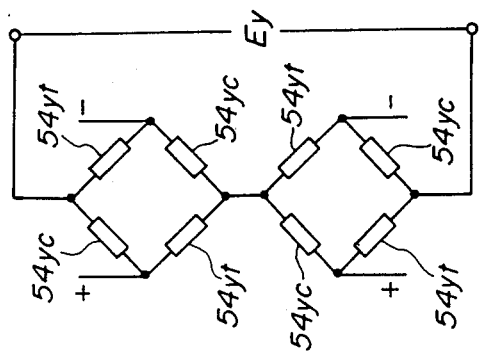
Figure 14:
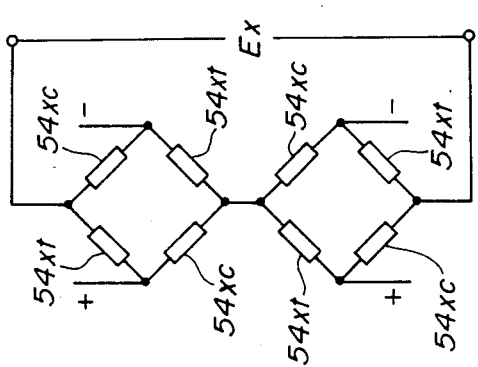
Figure 14:
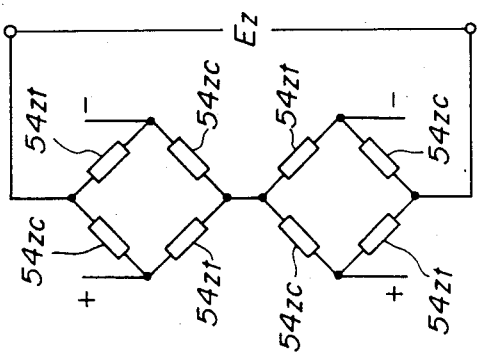

If these detection signals are outputted as they are without modification from the gauges for measuring component force Fx, the resulting signals will, of course, be error signals. Since the bridge circuit, as shown in FIG. 14B, is so arranged to cancel error signals in normal state, the bridge circuit for measuring component force Fx will not normally output erroneous detection signals.

Equations (4) and (5) show that the gauges 54xt and 54xc for measuring force Fx, the gauges 54yt and 54yc for measuring force Fy and the gauges 54zt and 54zc for measuring force Fz can separately measure the component forces without any mutual interference, while the outputs from these gauges differ by twice.

Figure 12B:
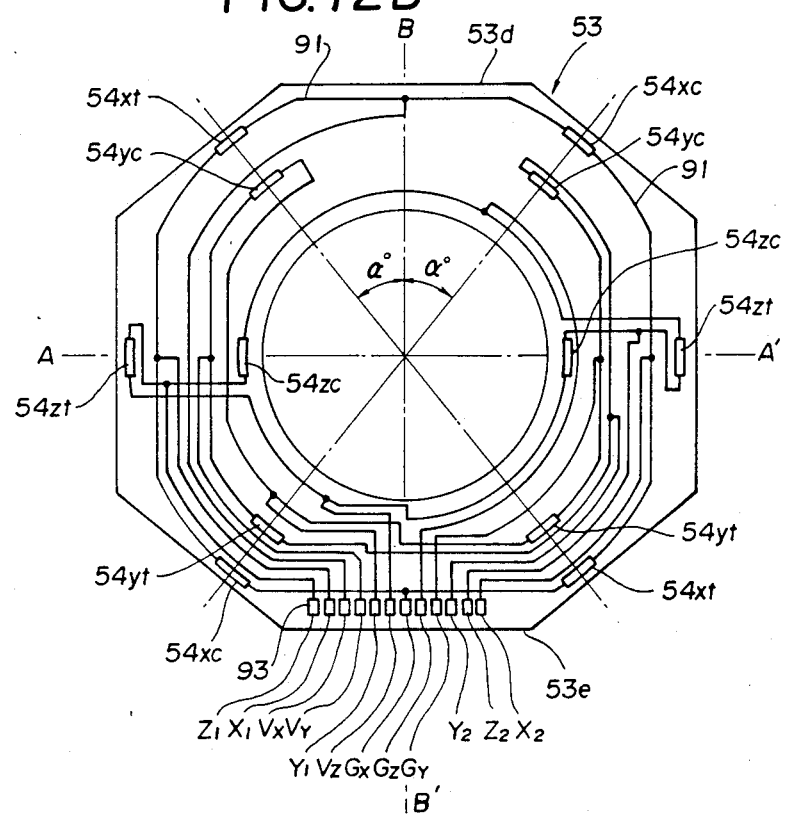
FIG. 12B is a schematic view showing the wiring on a main surface of the pressure sensor cell shown in FIG. 11A.

FIG. 12B shows an embodiment of a wiring when the strain gauges 54 are arranged on one main surface of the octagonal pressure sensor 53. In this embodiment, the main surface of the pressure sensor 53 has an octagonal ring like shape instead of the circular ring shape shown in FIGS. 11A, 11B or 12A, since the octagonal shape facilitates the fabrication of the sensor. In order to further facilitate to manufacture a diffusion type strain gauge, the strain gauges are provided on at least one of the main surface of the sensor instead of the sides thereof.

Figure 13:
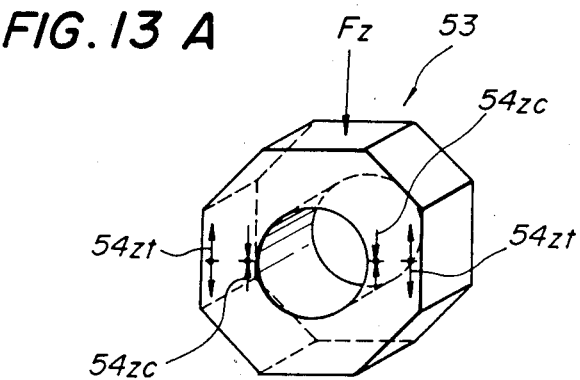
FIGS. 13A, 13B and 13C are explanatory diagrams showing the stress states generated by a load applied to the pressure sensor cell.
Figure 13:
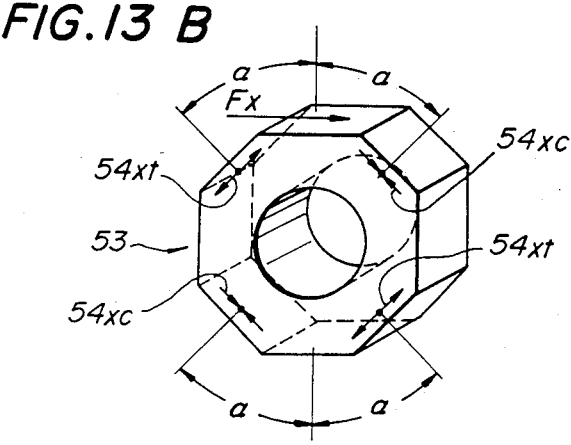
Figure 13:
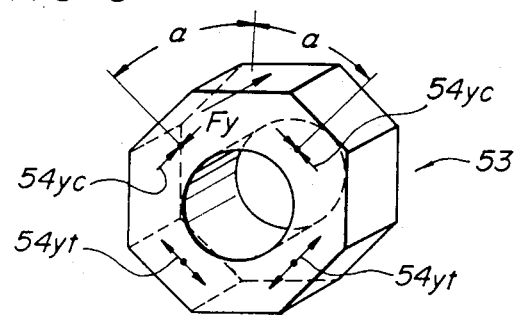

The solid line arrows in FIGS. 13A, 13B and 13C show the strain on the gauges 54zc, 54zt, etc., when loads Fz, Fx and Fy are independently applied to the cell 53 in each of the three directions.

In case that the strain gauges are so arranged to form a dual cell which forms one module, the strain gauges in each cell are bridge-connected as shown in FIGS. 14A, 14B and 14C.

In case that a single cell forms one module, the strain gauges are bridge-connected as shown in FIGS. 15A, 15B and 15C. Signals Ez, Ex and Ey outputted from each bridge circuit are measuring signals of load forces Fz, Fx and Fy respectively.

FIG. 16 is a table listing the results of the above measurement. The rows represent the load forces and the columns represent the strain gauges. Since the strain gauge output increases due to the tension strain and decreases due to the compression strain, the increase is represented, in this table, by "+" and the decrease by "−", and "0" shows neither increase nor decrease. The strain gauge bridge connections are so arranged that the strain gauges in the same direction of increase or decrease are disposed diagonally. As seen in FIG. 16, when a component force of a load is in one direction only, the output from the gauges for measuring component forces in the other directions is zero in principle, and no interference occurs between the component forces, according to the above-described arrangement of the strain gauges. Even if there are some interference signal, the majority of the interference signal will be cancelled by the bridge circuit and no practical problems will be encountered.

Figure 18:
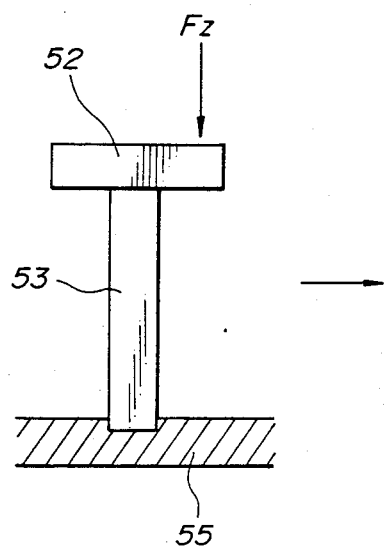
FIGS. 18 and 19 are explanatory diagrams showing the deformation of the pressure sensor module when a load is applied thereto.
Figure 19:
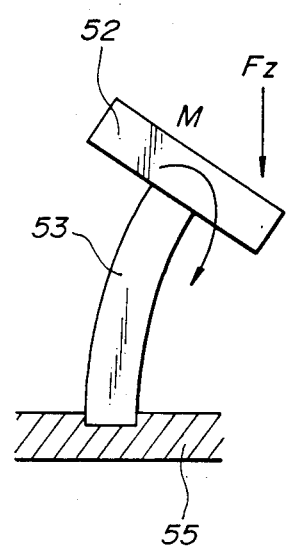

If the module 51 is fabricated by one sensor cell 53, as shown in FIG. 17, such a structure would have the following disadvantage. When an eccentric load Fz, deviated from the position at which the cell 53 is attached, is applied to the pressure receiving plate 52, as shown in FIG. 18, bending moment M, shown in FIG. 19 occurs with respect to the cell 53, even if the eccentric load Fz applied to the pressure receiving plate 52 is perpendicular to the pressure receiving plate 52, so that a detection output corresponding to Fy is erroneously derived from the load detection strain gauge in the direction y. The single cell structure also has the disadvantage of mechanical weakness inherent in such a structure and accordingly the inability to endure comparatively heavy forces.

Figure 20:
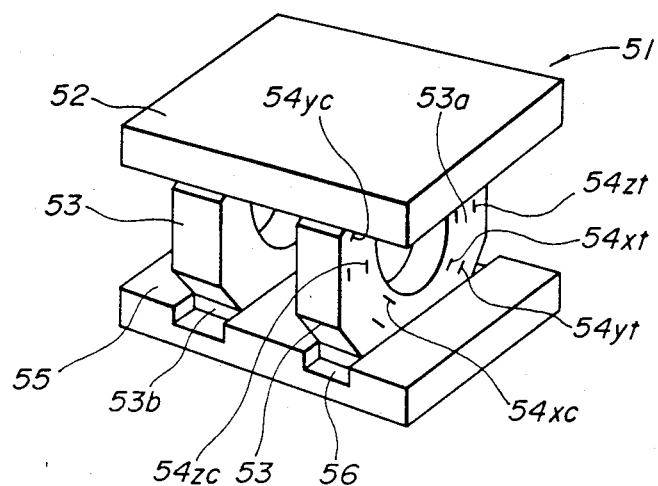
FIG. 20 is a perspective view showing an embodiment of a pressure sensor module having two cells.

FIG. 20 shows an embodiment of a pressure sensor in accordance with the present invention in which two cells for detecting component forces in the three directions are integrated into one pressure sensitive module. This module eliminates the production of the moment that causes the above-described detection error and strengthens the structure of the pressure sensor module. Here, the two ring cells 53 and 53 are arranged between the base plate 55 and the pressure receiving plate 52 in a manner that the sides 53a of the ring cells 53 are in parallel with each other. Extrusions 53b of the rings 53 are engaged in the grooves 56 in the base plate 55 and then secured to the base plate 55 by adhesion or the like. The top ends of the cells 53 are secured to the grooves formed in the pressure receiving plate 52 in the same way.

In this manner, the two cells 53 and 53 are fixed perpendicularly to the top surface of the base plate 55. The pressure receiving plate 52 is secured to the top end of the two cells 53 and 53, which are treated as one set, so that one module 51 is formed. As a result, even if a deflected load in the vertical direction z is applied to the pressure receiving plate 52, as shown in FIG. 18, almost no bending moment, such as that shown in FIG. 19, will be produced. As a result, the sensors 54yt and 54yc for detecting a load in the direction y hardly produce an error output. Also, since the two cells 53 and 53, which are perpendicularly attached to the base plate 55 and the pressure receiving plate 52, receive a load, the pressure sensor module 51 functions as a single, mechanically strong structure with an improved reliability.

Although the parallel type pressure sensor module 51 shown in FIG. 20 satisfies performance requirements and is, in principle, configured to separately detect the component forces of a load without the interference, a number of disadvantages are still found in the fabrication and testing of this configuration. The disadvantages are primarily in measurement accuracy of a component force perpendicular to the surface of the sensor cell, such as the component force Fy in FIG. 10.

The major reason resides in that the sensor cell 53 is not necessarily deformed as expected or intended when force Fy is applied to the sensor cell 53. In other words, although the cell 53 is designed as a fixed beam having both edges fixed to the base plate 55 and the pressure receiving plate 52, as shown in FIG. 21A, it may happen that the cell 53 is deformed like a beam having one free end, as exaggeratedly shown in FIG. 21B, since the rigidity of the pressure receiving plate 52 is not always sufficient and the strength of securing the top end of the cell 53 to the pressure receiving plate 52 most often cannot be increased. When this kind of deformation occurs, a tension strain will actually be applied to the strain gauge for compression strain 54yc in FIG. 13C, resulting in a large error in the measurement of component force Fy.

The second disadvantage is that the precision in fabricating the cell 53, particularly the precision in thickness, has an extreme influence on the measurement of component force Fy. This influence is much larger on component force Fy than on component forces Fx and Fz, and the thinner the thickness of the cell 53 to improve measurement sensitivity, the greater the possibility of a large error in measurement due to a slight fabrication error.

These points can be further explained by mathematical equations. Consider the gauges for measurement of component force Fy, as shown in FIG. 13C, first. If the gauges 54yt and 54yc for detecting strain are arranged as shown, under the assumption that load Fy is applied to the cell 53 from the front side of the drawing of FIG. 13C as indicated by the arrow, and if it is assumed that $\alpha = 39.6°$ in equation (2), then strain is detected in a manner described above;

$$\sigma = 0.77 R \frac{b}{I} Fy. \tag{6}$$

If moment of inertia I is obtained by calculating for the surface parallel to the central edge surface in the direction along the thickness b of the sensor cell 53;

$$I = \tfrac{1}{3} b^3 t \tag{7}$$

At the end position that the strain gauge is mounted, it can be considered as multiplied by coefficient $\beta$, i.e., $$I = \tfrac{1}{3} \beta b^3 t \quad (\beta > 1) \tag{8}$$

and when this moment of inertia I is substituted in equation (2), it becomes, $$\sigma = 0.57/\beta \cdot R/b^2\, Fy \tag{9}$$

Compared this equation to previous equations (4) and (5) for stress $\sigma$ with respect to component forces Fx and Fz, $bt_2$ in the denominator of the equation for component forces Fx and Fz is clearly different from $b^2 t$ in the equation for component force Fy.

Equation (9) above shows that strain is in inverse proportion to the square of thickness b in accordance with stress based upon component force Fy. As a result, this strain is influenced more by the variation in thickness than the strains based on the other component forces Fx and Fz which is inverse proportion to thickness b, while it is difficult to maintain thickness tolerances of silicon wafer.

Figure 22:
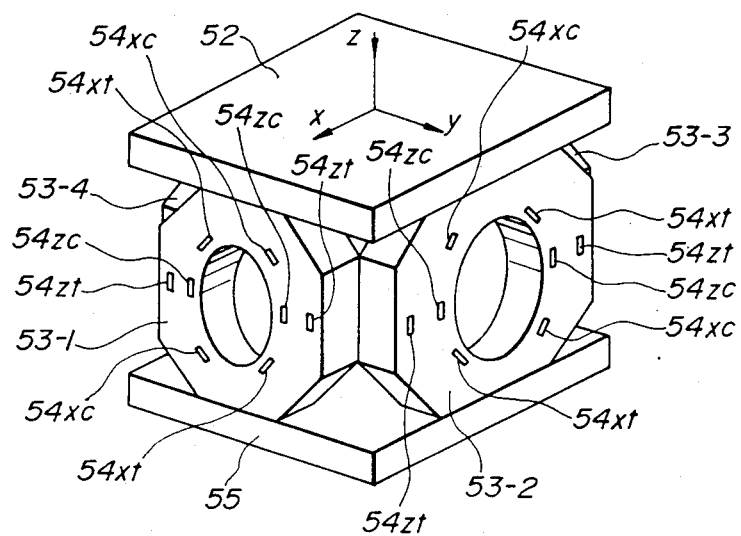
FIG. 22 is a perspective view showing an embodiment of a box-shaped pressure sensor module.
Figure 23:
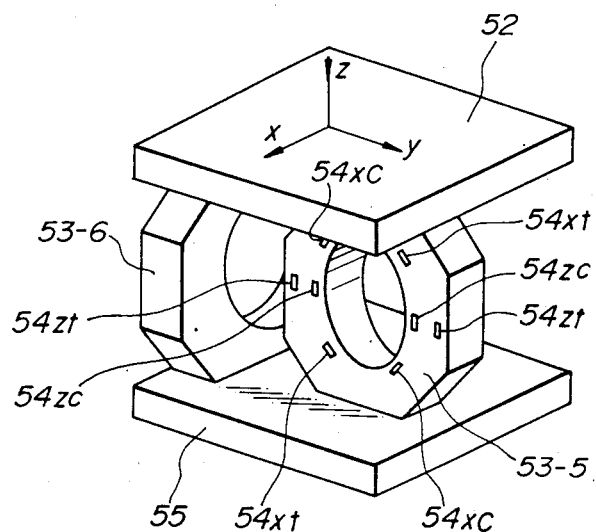
FIG. 23 is a perspective view showing an embodiment of a T-shaped pressure sensor module.
Figure 24:
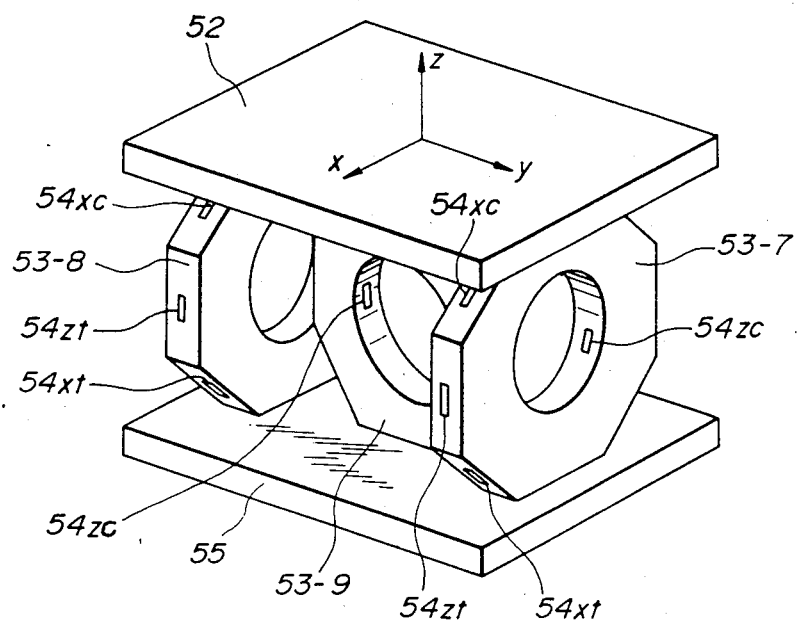
FIG. 24 is a perspective view showing an embodiment of an I-shaped pressure sensor module.

FIGS. 22, 23 and 24 show some arrangements of pressure sensor modules according to the present invention, which are directed to overcome the disadvantages of the parallel type module. These arrangements, under application thereto of a load, can detect or measure the components of force with no interference between or among the components and the least possible difference in its sensitivities to the components. In structure, at least two of the pressure sensor cells as the pressure sensing elements constituting a pressure sensing module are arranged such that, of rings as components of the cell, the adjacent rings are so directed as to have the surfaces orthogonal to each other. Derived from each pressure sensing element is only a signal representing the result of responding to the force component in the direction parallel to the surface of each cell.

Figure 25:
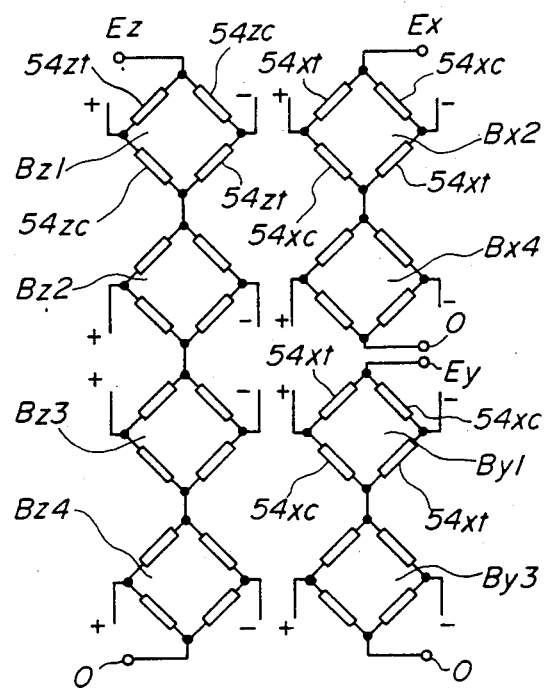
FIG. 25 is a circuit diagram showing an embodiment of the connections of strain gauges in the module shown in FIG. 22.

Appropriately, combining these output signals enables one to obtain a desired component of the load force. With such an arrangement, the measurement of the force components is little influenced by rigidity of the pressure receiving plate, a coupling state of the plate with the cell, and accuracy in the thickness of the cell. In the embodiment in FIG. 22, four cells 53-1 to 53-4 are set in box fashion between a base plate 55 and a pressure receiving plate 52 which are themselves set in parallel. The top of each cell is set and fixed into the pressure receiving plate 52 and the bottom of each cell is set and fixed into the base plate 55. Thus, the surfaces of the cells 53-1 and 53-3 are at right angles to those of the adjacent cells 53-2 and 53-4. Shown on the top of the pressure receiving plate 52 are the three components x, y and z of a load force applied to the pressure receiving surface. As shown, a group of strain gauges 54 is installed on each cell 53-1 to 53-4 which receives the load through the pressure receiving plate 52. Two types of gauge groups are installed on the cell 53-1: the four gauges 54zt, 54zc for detecting the force in the direction z and the four gauges 54xt, 54xc for detecting the force in the direction y. Of the gauges for measuring the force in the direction z, the two gauges 54zt on the outer periphery of the cell 53-1 receive the force in the direction z of arrow and detect tension strain. The remaining two gauges 54zc on the inner periphery detect compression strain. These four gauges are respectively connected to the sides of the bridge circuit Bz1 as shown in FIG. 25. Of the gauges for measuring the force in the direction y, the two gauges 54xt, located at the upper left and lower right portions of the cell 53-1, receive the force in the direction y of arrow and detect tension strain. The two 54xc gauges, located at the upper right and lower left portions of the cell 53-1, receive force in the direction y of arrow and detect compression strain. These four gauges are respectively connected to the sides of the bridge circuit By1 in FIG. 25. Note that all these gauges for measuring the force in the direction y are located at the inner periphery of the cell 53-1, but they can be located at the outer periphery, as described before, if necessary.

The sides of the cell 53-2 adjacent to the cell 53-1 are disposed normal to angles to the surfaces of the latter, as stated above. The four gauges 54zt, 54zc for measuring the force in the direction z are provided as in the previous case. Further, four gauges 54xt, 54xc are installed for measuring the force in the direction x. Strain is detected by these gauge groups as above. The four gauges 54zt, 54zc for z-directional detection are connected to the bridge circuit Bz2 in FIG. 25. The four gauges 54xt, 54xc for x-directional detection, connected to the bridge circuit Bx2. The same applies to the two remaining cells 53-3 and 53-4. The gauges for detecting the force in the directions z and y are provided for the cell 53-3, which are connected, respectively, to the bridge circuits Bz3 and By3 in FIG. 25. Gauges for detecting the force in the directions z and x are installed in the cell 53-4, which are connected, respectively, to the bridge circuits Bz4 and Bx4.

Bridge circuits containing these strain gauges as circuit components are connected, as shown in FIG. 25. For the z-directional component detection, the four bridge circuits Bz1 to Bz4 corresponding to the cells 53-1 to 53-4 are connected in series. For the x-directional component detection, the two bridge circuits Bx2 and Bx4 corresponding to the cells 53-2 and 53-4 are interconnected in series. For the y-directioal component detection, the two bridge circuits By1 and By3 are series connected to each other. By positive and negative signs for power supplies, to each bridge circuit, output terminals of serially connected bridge circuit groups are indicated as Ex, Ey and Ez for each direction x, y, and z, respectively. There are twice as many bridge circuit series connections for the direction z as there are for the directions x and y. As seen the equations (4) and (5), since the gauge sensitivity for the direction z is approximately half that for the directions x and y, the levels of detection signals from output terminals Ex, Ey and Ez in the circuit in FIG. 25 are substantially equal to one another and good for amplification input, etc., in later steps.

The pressure sensor module shown in FIG. 23 is so arranged that the surfaces of the two cells 53-5 and 53-6 are at right angle in a T. As can be easily understood from the explanation of the previous embodiment, in this embodiment, the z-directional force component of a load applied to the pressure receiving plate 52 is detected by the strain gauges 54zt, 54zc of the cells 53-5 and 53-6. The x-directional component is detected by the strain gauges 54xt and 54xc (not shown) of the cell 53-6. Similarly, the force component in the direction y is detected by the strain gauges 54xt and 54xc of the cell 53-5. The number of series connections in the bridge circuits corresponding to these cells are just half that of the embodiment shown in FIG. 25. This embodiment has also the substantially equal levels of the output signals representing the three components in the directions x, y and z.

The three cells 53-7, 53-8 and 53-9 in the embodiment in FIG. 24 are arranged into an I-shaped form, so that the cells 53-7 and 53-8 are in parallel and the cell 53-9 is at a right angle to the other two cells. In gauge connections, for the z-directional component, three bridge circuits containing the strain gauges 54zt and 54zc of the cells 53-7, 53-8 and 53-9 are interconnected in series. For the x-directional component, two bridge circuits containing the strain gauges 54xt and 54xc of the cells 53-7 and 53-8 are series connected to each other. Further, for the y-directional force component detection, a single bridge circuit is provided, including the strain gauges 54xt and 54xc of the cell 53-9. Without modification, detection output levels in this embodiment cannot be equally provided for the three force components as in the previous embodiment.

Figure 26:
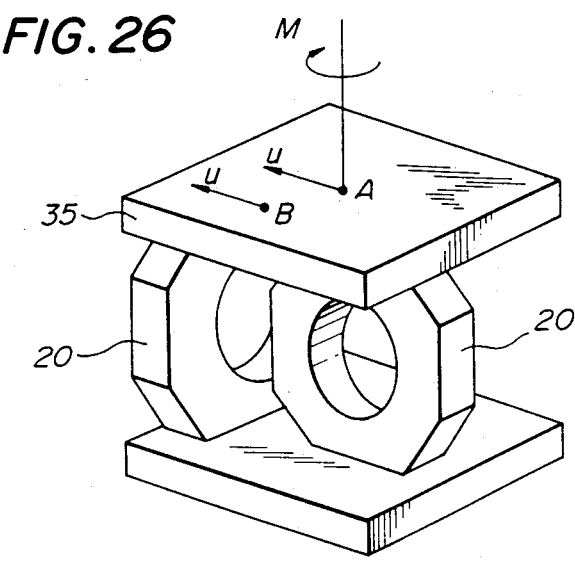
FIG. 26 is a perspective view showing a T-shaped loadcell used in the measurement of a single load.

The pressure sensor module of the type in which a plurality of pressure sensing elements are disposed orthogonal to one another has not been used in the single load measurement because, as will be explained later, problems existed in eccentric load application. Let us consider a pressure sensor module in which two sensor cells 20 as the pressure sensing elements are disposed rectangular to each other, as shown in FIG. 26. If a load is applied, in the direction u of arrow, onto the pressure sensing plate 35 at center A, this is equivalent to a state that the load applied is equally distributed over the entire pressure sensing surface of each sensor 20. There is thus no problem because the total load can be calculated from the loads borne by both sensors 20. But, there is a disadvantage here in that if a load is applied, in the direction u, at a deviated point B, not only will force be applied to the sensor 20 in the direction u, moment M will also be generated, and this will add force to each sensor 20 in the direction other than the direction u and this additional force will become error output. Although the advantages of low interference of that orthogonal type pressure sensor module, have well recognized, its practical application has been considered impossible due to the problems of the deviated load. However, the pressure sensor modules 51, related to the present invention and shown in FIGS. 22 to 24, have a micro-size of a few millimeters or less. Further, in practical use, a number of modules 51 are matrix arrayed with a high density, as in FIG. 8. It can be seen, therefore, that one module 51 has an almost perfectly uniform load distribution in measuring its distributed load state. Consequently, there is no need to take moment into account as in the case of the single load measurement, and the eccentric load application problem is not created. The orthogonal type module, which has been rejected in practical use, can be practically used, enjoying the advantage of low interference from other components.

Figure 27:
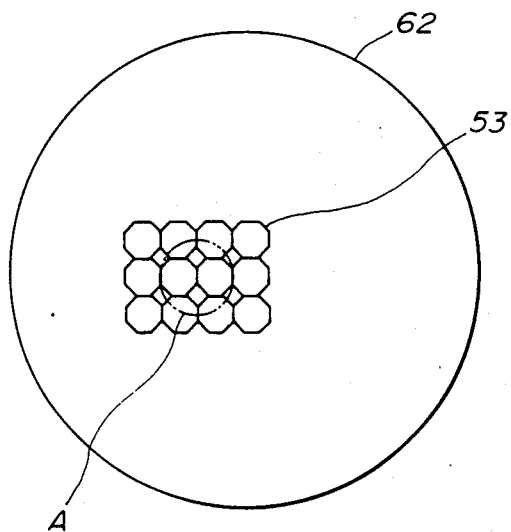
FIG. 27A is a diagram used to explain a fabrication process of pressure sensor cells of the present invention.
FIG. 27B is an enlarged view of cell section A in FIG. 27A.
Figure 27:
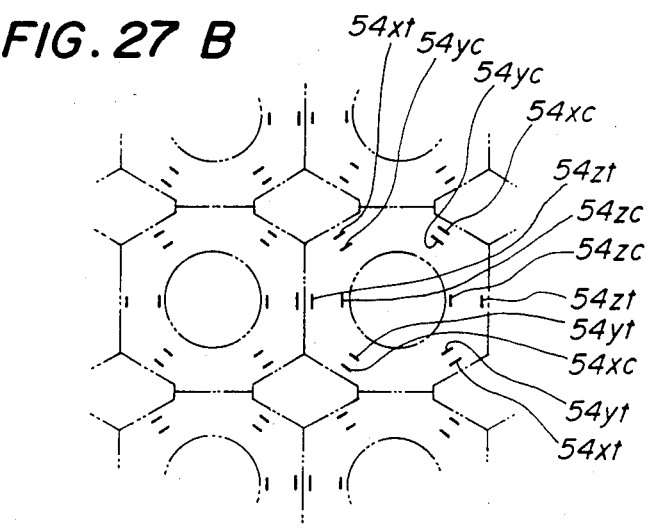

Fabrication of the pressure sensing cells used in the pressure sensor module will be described. Single crystal silicon is used as cell material and the strain gauges can be fabricated on a silicon wafer in the form of so-called diffused strain gauges. More specifically, as shown in FIGS. 27A and 27B, a single crystal silicon wafer 62 having a number of areas 53 thereon for pressure sensor cell units are preapred. The single crystal silicon wafer 62 has a predetermined thickness, e.g. 0.6 mm, and a predetermined specific resistance, e.g., 1 to 10 $\Omega$·cm, and a predetermined crystallographic orientation (the lattice plane of e.g., (111)), and is of a predetermined conductivity type, e.g. N type. Diffused strain gauges as generally designated by 54, which are arrayed as shown in FIG. 12B, and metal interconnection conductors are fabricated on the areas. An appropriate IC fabrication technology (planar technology) may be employed for that fabrication.

This integrated circuit fabrication technology can also be used to fabricate a number of pressure sensor cell units on one wafer 62. Using process means such as automatic dicing saw cutting, e.g., conductor-saw cutting and super-thin resinoid cut grinding, laser processing, etch-cutting or combinations thereof, the pressure sensor cell units can be cut precisely from the wafer, to obtain small (e.g., one millimeter to a few millimeters), excellent characteristic, planar pressure sensor cell units.

The thickness of the cell may be 20% of its diameter; for example, for 3 mm of the diameter, the thickness may be approximately 0.6 mm. Thus, the silicon wafer 62, allowing for these dimensions, can be used as the starting member. For cutting the cells 53 from the wafer, the laser cutting process is available and the cells 53 obtained are of a satisfactorily high degree of precision. The outer periphery of the cut cell, particularly the surface of the outer periphery side, should be polished smoothly to obtain the precision in the outer periphery configuration necessary for measuring a plurality of force components and to eliminate any residual strain in the surface of each cell that could easily result from cutting from the wafer. Usable process for the polishing contains mechanical polishing, such as honing, etc., and an elastic emission process which has appeared recently as a micro fabrication process. Dimension of the inner hole of the cell made of single crystal silicon, should, logically, be as large as possible so as to make it approximate to the outer diameter. But it is desirable for practical purposes that the dimension of the inner hole be on the order of 50 percent of the outer diameter for the requirements of both mechanical strength and load measurement precision.

Pressure sensors having good uniformity of their characteristics can be obtained by fabricating diffused strip strain gauges 54 on the lattice plane {111} of the wafer 62 in which the gauge factor (piezo resistance coefficient) is not dependent on crystallographic orientation. The piezo resistance coefficient of the P type silicon is indicated for three representative lattice planes {100}, {110} and {111} in FIGS. 28A to 28C. In the figures, the solid curved lines indicate piezo resistance coefficients ($\pi l$) on the strain component in the strain gauge lengthwise direction. The curved broken lines are the piezo resistance coefficients ($\pi t$) on the strain component perpendicular to the lengthwise direction of the strain gauge. Note that distance from the origin indicates a magnitude of the piezo resistance coefficient, and that the relationship between sensitivity of silicon strain gauge and piezo resistance coefficient is proportional.

Figure 28:
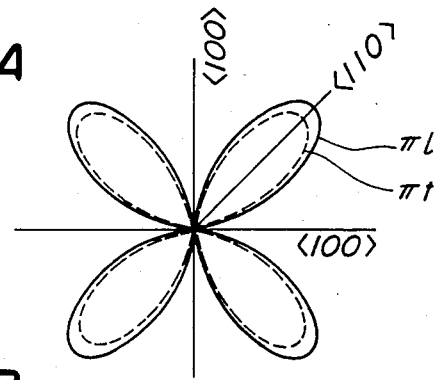
FIGS. 28A, 28B and 28C are graphs illustrating piezo resistance coefficient characteristics for three typical p-type silicon lattice planes {100}, {110} and {111}.
Figure 28:
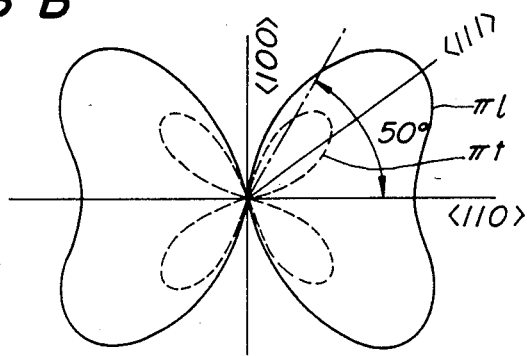
Figure 28:
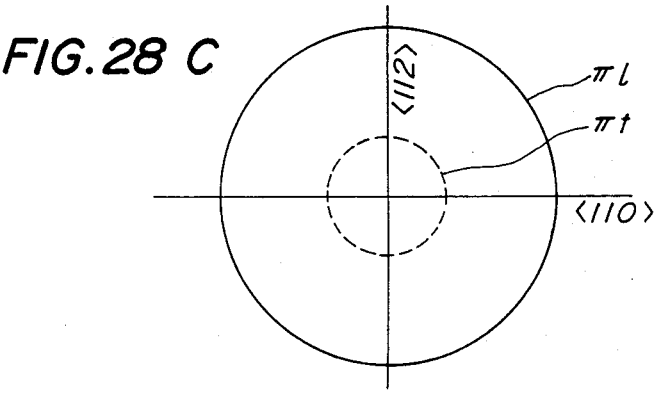

The graphs shown in FIGS. 28A, 28B and 28C, respectively, show distributions of piezo resistance coefficients for the planes {100}, {110} and {111} with respect to the crystallographic orientation. In the plane {100} of FIG. 28A, the sensitivity is distributed in alternating rectangular direction discontinuously or with respect to the crystallographic orientation, largely depending on how the strain gauge is disposed. Therefore, the lattice plane {100} is inadequete for the formation of the strain gauge. In the case of the lattice plane {110} in FIG. 28B, if the strain gauge for the Fz component is formed in alignment with the orientation as given by {110}, the remaining strain gauges for Fx and Fy must be inclined by approximately 50° from the Fz gauge (as indicated by a dot-and-dashed line). Therefore, the sensitivity obtained is limited to be low, and a slight displacement of the strain gauge causes a great fluctuation of the sensitivity, resulting in difficulty of manufacturing pressure sensors which are in good uniformity of the characteristics thereof. FIG. 28C shows that the lattice plane of {111} has a sensitivity distribution being uniform in any crystallographic orientation, viz. not dependent on that orientation or in any orientation of the gauge disposed. This crystal plane can provide pressure sensors with uniform characteristics.

With application of a force to the cell 53 from the base plate 55 as the support member when temperature changes, which the force is other than the force applied to the pressure surface of the pressure sensor cell 53, a strain is generated in the cell 53. In this case, the thermal drift produced from the cell 53 becomes large. To prevent this problem, the material of the base plate 55 is selected to be that with a thermal expansion coefficient approximate to that of the material of the cell 53. If so selected, even at the temperature change, no strain is generated in the pressure sensing structure due to the very small difference of the thermal expansion coefficients of both materials. Of course, the increase of the drift signal due to the stress is minimized.

The base plate 55 on which the cell 53 made of silicon single crystal is fixed, could be fabricated, for example, from crystal silicon similar to the single crystal silicon. In this instance, the silicon of the base plate 55 does not have to be single crystal, but it can be polycrystalline. Since the base plate 55 is made of the same material as that of the cell 53. The base plate and the cells are equally termal expanded under changes in temperature, resulting in producing no stress in the cell 53. However, if the thermal expansion coefficient is not equal but nearly equal, the small difference of thermal expansions under changes in temperature will produce stress in the cell low enough to be negligible. If the material of the cell 53 is silicon, its linear expansion coefficient is $2.5 \times 10^{-6}/°$ C., but another material such as the alloy Invar, semiconductor single crystal or polycrystalline can be used if its linear expansion coefficient is within $2.5 \times 10^{-6} \pm 50\%$.

Figure 29:
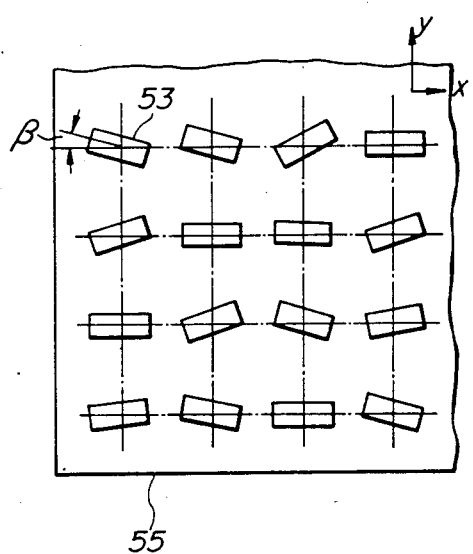
FIGS. 29A and 29B are diagrams showing arrays of pressure sensor cells planted on the pressure sensor base plate.
Figure 29:
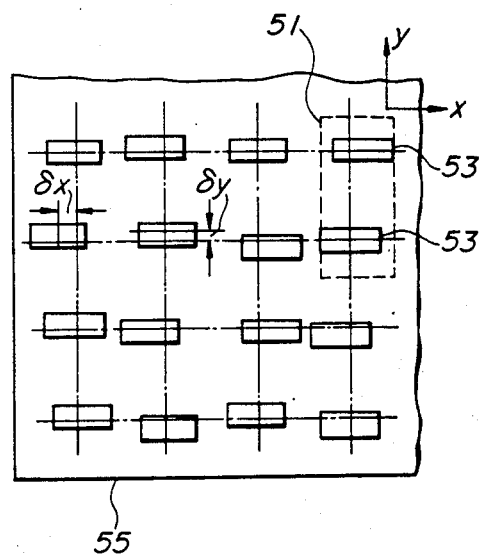

If a plurality of cells 53 as the pressure sensing elements are arrayed on a common base plate 55, as shown in FIG. 29, the attachment precision of the cells to the base plate 55 will have a large effect on the load measurement precision. If, as shown in FIG. 29A, of those arrayed cells a cell 53 is inclined at an angle $\beta$ from the directions x and y for the force component measurements, the output signals from the cell 53 do not indicate the correct components Fx and Fy in the directions x and y.

In an array of the cells 53 shown in FIG. 29B, all of the cells 53 are arrayed having no inclination of the angle $\beta$, but some cells are shifted by $\delta x$ and $\delta y$ in the directions x and y from their correct positions, as shown in FIG. 29B. The thus shifted cells also produce incorrect signals of the force components Fx and Fy, viz. provides measurement error of the components. Particularly, in assembling a basic pressure sensor module as shown in FIG. 20 by coupling a couple of cells 53 and 53 with the pressure receiving plate 52, this error is large or more complex to be harder to correct.

Means to manufacture, in a relatively simple manner, a pressure sensor array which is operable with a good precision and free from the just-mentioned problem of the angle error and deflection error will be described referring to FIG. 30 to FIG. 35.

Figure 30:
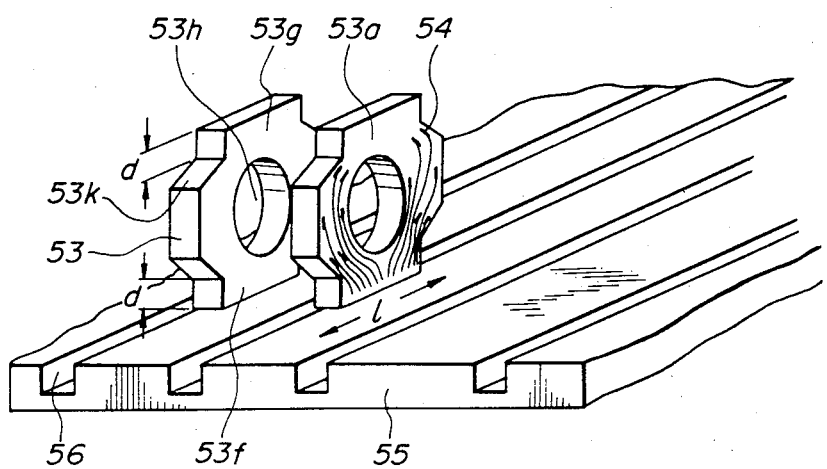
FIGS. 30, 31, 32 and 33 are perspective views showing various steps in fabricating a pressure sensor

A plurality of parallel grooves 56 are cut into the upper surface of the base plate 55, as shown in FIG. 30. A cell 53, which is illustrated as placed on the top surface of the base plate 55 in FIG. 30, has a tab-like projection 53f projecting from the lower part of a ring like cell. The projection 53f has a height d substantially equal to the depth of each groove 56. The cell 53 has also another projection 53g like a tab, which projects from the upper part of the ring like body. The height of the projection 53g is d, and equal to that of the projection 53f. For arraying these cells thus configured, over the base plate 55, the projection 53f of each cell is fitted into the groove 56. The cell array thus formed is free from the angle error $\beta$ shown in FIG. 29A and the deflection error $\delta y$ for the direction y shown in FIG. 29B.

Figure 31:
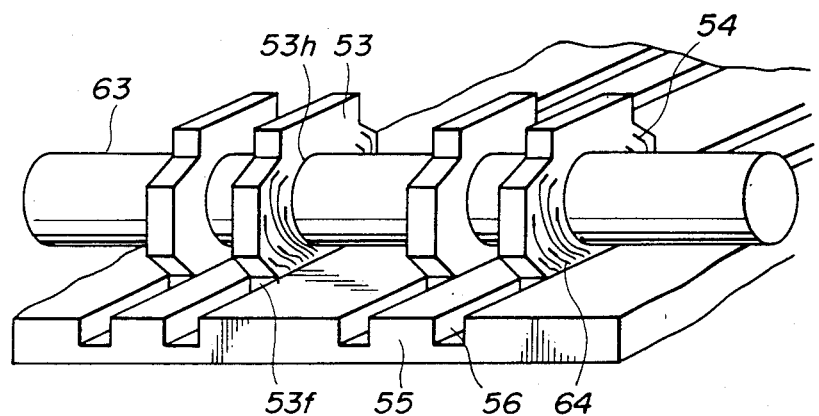
Figure 32:
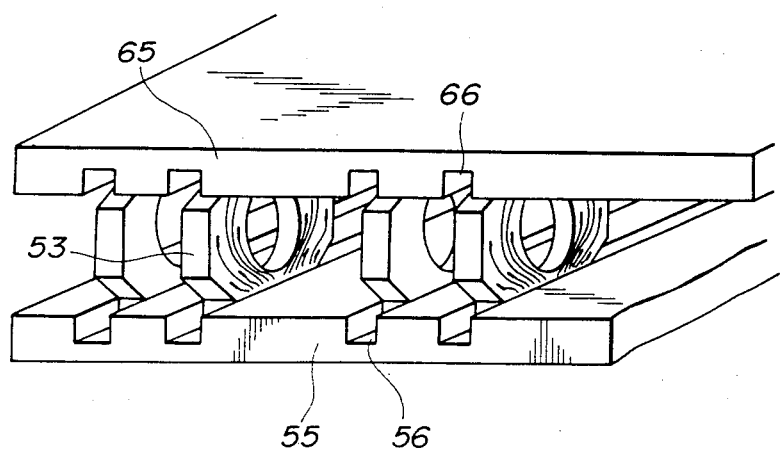

FIG. 31 shows a part of a cell array, with a rod-like member 63 with a circular cross section running through holes 53h of cells 53. The member 63 aligns the cells 53 in rows in assembling the cell array, thereby to eliminate the deflection error $\delta x$ for the direction x. The cells 53 may be set in rows either by first setting the rod-like member 63 in place and then fitting the tab-like projection 53f of the cells 53 into the grooves 56 of the base plate 55, as shown in FIG. 31, or by first fitting tab-like projection 53f of each cell 53 into each groove and then passing the member 63 through the holes 53h. After these cells 53 have correctly positioned in this way, the projection 53f of each cell is fixed into grooves 55. The member 63 may be removed either before or after the fixing operation.

The connecting operation of leading conductors 64 from strain gauges 54 to exterior should be completed at this stage. That connection means will be described later.

As recalled, in this embodiment, each cell 53 has the upper tab-like projection 53g, as shown in FIG. 30. For receiving the projections 53g of cells in assembling the pressure sensor array, grooves 66 are cut into the lower surface of a base pressure plate 65 serving as a base member of the pressure receiving plate 52 shown in FIG. 8. As shown, the base pressure plate 65 is provided common to a plurality of cells 53. One base pressure plate 65 may be used for one pressure sensor array 50 (see FIG. 8). Alternatively, the plate 65 may be divided into several pressure receiving plates so as to make it easy to fit the projections 53g into the corresponding grooves 66. In either case, by fitting the projections 53g of the cells 53 into the grooves 66, a plurality of cells 53 are placed into correct geometrical positions. The projections 53g are then fixed in grooves 66 in the same way as above. Incidentally, the material used for the base pressure plate 65 may be silicon, which is the same as that used for the base plate 55, but if metal is used, the pressure plate will have high mechanical toughness.

Figure 21:
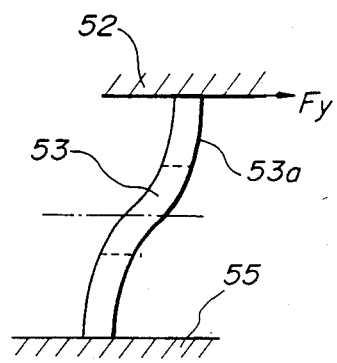
FIGS. 21A and 21B are explanatory diagrams showing the deformation of the pressure sensor module shown in FIG. 20 when a load is applied thereto.
Figure 21:
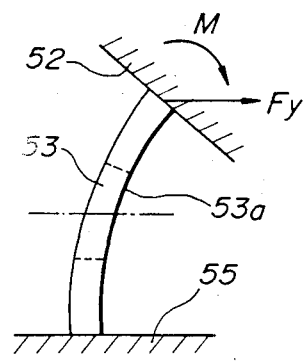
Figure 33:
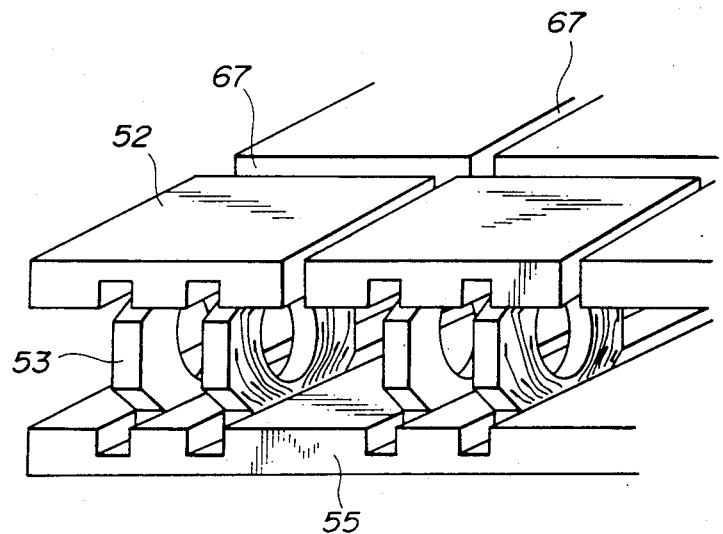

Then, as shown in FIG. 33, the base pressure plate 65 is cut into pressure receiving plate 52 separated by crisscross separations 67. The base pressure plate 65 can be easily cut by diamond cutter, laser cutter, etc. In this embodiment, the base pressure plate 65 is cut so that one pressure plate accommodates and joins two cells 53, i.e., to obtain the basic pressure sensitive element as shown in FIG. 21. A distributed load sensor can be manufactured by the means relatively suitable for mass production. The distributed load sensor has a structure that a plurality of the cells 53 are correct geometrical positions, while being securely joined between the base plate 55 and the pressure receiving plate 52.

Figure 34:
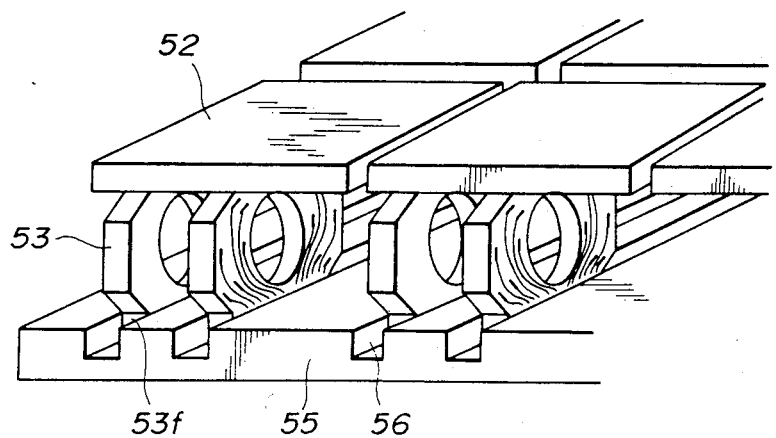
FIG. 34 is a perspective view showing an array; embodiment of a pressure receiving plate in a further embodiment in the present invention.

FIG. 34 shows another arrangement of the pressure sensor array according to the present invention. In this embodiment, the cells 53 are embedded in and joined to the grooves 56 by the tab-like projection 53f, as in the previous embodiment, but there are no grooves in the pressure receiving plate 52 and the plate is joined directly to the top periphery of each cell 53. Consequently, in this embodiment, a flat ungrooved plate is used for the base pressure plate for the pressure receiving plate 52, and it sets on the top peryphery surface of each cell 53, and is matched and joined to each cell 53. The base pressure surface may then be cut into separate pressure receiving plate 52 as shown in FIG. 34. Precision in this embodiment could decline slightly, compared to the previous embodiment, the geometrical locations of the plurality of cells of which are shown in complete form in FIG. 33. But, because the position of each cell 53 is regulated by the grooves 56 and because the cells are already arrayed, adequate geometrical precision is maintained for all practical purposes. This embodiment also has the advantage of eliminating any forcible strain that may remain in the assembled state, and the further advantage, over the previous embodiment, of a simpler assembly process better suited to volume production. Alternatively, although not shown, no grooves are cut into the base plate 55, but grooves are fabricated into the pressure receiving plate 52 or into the base pressure plate. It is evident to those skilled in the art that such arrangement is within the scope of the present invention.

Figure 35:
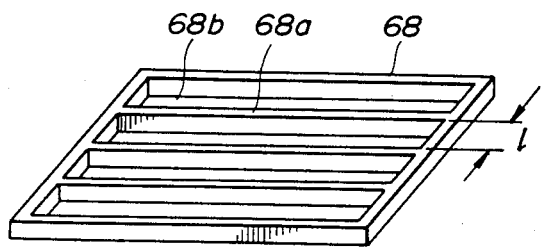
FIG. 35 is a perspective view showing an alignment tool to be used to align pressure sensor cells rows in a yet further embodiment of the present invention.

FIG. 35 shows yet another embodiment of the present invention. Instead of the rod-like member 63 used to arrange the cells 53 in rows in the process in FIG. 31, this embodiment uses an aligning member 68 of the box-frame type having the multiple crosspieces 68a as shown in FIG. 35. The width of each gap 68b between crosspieces 68a is almost equal to the width l of the cell 53 in FIG. 30. Prior to the process step using this aligning member 68, the cells 53 illustrated in FIG. 30 being set on the top surface of the base plate 55 are aligned and freely slidable in the groove direction, i.e., the column direction, when these cells are fitted at the tab-like projections 53f into the grooves 56. The cells 53 are aligned in row direction by inserting the aligning member 68 over the cells from the top in FIG. 30, and placing the cells 53 into the gaps 68b. Each cell 53 has inclining shoulders 53k on the outer peripheral side as shown in FIG. 30. When the aligning member 68 is inserted from the top, the shoulder touches the crosspieces 68a of the aligning member 68, automatically centering and guiding cells into the gaps 68b. The same will occur if the outer peripheral surface of the cell 53 is circular. As can be easily seen, the aligning member 68 in this embodiment is more practically suited to volume production than the aligning member 63 of the previous embodiment.

The above assembly structure can be applied to rectangular modules shown in FIGS. 22 to 24 as well as parallel modules in FIGS. 33 and 34. In these cases, at least one of the grooves 56 of the base plate 55 and the grooves 66 of the base pressure plate 65 is so formed to be a rectangular groove corresponding to module configuration.

However, since each cell 53 is independently separated on the base plate 55 before its assembly, problems arise due to the increased number of assembling and processing steps in forming the pressure sensor arrays 50. At least the following processes are required: engaging one peripheral sides of the cell 53 in the parallel grooves 56 on the base plate 55 to array and set a predetermined number of cells in each groove in an upstanding manner; aligning the upstanding cells 53 set in the column direction of the grooves 56 into the row direction; and fixing one side of each cell 53 set in the grooves 56 on the base plate 55.

Moreover, this type of pressure sensor array requires the highest possible levels of miniaturization in dimensions for high density integration. For example, the size of pressure receiving plate 52 is several millimeters square, but should be reduced to one millimeter or less square if possible. However, that presents problems in the difficulty of accurately performing each process above and making sensors 53 as small as possible at required dimensions because the size of each sensor is extremely small, so that there is the possibility that a yield is reduced, reliability is also reduced and a production cost is increased. Full automation of fabrication and assembly would also be difficult.

Figure 36:
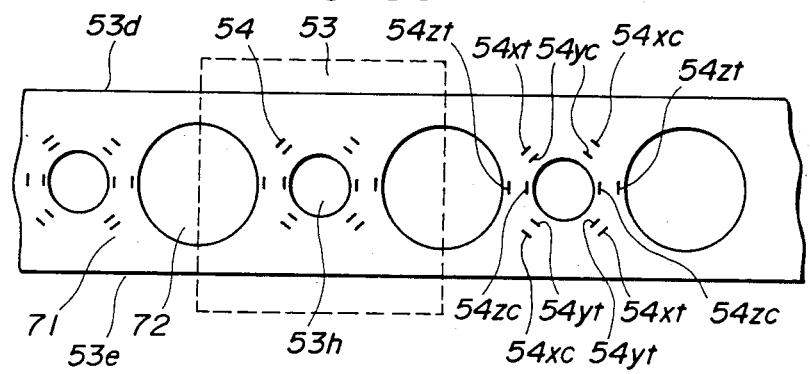
FIGS. 36, 37 and 38 are front views showing embodiments of rectangular pressure sensors in the present invention.
Figure 37:
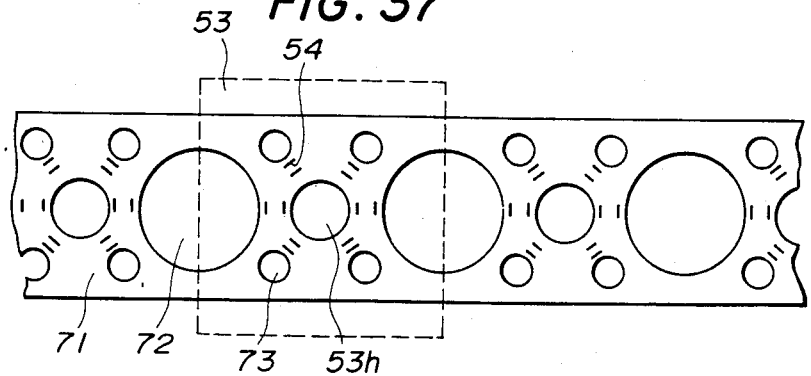
Figure 38:
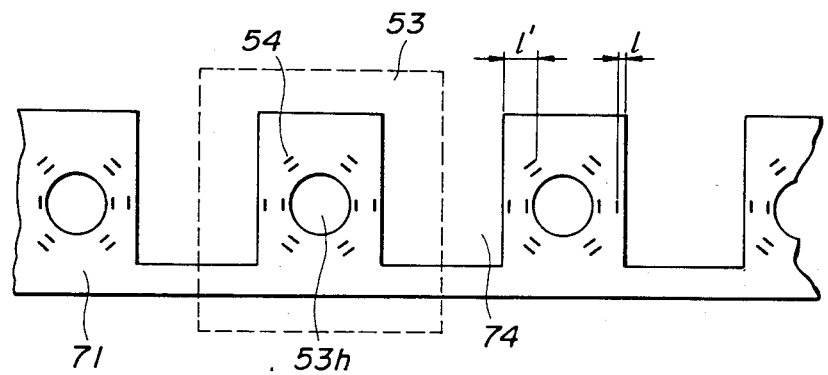

FIGS. 36 to 38 show embodiments of a rectangular cell, which can eliminate the above problems.

In the pressure sensors in FIGS. 36 to 38, since a plurality of cells 53 arrayed in the row direction are configured in sequential rows, and one row of cells is on one rectangular single crystal silicon 71 in an integral fashion, the conventional manufacturing process of arraying, positioning and fitting each cell in the grooves 56 on the base plate 55 are rendered unnecessary. It is sufficient to manufacture the rectangular silicon 71 separately, so that the number of manufacturing steps are greatly reduced, and costs are decreased. In addition, increasing the dimension of the pressure sensing element in the lengthwise direction simplifies the operations of fitting and fixing to the grooves in the base plate increases production yield and reliability and makes full automation of manufacturing and assembling processes easier.

However, if a plurality of cells 53 are separated only by circular holes 72, as shown in FIG. 36, the stress produced in the adjacent cells interfere with each other to produce strain on the adjacent cell, so that the output signal of that cell is affected by such interference. Separating adjacent cells by a plurality of small, round holes 73 as shown in FIG. 37 will still not eliminate the interference completely.

Interference can be eliminated if adjacent cells are isolated by large cut grooves as in FIG. 38, but it would be extremely difficult, using present processing technology, to raise the precision of positioning and dimensions of cut grooves 74 to a level comparable with that of the above round holes 72. For this reason, the precision of distances l and l', from the cell periphery to the strain gauge 54, would worsen and the outputs of the cells would not be uniform.

Figure 39:
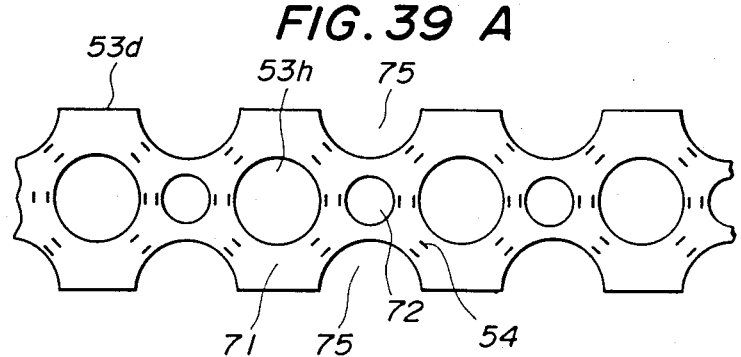
FIGS. 39A, 39B and 39C are plan views showing another embodiment of an improved rectangular pressure sensor and a fabrication process thereof.
FIG. 39D is a perspective view showing the rectangular pressure sensor shown in FIG. 39C.
Figure 39:
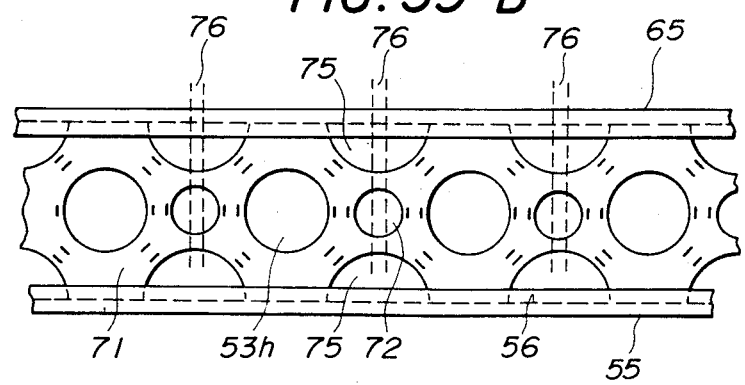
Figure 39:
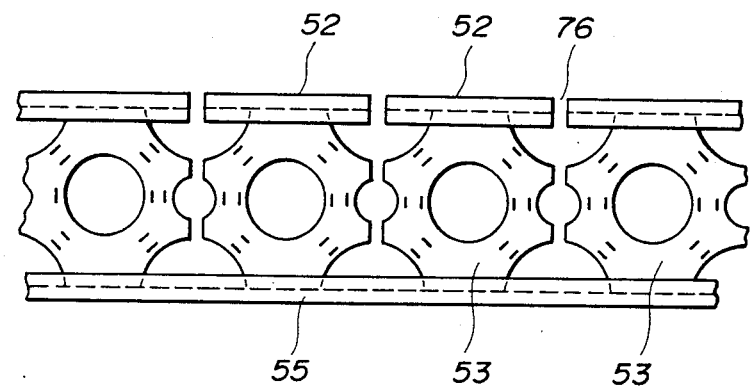
Figure 39:
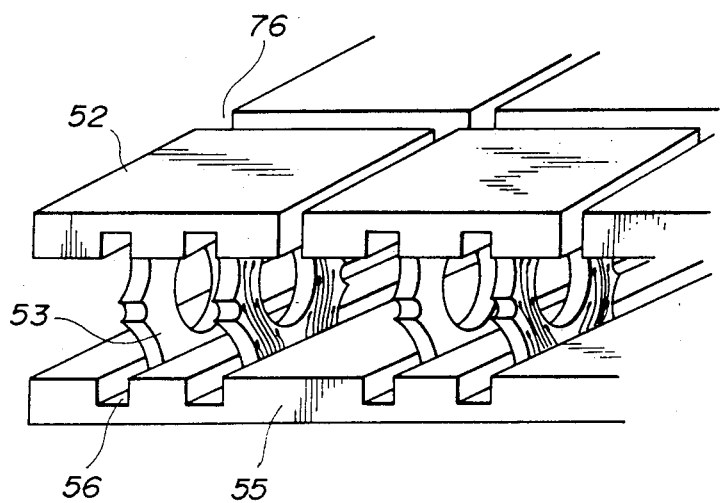
Figure 40:
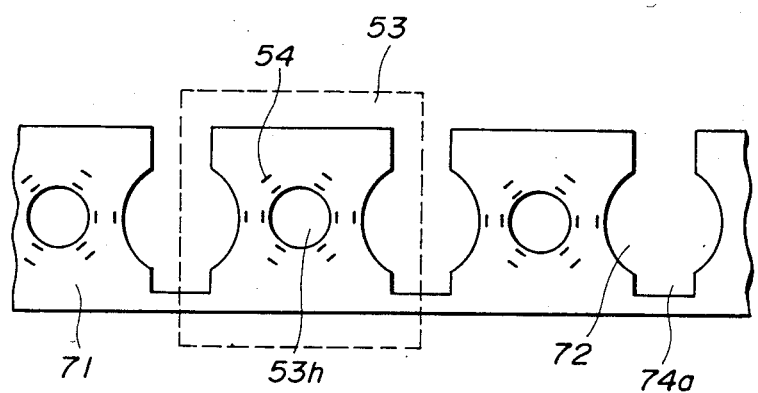
FIGS. 40A, 40B and 40C are plan views showing a rectangular pressure sensor in yet another embodiment and a fabrication process thereof.
FIG. 40D is a perspective view showing the rectangular pressure sensor shown in FIG. 40C.
Figure 40:
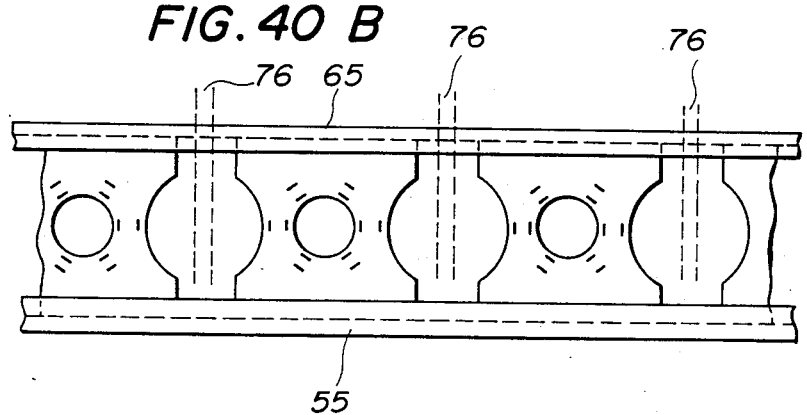
Figure 40:
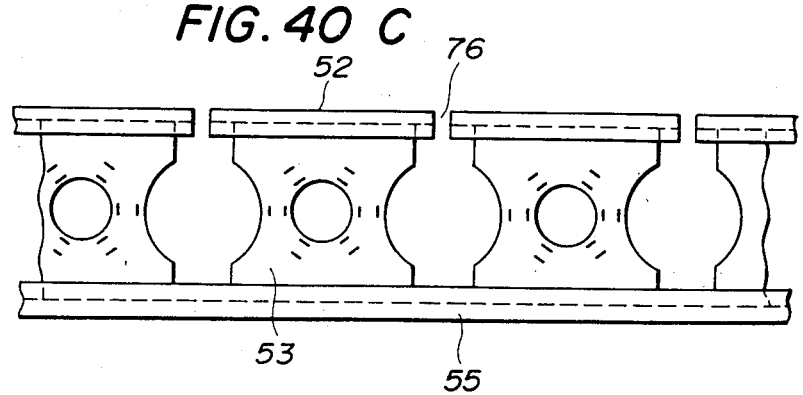
Figure 40:
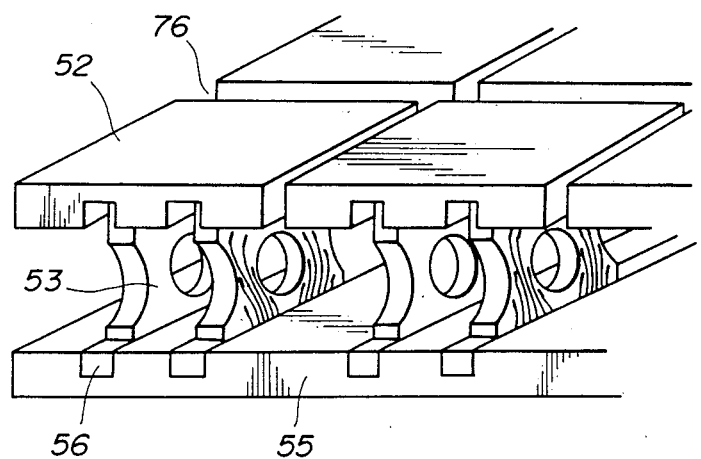

FIG. 39 and FIG. 40 show embodiments of a simply fabricated pressure sensor in which round holes ensure positional and dimensional precision and small cut grooves interrupt and eliminate the interference of one cell from the adjacent cell.

As shown in FIG. 39A, round holes 53h for cell configuration and semi-circles 75 and round holes 72 for cell separation are formed, alternately, in a rectangular single crystal silicon 71, and strain gauges 54 are formed around the periphery of each round hole 53h for cell configuration. Laser and diamond drill processing can produce round holes 53h, 72 and 75 with high precision. Alternatively, the holes 53h, 72 and 75 may be cut after the strain gauges 54 have been fabricated in the rectangular single crystal silicon 71.

Then, as shown in FIG. 39B, the rectangular single crystal silicon 71, in which the cells are formed in rows are arrayed side by side and joined to the base plate 55, the pressure surfaces 53d thereof being at the top. The base pressure plate 65 for the upper pressure receiving plate 52 is set on and joined to the top of the rectangular single crystal silicon 71. Then, as shown in FIGS. 39C and 39D, the adjacent cells are isolated from one another, along with the base pressure plate 65, by separations 76 which are cut so that they pass through holes 72 and 75 used for cell separation. Separations 76 may be cut either by thin abrasive cutter or laser.

High positional precision and dimensional precision is acquired because the only process here that will affect the strain gauges 54 is the high precision fabrication of the round holes 72 and 75 which can be fabricated at high precision. Thus, problems of worsened distance precision from the outer periphery of the cells to the strain gauge and non-uniform outputs from the cell are solved. Interference between the adjacent cells is interrupted by small cut separations 76.

FIGS. 40A to 40D show another embodiment of the pressure sensor array according to the present invention. FIG. 40A shows that rectangular notches 74a for cell isolation are cut into the bottom edges of large diameter holes 72 after circular holes 53h for configuring cells and large diameter circular holes 72 for isolating cells have been cut in alternate positions in a rectangular single crystal silicon 71. The other diagrams show the configurations similar to those in FIGS. 39A to 39D and thus a detailed explanation thereof can be omitted. A slight error may occur in the present embodiment in detecting the force normal to the major surfaces strip of the rectangular single crystal silicon 71, but the number of fabrication steps is less than the embodiments in FIGS. 39A to 39D.

The embodiment of the basic configuration of the pressure sensor array 50 was shown in FIG. 8. In this configuration, when adhesive is used to join the pressure sensitive modules (pressure sensor modules) 51 arranged in high density, array form (matrix form) to the common base plate 55, and when the pressure sensitive modules 51 are wired on the base plate 55, this configuration involves the following deficiencies:

(1) Size of the base plate must be changed according to pressure sensor specifications, and wiring patterns must be redesigned to accommodate the change.

(2) If one pressure sensitive module becomes defective for any reason after a pressure sensor array has been assembled, replacing just the defective module is difficult. The entire pressure sensor array must be changed leading to consequent yield reductions.

FIGS. 41 to 44 show unitized pressure sensor arrays that eliminate the above deficiencies.

Figure 41:
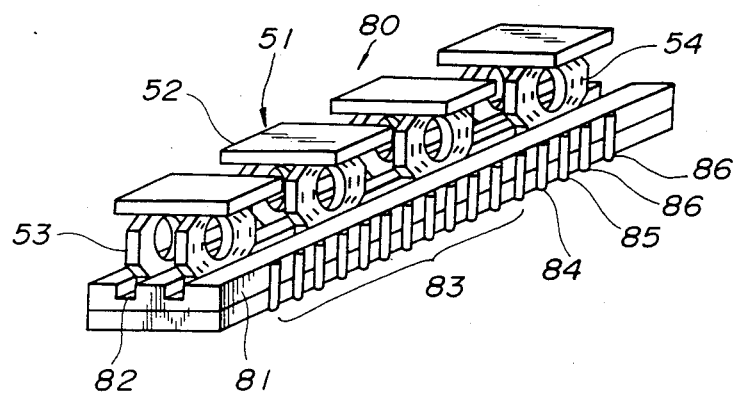
FIG. 41 is a perspective view showing an embodiment of the pressure sensor unit configuration in accordance with the present invention.

In FIG. 41, 80 is the pressure sensor unit and a plurality of (e.g., four) pressure sensitive modules 51 are arrayed in one row on the top of the base plate 81. In this case, a secure assembly is obtained by perpendicularly embedding and fixing the lower sides of the pressure sensitive cells (pressure sensor cells) 53 into the parallel grooves 82 or into mounting holes (not shown) in the top side of the base plate 82.

Figure 42:
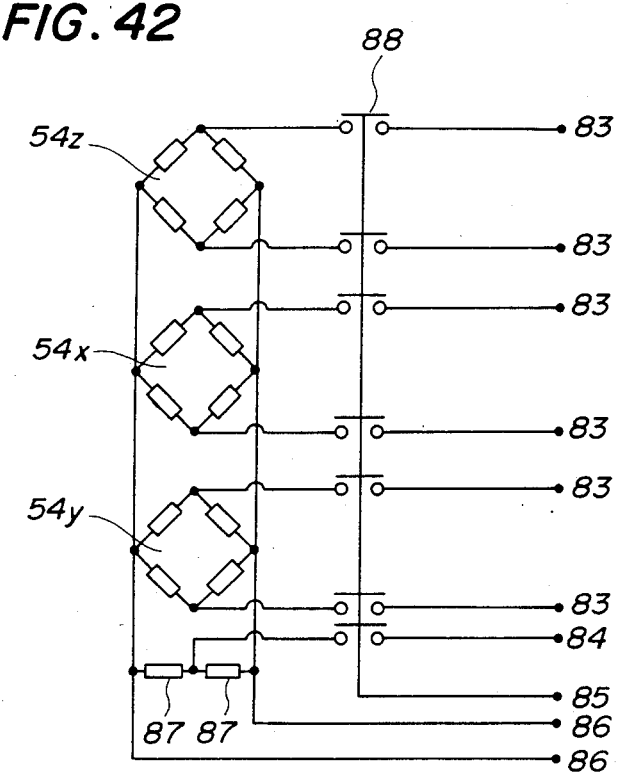
FIG. 42 is a circuit diagram showing one embodiment of a wiring in one of the pressure sensor modules shown in FIG. 41.

Wiring within the pressure sensitive modules 51 of the pressure sensor unit 80 is shown in FIG. 42, as an example. If a single power supplying is used commonly for strain gauge bridges 54x, 54y and 54z in one pressure sensitive module 51 that detects three components of force Fx, Fy and Fz applied to the pressure surface, the number of terminals from these bridges is a total of eight terminals: six output terminals 83 and two power terminals 86. For each pressure sensitive module 51 or pressure sensor unit 80, additional terminals are used; a temperature detection terminal 84 connected to a temperature sensing element (e.g., a thermistor) 87 and a control terminal 85 connected to a semiconductor switch (e.g. MOS switch) 88. The temperature sensing element 87 is incorporated in the base plate 81 or the pressure sensitive module 51, and the MOS switch, etc., 88 is incorporated in the base plate 81 or the pressure sensitive module 51, so that the ON/OFF of the temperature detection output and the bridge output are controlled for each pressure sensitive module 51 or each pressure sensor unit 80.

The external terminals 83–86 may be formed by either of the known two connecting systems, the leadless chip carrier connection and a pin grid array connection.

Figure 43:
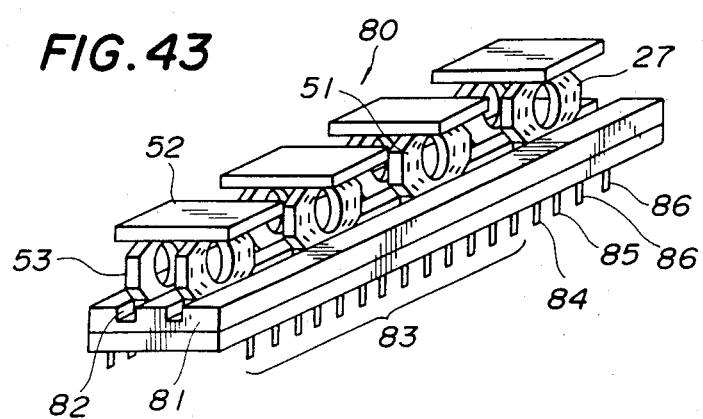
FIG. 43 is a perspective view showing another embodiment of the pressure sensor unit in accordance with the present invention.

In the leadless chip carrier connection, connections are placed in the side surface of the base plate 81, as shown in FIG. 41. In the pin grid array connection, connections are planted in pin form in the bottom surface of the base plate 81 as shown in FIG. 43. Internal terminals, for connecting the external terminals 83 to 86 to the terminals of each pressure sensitive cell 53, are previously formed in the grooves 82 of the base plate 81. The pressure sensitive cells 53 are matched to the positions of those internal terminals and assembled into grooves 82.

Figure 44:
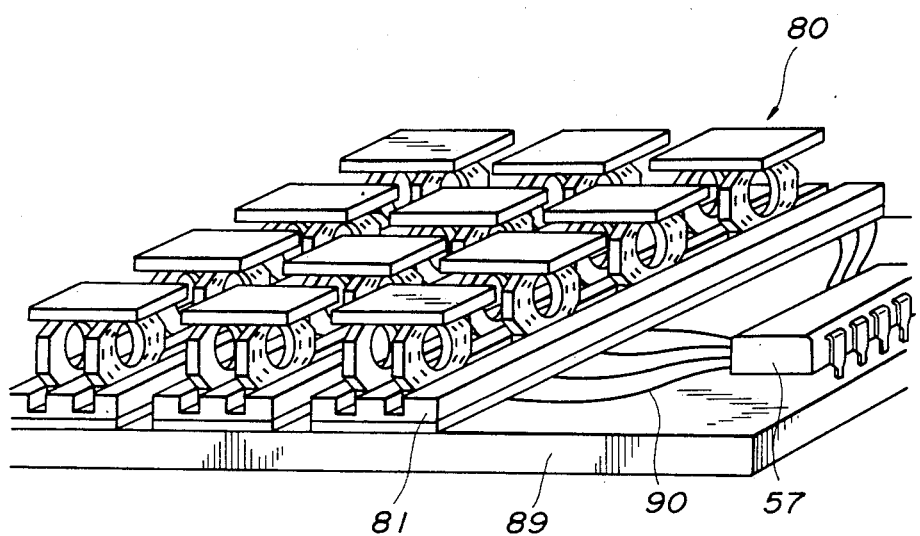
FIG. 44 is a perspective view showing an embodiment of a pressure sensor array unit in accordance with the present invention into which the pressure sensor units shown in FIG. 3 are incorporated.

Next, as shown in FIG. 44, the pressure sensor units 80 are arranged on a motherboard 89 made of ceramics, etc., in numbers as required by specifications, and connected thereto by a connection means having mechanical strength comparable with that of the leadless chip carrier means or the pin grid array means, thereby fabricating the pressure sensor meeting the pressure sensor specifications. Note that conductors are printed on the motherboard in advance.

The pressure sensor units 80 on the motherboard 89 can be easily removed and replaced if the above leadless chip carrier means is employed, because the pressure sensor units 80 are fixed to the top of the motherboard 89 by direct connection through bonding, soldering, etc., of connection terminals on the motherboard 89 to the external terminals 83 to 86 projecting from the side surface of the the base plate 81.

The pressure sensor units 80 on the motherboard 89 can also be more easily removed and replaced if the above pin grid array means is employed, because the pressure sensor unit 80 is fixed in place by embedding and tightly fitting the external terminals 83–86 (See FIG. 43) like pins projecting from the bottom surface of the base plate 81 into the connection terminals in the form of holes opened in the motherboard 89. For assembling the pressure sensor, both the connection systems require only setting the pressure sensor units 80 in the above ways, without any further wiring.

Figure 45:
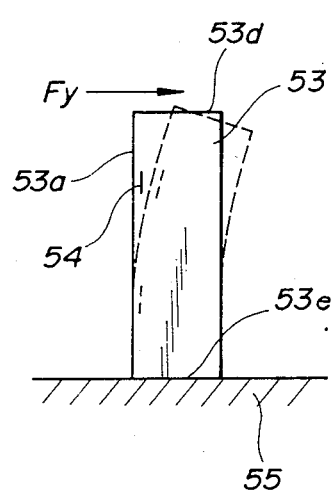
FIG. 45 is a front view showing undesirable deformation occurring in case of a single cell type pressure sensor module.
Figure 46:
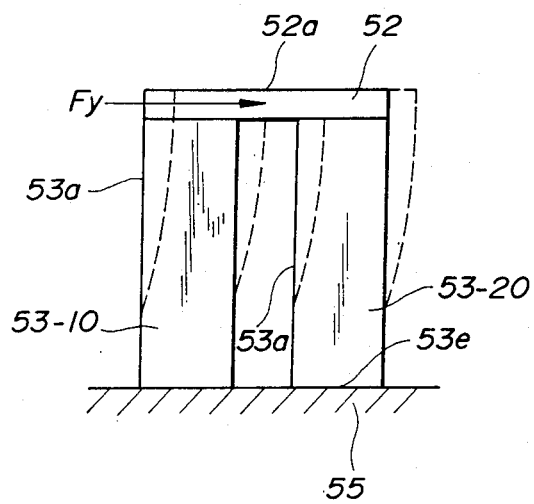
FIG. 46 is a front view showing the deformation when a force is applied to a dual cell type pressure sensor module.

Fabrication positions desirable for strain gauges 54 will now be described. If one module 51 is made up of a single cell 53, when a load is applied to the cell 53 in the direction y, the pressure surface 53d may be deformed to no longer be parallel to the surface of the base plate 55, as indicated by a broken line in FIG. 45. If so deformed, the y-directional load can no longer be detected. To avoid this problem, two single cells are used, and the major surfaces 53a of each single cell 53-10 and 53-20 are perpendicular to the surface of the base plate 55, as shown in FIG. 46. The pressure receiving plate 52 is set on the tops of both single cells 53-10 and 53-20. The top surface 52a of the pressure receiving plate 52 is used as the pressure surface. When such a measure is taken, the force applied to the two cells 53-10 and 53-20 may be unequal. Therefore, any effort is required to accurately detect the force from the unequal output voltages from the cells. However, for fabricating strain gauge groups 54 on both sensors, as shown in FIG. 12B, the number of process steps required is double that required for a single cell, resulting in increase of cost.

Figure 47:
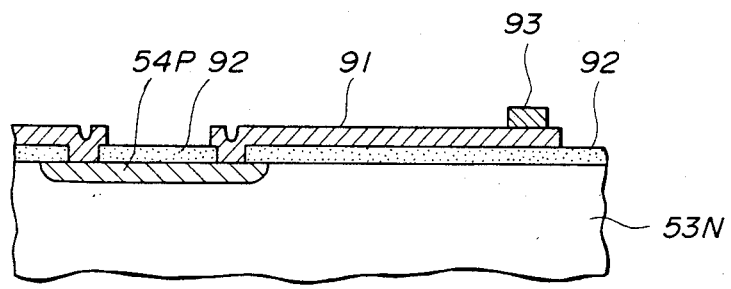
FIG. 47 is a cross sectional view showing an embodiment of the wiring in a pressure sensor cell.

Another important factor to determine pressure sensor reliability is the reliability of pressure sensor wiring. To be more specific, since wiring for input and output to and between strain gauges on the surface of pressure sensitive cells 53 is fabricated on the surface of the structure, strain in the cell 53 will affect the wiring, and resistance changes or disconnection in wiring due to the strain greatly reduce reliability. Such wiring 91 is fabricated from metal thin film, which contacts a strain gauge area 54P on the substrate 53N, has a terminal 93 at one end and is insulated in other sections by an oxide film 92. To form three bridge circuits using twelve strain gauges, however, the wiring as shown in FIG. 12B formed by an interconnection conductor 91 in FIG. 47 is required.

Figure 48:
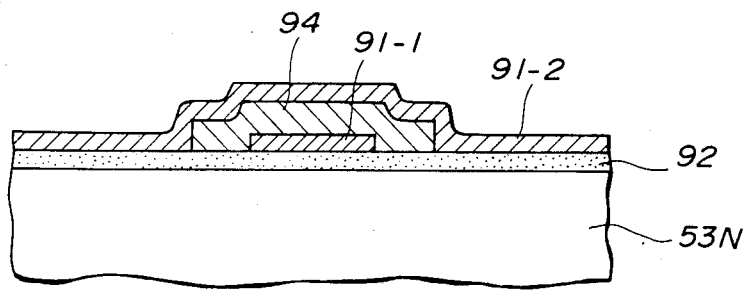
FIG. 48 is a cross sectional view showing a crossover portion in the wiring.

An example of such wiring is illustrated in FIG. 48. As shown, this wiring needs 39 crossovers where one conductor 91-2 must be provided over the other conductor 91-1 through an insulating layer 94. Particularly, when the crossover lies on the lower part of the cell 53 (the lower part has a large strain), the reliability of the wiring is problematic because of the presence of the strain.

Figure 49:
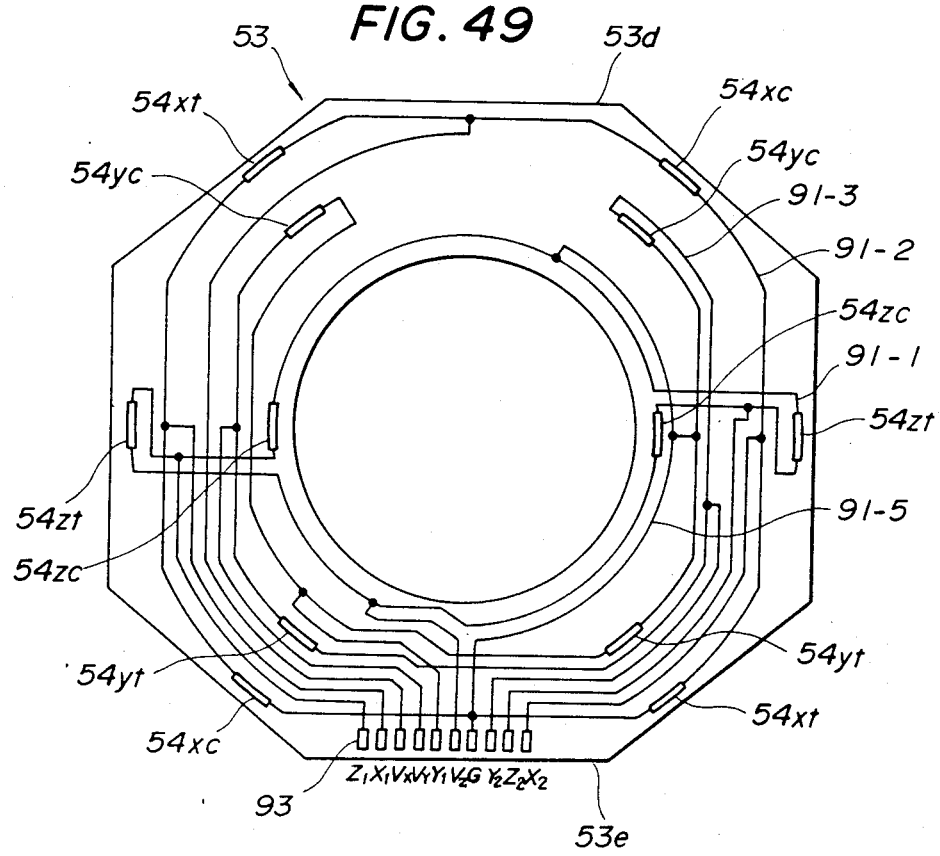
FIGS. 49 and 50 are schematic views showing embodiments of the prior art wirings in the pressure sensor cells.

In FIG. 12B, Vx, Gx, Vy, Gy, Vz and Gz are plus or minus power terminals, respectively. A wiring system of the type is shown in FIG. 49, in which on one main surface of the cell chip, one of the power terminals is grounded (earth terminal G), and other power terminals are independently provided as positive terminals (Vx, Vy, Vz), needs 35 crossovers.

Figure 50:
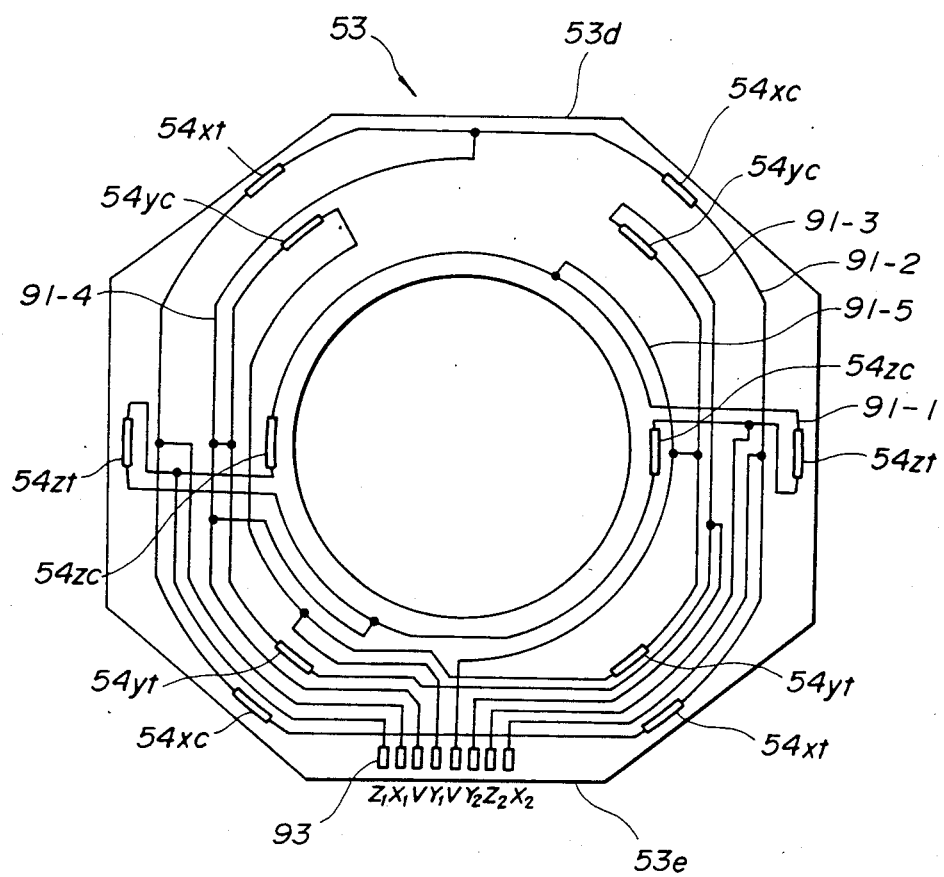

Another wiring system of the type is shown in FIG. 50, in which on one main surface of the cell chip, the power terminals (positive and negative terminals V and V) are used common to the respective bridge circuits, also needs a number of crossovers, i.e., 31 crossovers. To cope with this problem, the crossovers in the wiring are located at the right and left sides and the lower side of the pressure sensing cell. The right and left locations are selected at the midpoint between the strain gauges for detecting the component of force Fz in the vertical direction. These locations so selected are subjected to relatively low strain, eliminating most of the adverse effect of strain upon the reliability of wiring at the crossover points. The lower side location undergoes relatively large strain. In the crossovers located here, resistance change and disconnection of conductor are easy to occur.

Figure 51:
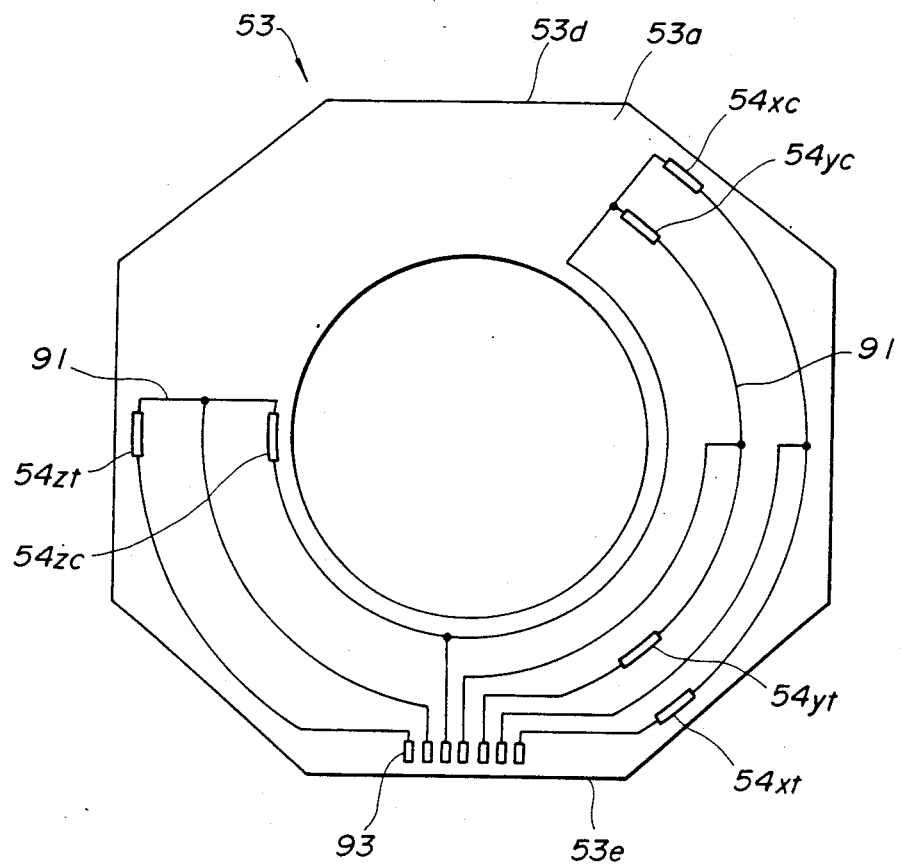
FIG. 51 is a schematic view showing a wiring in the pressure sensor cell in the present invention.

FIG. 51 shows one embodiment of the cell 53 which successfully eliminates the problems as stated above. A conductor 91 connects a terminal 93 to the strain gauge 54. Strain gauges 54zt and 54zc for detecting the force component Fz, strain gauges 54xt and 54xc for detecting the force component Fx, and strain gauges 54yt and 54yc for detecting the force component Fy are fabricated on the main surface 53a of each cell unit 53. Imbalanced forces on the two cell units can be compensated if a full bridge is configured using two cell units to detect the force components Fx, Fy and Fz. The wiring by the conductor 91 in this cell 53 is extremely simplified, when compared with that by the conductor 91 in the cell 53 in FIG. 12B, and, in particular, the crossovers presenting reliability problems and increasing steps required in fabrication are reduced to zero and the number of the terminals 93 are reduced from 8 to 7. Imbalanced force applied to both cells 53 is compensated because the bridge circuit for detecting three force components applied to the pressure sensor module 51 consisting of the two cell units 53 and 53, is divided into two circuits, and these bridges are allotted to the two cells, respectively. Strain gauge numbers are halved and wiring density is greatly decreased compared to when each cell 53 has a full bridge. Elimination of crossovers means reduced fabrication steps, upgraded reliability, and extremely small pressure sensor cells at low cost. In addition, reduced wiring density provides greater room on the semiconductor chip of the pressure sensing structure to form other elements such as temperature sensing devices and analog switches.

Figure 52:
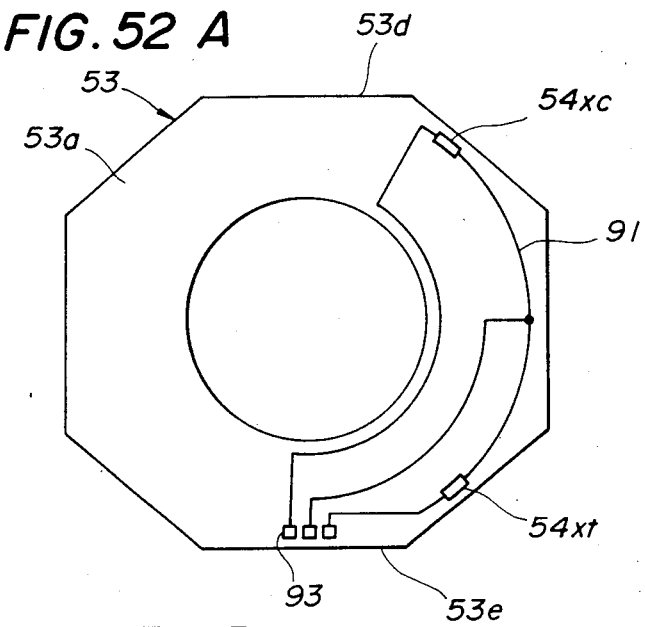
FIGS. 52A and 52B are schematic views showing wirings on opposite main surfaces of a pressure sensor cell in another embodiment of the present invention.
Figure 52:
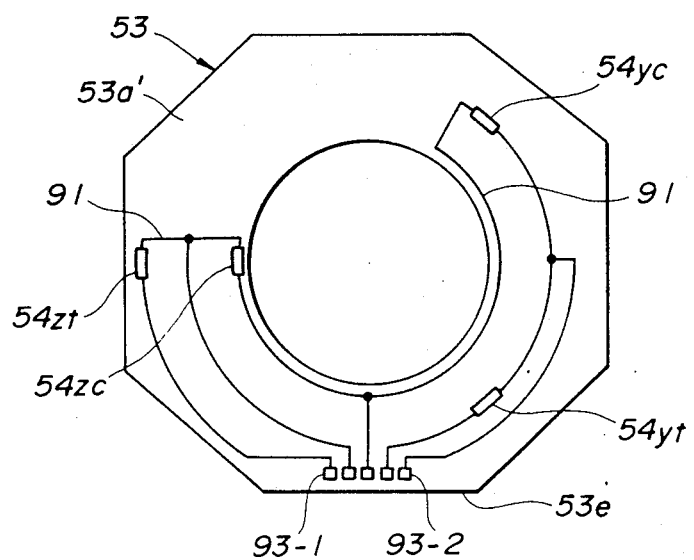
Figure 53:
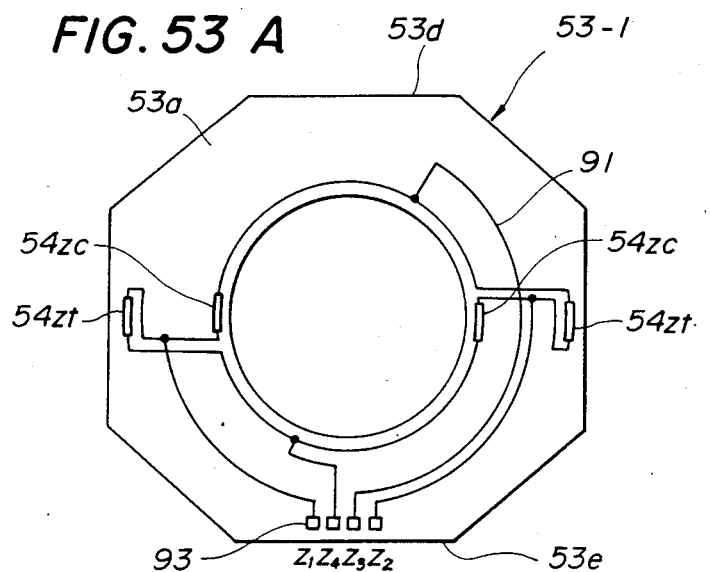
FIGS. 53A and 53B are schematic views showing the surfaces of two pressure sensor cells in the present invention.
Figure 53:
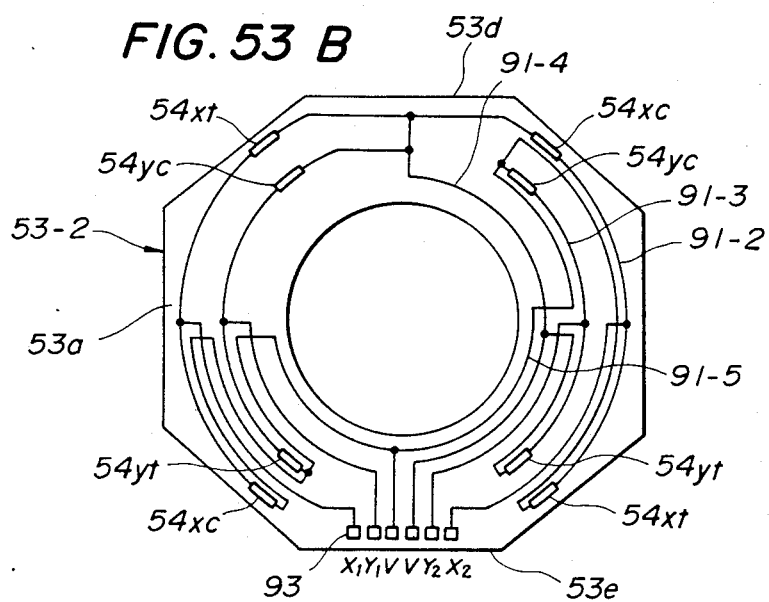
Figure 54:
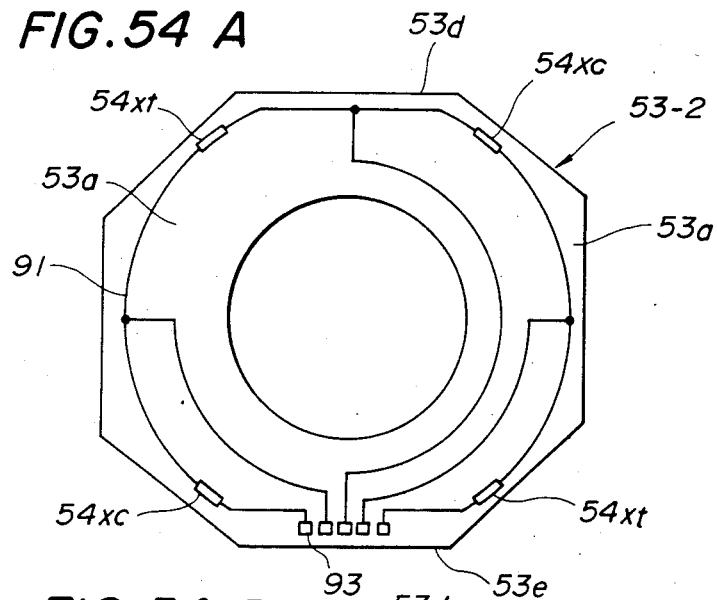
FIGS. 54A and 54B are schematic views showing both the opposite surfaces of the other pressure sensor cell in another embodiment.
Figure 54:
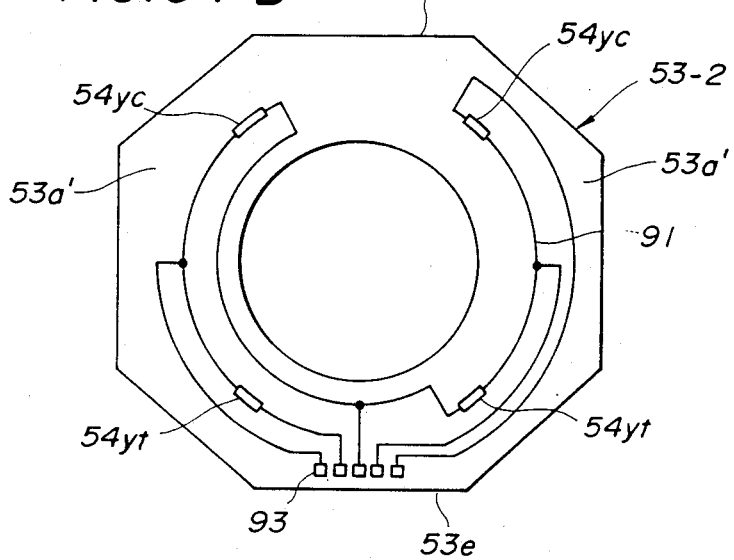
Figure 55:
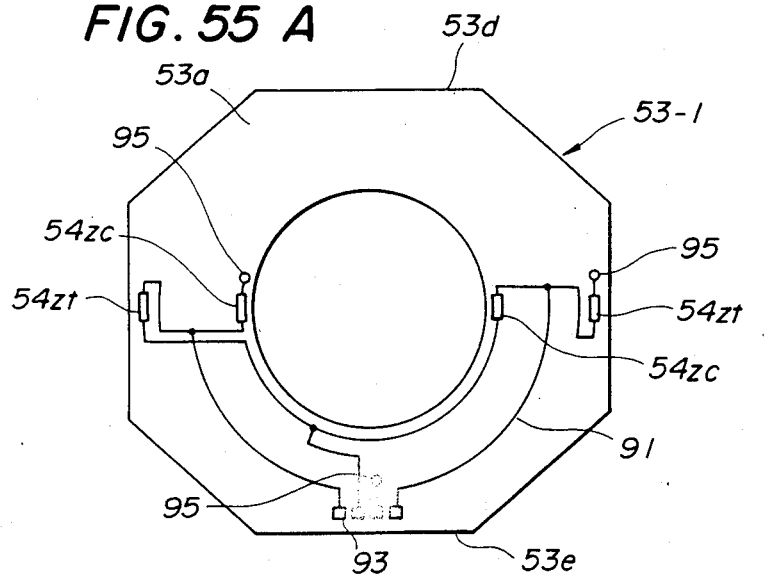
FIGS. 55A, 55B are schematic views showing respective two pressure sensor cells in a further embodiment.
Figure 55:
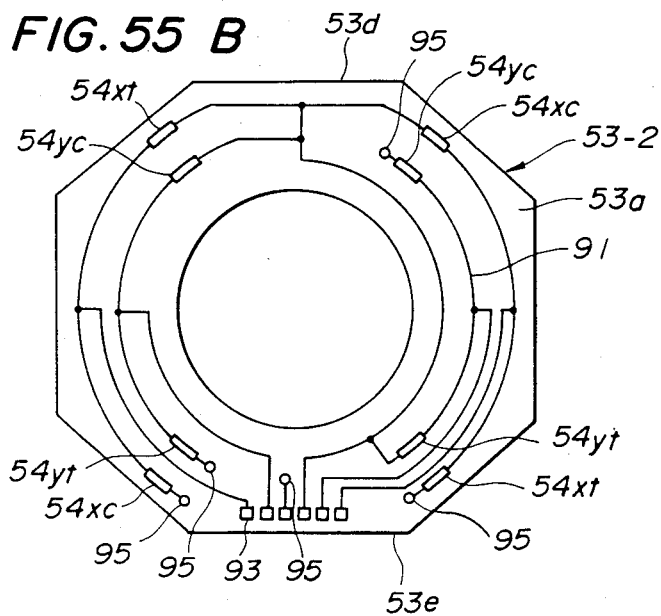
Figure 56:
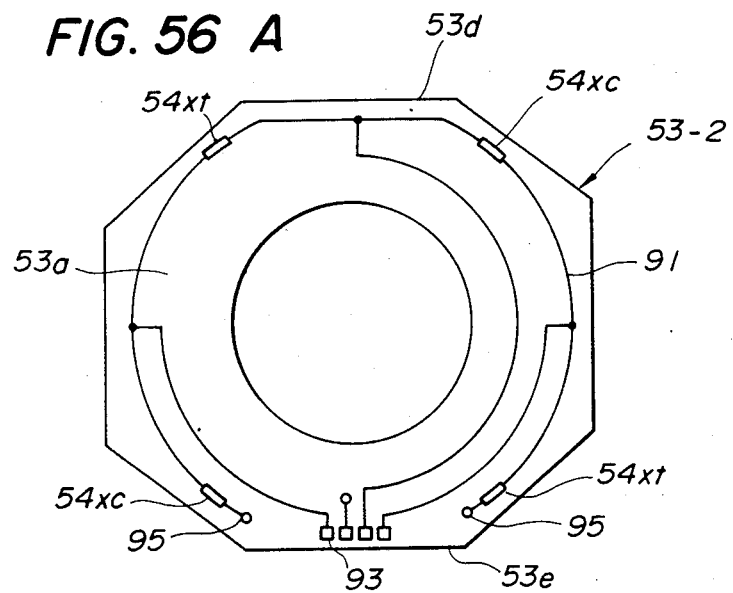
FIGS. 56A and 56B are schematic views showing respective two opposite surfaces of a pressure sensor cell in a yet further embodiment.
Figure 56:
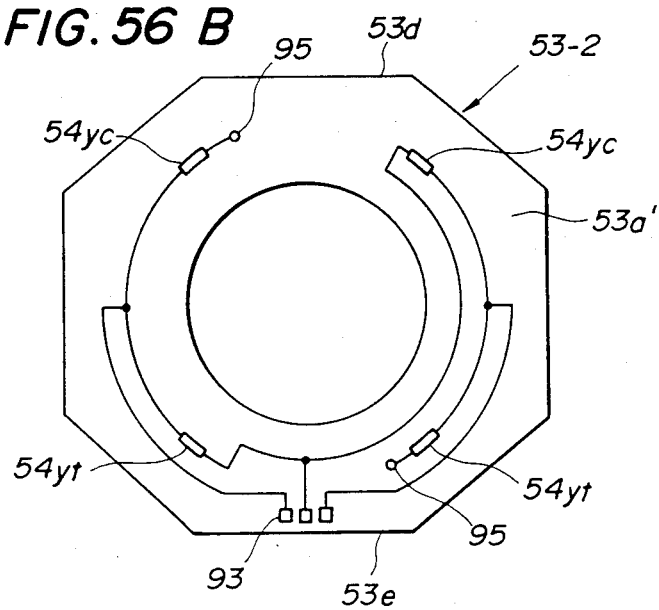

FIGS. 52A and 52B show yet another embodiment having a half bridge for detecting the component Fx on one main surface 53a of the cell 53 (FIG. 52A) and another half bridge for detecting the components Fz and Fy on the opposite main surface 53a of the cell 53 (FIG. 52B). This embodiment is advantageous over the embodiment of FIG. 47 in that the number of terminals is further decreased. If an epitaxial wafer, having conductive type epitaxial layer different from that of the substrate, is used, the two ground terminals 93-1 and 93-2 can be reduced into one ground terminal because the substrate can be used for ground conductors.

FIGS. 53 to 56 show other embodiments of the present invention, in which strain gauges for detecting the three force components applied to the pressure surface of the pressure sensor, are fabricated allotted to two cell units. Positioned on the main surface 53a of a first cell unit 53-1 in FIG. 53A, are strain gauges 54zc and 54zt for detecting the component Fz, and positioned on the main surface 53a of a second cell unit 53-2, in FIG. 53B, are strain gauges 54xc and 54xt for detecting Fx and strain gauges 54yc and 54yt for detecting Fy. As seen, there are eight crossover locations in the conductor 91 and moreover, crossovers in the lower side locations, which would adversely affect the reliability of conductor, are eliminated and crossovers are limited to only those at the right and left locations. Crossover reliability is thus improved if crossovers are located in the central section of the ring width where strain is low.

In the embodiment shown in FIGS. 54A and 54B, strain gauges 54xc, 54xt, 54yc and 54yt are separately located on the obverse surface 53a (FIG. 54A) and the reverse surface 53a' (FIG. 54B) of the second cell unit 53-2. The crossovers of the conductor 91 are reduced to only three locations of those at the right and left locations.

FIGS. 55A and 55B show another embodiment using an epitaxial wafer in which strain gauges are fabricated on one surface of both the first and second cell units. An N-type epitaxial layer, for example, is grown on one surface of a P-type silicon substrate and on that surface is grown a P-type strain gauge. In this case, the P-type substrate is used as the ground conductor which is connected through a connection point 95 to one terminal of the power supply. Crossovers are further reduced to only one of the right-left location.

FIGS. 56A and 56B show an embodiment in which both-side-epitaxial wafer is used on the second cell unit 53-2. Strain gauges 54xc and 54xt, and 54yc and 54yt are respectively formed separately on the main surfaces 53a and 53a' and crossovers are the same in number as in the previous embodiment, only one of the right-left location.

A configuration, in which the pressure sensitive structure of one cell unit has strain gauges to detect two of three force components and the pressure sensitive body of the other cell unit has strain gauges to detect the remaining component, greatly decreases wiring density, reduces the number of conductor crossovers for connections on the surface of the pressure sensitive structure, avoids crossovers at the lower side location of the structure with a high strain and upgrades wiring reliability. Thus, this configuration with two cell units remarkably improves detection reliability, with guaranteeing movement of the pressure surface in parallel to the support surface when force is applied.

Figure 57:
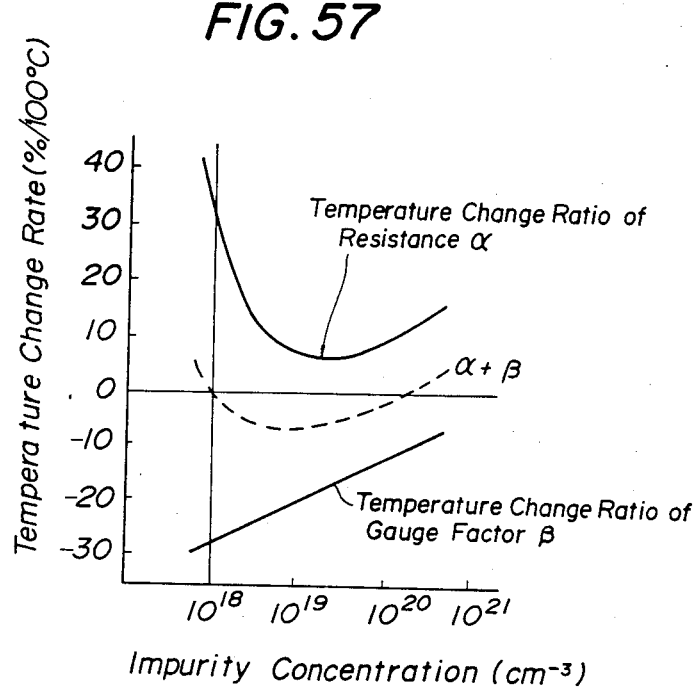
FIG. 57 is a graph illustrating the relation of impurity concentration with temperature characteristics in a semiconductor strain gauge resistor.

Instead of separately fabricating the strain gauges on the two separate cell units to detect the three force components as stated above, the strain gauges for detecting three components of force can be separately fabricated on the obverse and reverse surfaces of the same cell unit in such a way that the obverse surface detects the two force components and the reverse surface of the same cell unit detects the remaining force component. The same effect can be obtained, for example, by fabricating the strain gauge bridge as shown in FIG. 53B on the reverse surface 53a' of the strain gauge fabrication surface 53a of the cell unit 53-1 in FIG. 53A. The same is also applicable to the embodiments shown in FIGS. 55A and 55B. Assembling of the functional device will be described below. Resistance and a resistance change rate i.e., a gauge rate of diffused strain gauges is highly temperature dependent. Moreover, as shown in FIG. 57, in the example of P-type <111> orientation, the temperature dependency also changes greatly depending on impurity density. For the impurity density is $10^{18}/cm^3$, for example, the temperature change rate of resistance $\alpha$ is high at approximately 30%/100° C. and the temperature change rate of gauge factor $\beta$ is high at approximately $-30\%/100°$ C. In addition, the output signal from the bridge configured using strain gauges when the force applied is zero, viz. the zero point output, is temperature dependent. Thus, accurate knowledge of temperature is necessary for accurately computing the three components of the force from strain gauge bridge output signals.

Figure 58:
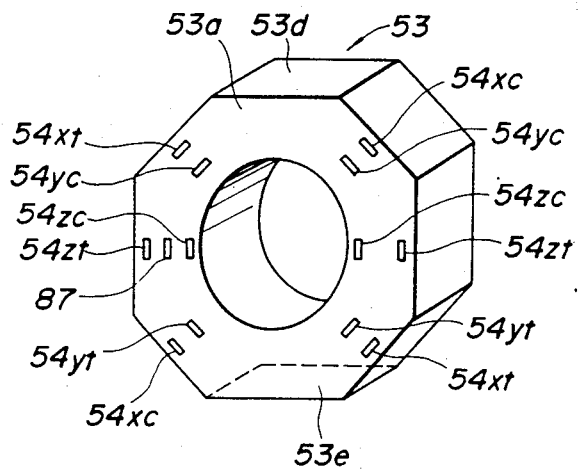
FIG. 58 is a perspective view showing a pressure sensor cell in the present invention.

FIGS. 58, and 59A and 59B show embodiments of a pressure sensor cell unit according to the present invention. In this unit, a temperature sensing area is fabricated on the cell unit of each pressure sensor. The three components of force can be easily and accurately computed according to the above changes in temperature.

In the embodiment shown in FIG. 58, a P-type resistor area 87 is diffused in a low strain area on the vertical main surface 53a of an N-type single crystal silicon cell unit 53. In the embodiment in FIGS. 59A and 59B, epitaxial layers are fabricated on both main surfaces of the silicon substrate of the cell unit. Strain gauges 54zt and 54zc (FIG. 59A) for detecting the component Fz are fabricated on one epitaxial layer 53a, while strain gauges 54xt and 54xc for detecting Fx, and strain gauges 54yt and 54yc (FIG. 59B) for detecting Fy, are fabricated on the other main surface 53a' Since strain affects a diffusion resistance type temperature sensing element 87, it is located at an area between the gauges 54zt and 54zc where the least strain occurs, and connected by the conductor 91 to a terminal 93-1. The other conductor goes from a contact point 95-1, through the substrate and a contact point 95-2 to a terminal 93-2. FIG. 60 shows an embodiment of the cell unit 53 as a pressure sensing structure, in which an NPN transistor is fabricated as a temperature sensing element 87. The embodiment is an NPN transistor configuration in the cell unit 53, which is the pressure sensitive structure, and is fabricated by diffusing a P-type layer as a strain gauge 54P into an N-type layer 97 disposed on a P-type silicon wafer 53P, and diffusing a P-type layer 99 as the base layer, into the area isolated by a P+ diffused layer 98, and an N+ layer 100 as the collector contact layer, and diffusing an N+ layer 101 as the emitter layer into the P-type layer 99. The temperature sensor could also be a diode fabricated in the same way. The resistor, transistor, or a diode is connected to a control circuit, to calculate force applied to the pressure sensing structure, or to compensate the zero point output, by utilizing temperature dependent characteristic.

As described above, in this cell units, the temperature sensing element is fabricated in the cell unit 53, to compensate for the change of the output signal obtained from the strain gauges due to the temperature change. When it is used in a robot hand, for example, rapid temperature changes in the pressure sensor, when an object at different temperature is gripped, can be compensated, to defect accurately the gripping force.

Bridge output signals are inputted to the amplifier 57 as shown in FIG. 8, but the supply of input signals or the extraction of output signals to and from the cell units 53 or the module 51 should be scanned to reduce the conductors for extracting output signals from and supplying input to each cell unit 53 or the pressure sensing module 51.

FIGS. 61 to 65 show embodiments of a pressure sensor cell unit in which the number of conductors are reduce to allow easy scanning, as stated above, through the formation of analog switches 88 into each cell unit 53 and its connection to input/output conductors.

Figure 62:
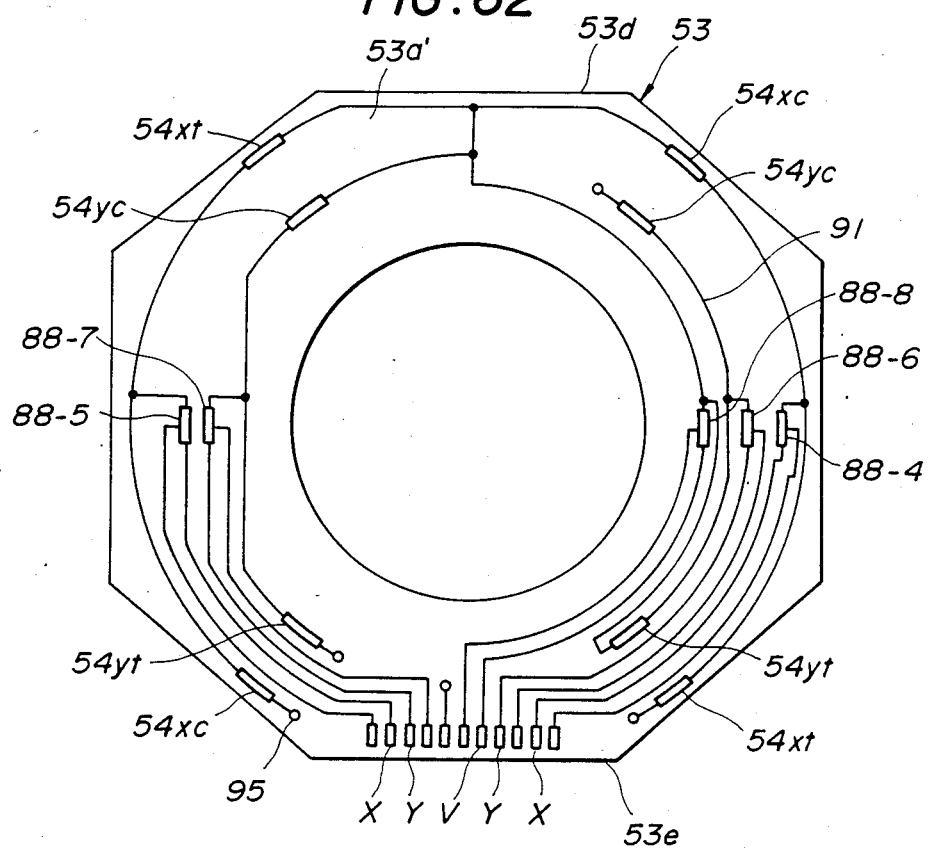
FIG. 62 is a schematic view showing the rear main surface of the pressure sensor cell in the present invention.
Figure 63:
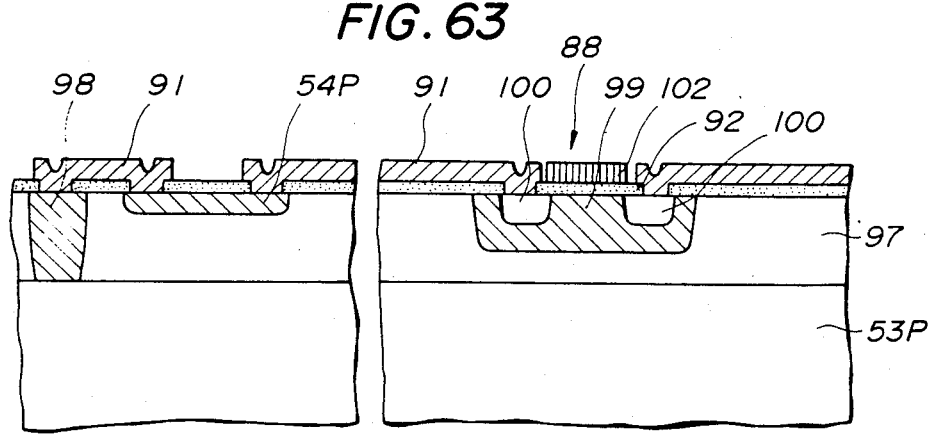
FIG. 63 is a cross sectional view showing an embodiment of an analog switch used in the pressure sensor cell in the present invention.

FIGS. 61 and 62 show embodiments in which use is made of a silicon plate having epitaxial layers with different conductivity type on both sides of the substrate, as single crystal semiconductor. A bridge circuit for detecting the component Fz is fabricated in the epitaxial layer on one surface. A bridge circuit for detecting Fx and Fy is fabricated in the epitaxial layer on the opposite surface. In addition to strain gauges 54zt and 54zc on the obverse surface of the cell unit 53, which is the pressure sensitive structure shown in FIG. 61, in the low strain area in the middle between the gauges, analog switches 88-1 and 88-2 are fabricated in connection to output terminals Z and analog switch 88-3 is fabricated in connection to input terminal V. These analog switches 88, as shown in FIG. 63, are fabricated as MOS transistors. Specifically, a P-type diffused layer 99 is fabricated in an N-type epitaxial layer 97 which is on a P-type silicon substrate 53P, and then N+-type source and drain layers 100 are fabricated into the layer 99. The silicon plate surface is covered by an oxide film 92, and a gate electrode 102 is layered on the oxide film, thus configuring an N-channel MOS transistor 88. The strain gauge is fabricated in the P-type diffused layer 54P with its connection by a thin metal film wiring 91. A P-type diffused layer 98 is used for the connection to the substrate 53P as a ground wiring. This grounding section is shown in FIGS. 61 and 62 as the small circle 95. FIG. 62 shows the reverse surface 53a' in which the analog switches 88-4 through 88-7 are connected to output terminals X and Y and the analog switch 88-8 is connected to the input terminal V, the analog switches being fabricated in the same way as on the front surface 53a, in the right and left middle portions where strain is low.

The MOS transistor 88 shown in FIG. 63 is rendered conductive when a positive voltage is applied to a gate electrode 102, but if, as shown in FIG. 64, the source and drain layers are directly formed in the epitaxial layer 97 by the P+ diffused layer 99, the MOS transistor 88 is rendered conductive when a zero or negative voltage is applied to the gate electrode 102.

Figure 66:
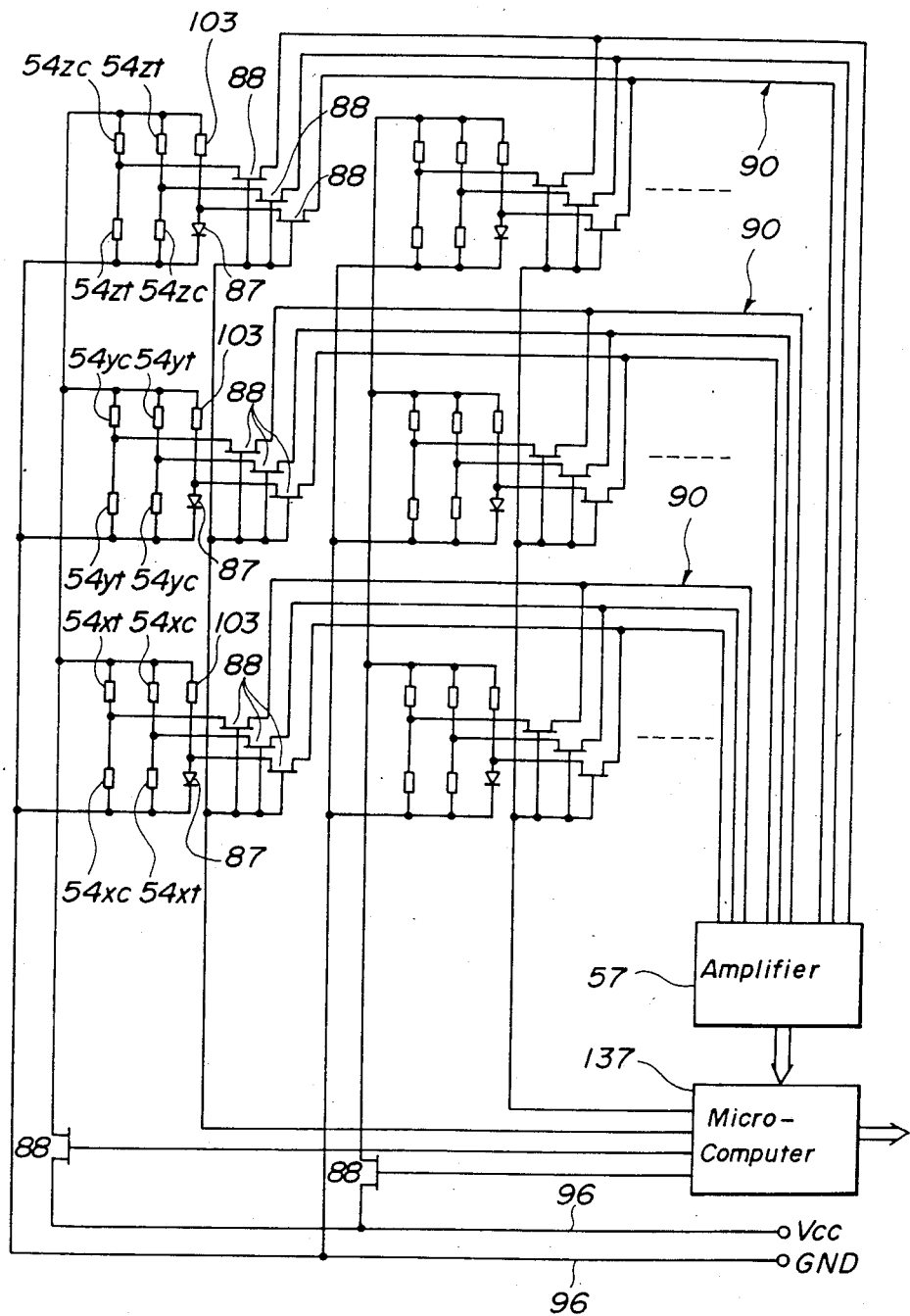
FIG. 66 is a circuit diagram showing an embodiment of a pressure sensor array arranging the strain gauge bridge and the temperature sensor.

FIG. 65 shows an embodiment of a pressure sensor cell in which a temperature sensing element 87 and a thin-film resistor 103 connected in series to the element are fabricated, in addition to analog switches 88-1 to 88-3 and 88-9, on a main surface on which a bridge circuit for detecting Fz is formed in a low conductor density. FIG. 66 shows an embodiment of a circuit configuration of a pressure sensor using a unit cell 53 into which analog switches 88 are incorporated. Reference numerals in the figure correspond to those in FIGS. 61 to 65, respectively. By sequentially turning on and off signals from a microprocessor 137 (See FIG. 79) to be described later, the analog switches 88 are scanned, which are inserted into input conductors 96 and multiple output conductors 90. Through this scanning, the output signals from each bridge for detecting Fx, Fy and Fz in each cell unit are sequentially supplied to the amplifier 57. Details on the scanning will be explained later.

Figure 67:
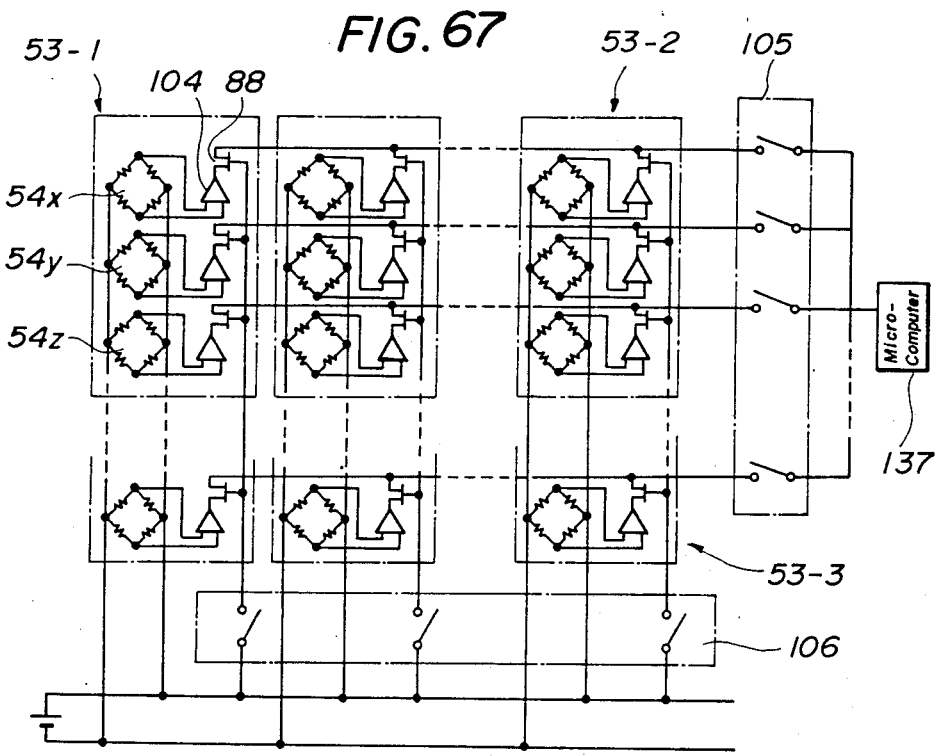
FIG. 67 is a circuit diagram showing an embodiment of a circuit for processing the outputs from the respective pressure sensor cells.

The scanning of input supplied to and output signals extracted from the cell units 53 or the pressure sensor modules 51 are possible because the analog switches 88 are provided in the pressure sensor cell unit 53. The configuration of the pressure sensor array 50 containing a number of modules is considerably simplified, because the number of conductors between strain gauges 54 in the cell units and the amplifier 57 is greatly reduced. FIG. 67 shows a configuration of a cell unit 53 in which the number of output conductors on the base plate 55 has been decreased by placing the output conductors of each bridge circuit 54 in common by assembling bridge circuit differential amplifiers 104 and the analog switches 88 into the cell unit 53. In this embodiment, three detection bridges are fabricated in only one cell unit 53 of those cell units 53 constituting a unit loadcell. Specifically, an mn number of sensor modules 51 (unit loadcell) is configured in an m x n matrix. The unit cell 53-1 constituting the (1, 1)th module 51 contains a bridge 54x for detecting $F_{1,1',x}$, a bridge 54y for detecting $F_{1,1',y}$, and a bridge 54z for detecting $F_{1,1',z}$, and further three differential amplifiers 104 to amplify the output of each bridge and three analog switches 88 to control whether differential amplifier output will be extracted or not. Such a module 51 constitutes an m x n matrix including cell units 53-2 in the (1, n)th module and cell units 53-3 of the (m, n)th module. The outputs of analog switches in an Fx detection bridge 54x of n modules 51 forming one row, are placed in common and input to the output scanner 105. The same applies to the Fy and Fz detection bridges.

In a configuration of this type, a control scanner 106 is turned to control 3×m switching devices in the jth column to apply base voltage, and output scanners 105 from the first to the mth row are switched to take out data from the bridges in each cell unit, and sent to the microprocessor 137. Output voltages from all unit loadcells can then be extracted when the control scanner 106 switches current flowing columns from the first to the nth. Since this circuit configuration reduces the number of output conductors from each module 51 to three, the number of output conductors from mn unit loadcells will be 3×m. This indicates that, even if the number of loadcells is increased, conductor density will be no greater than before because the increase will be in direct proportion to m.

Note that incorporating switching devices 88 into the cell units, adds a new control conductor between module 51 and control switch 106 to control the on and off of the switching device 88. However, since the control conductor connects the unit loadcells together, the number of conductors is increased only to a total of n, and there is no concern over increased wiring density.

Figure 68:
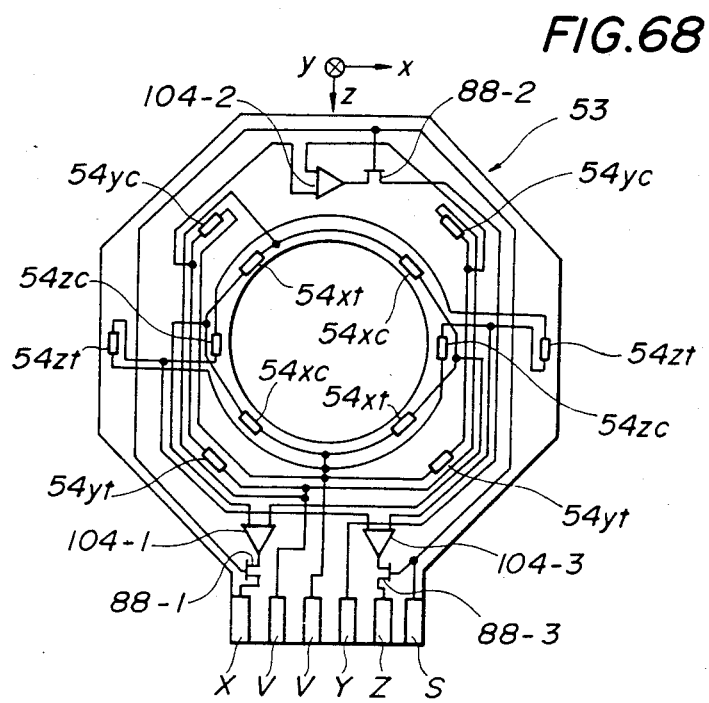
FIGS. 68 and 69 are schematic views showing the configuration of the pressure sensor cell embodying the circuits shown in FIG. 67.
Figure 69:
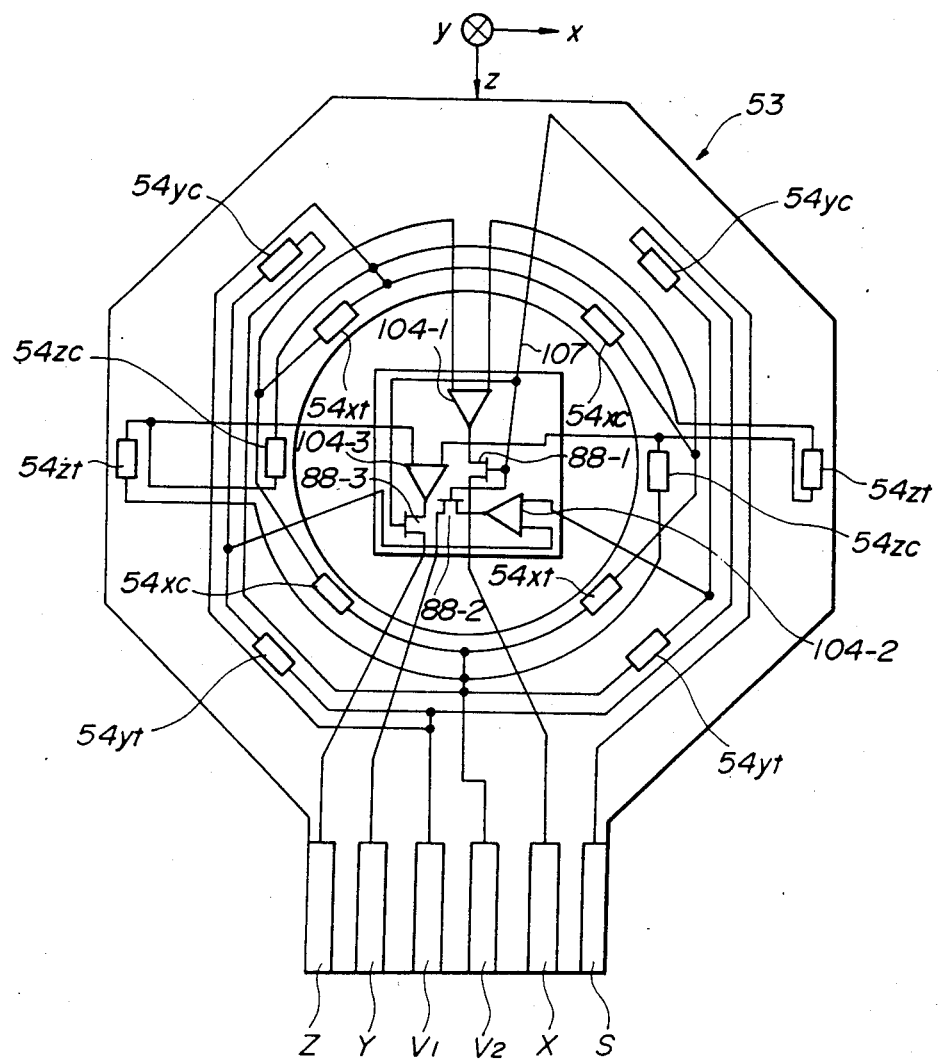

FIG. 68 and FIG. 69 show embodiments of a cell unit configuration for achieving this type of circuit. In the figures, the embodiment is the same as that shown in FIG. 50 in locations of the strain gauges 54xt and 54xc for detecting Fx, the strain gauges 54yt and 54yc for detecting Fy, the strain gauges 54zt and 54zc for detecting Fz, conductors configuring the bridges determined by those strain guages and power terminals $V_1$ and $V_2$. In this embodiment, differential amplifiers 104-1 to 104-3 for amplifying the output signals from Fx, Fy and Fz detection bridges, and analog switches 88-1 to 88-3 for controlling whether the differential amplifier output will be sent to external, are grown on the top surface of the same single crystal silicon wafer by the diffusion process. Then, a terminal X for Fx output, a terminal Y for Fy output, a terminal Z for Fz output and a control signal terminal S for controlling analog switches are provided for these outputs. If the module 51 is assembled by the cell units 53, the signal extraction circuit can be arranged as shown in FIG. 67. Therefore, the number of output conductors can be greatly reduced.

FIG. 69 shows yet another embodiment of a cell unit arrangement. When a load is applied to the cell unit 53 in the configuration shown in FIG. 68, there is a high probability that stress produced by the load will be applied to differential amplifiers 104-1 to 104-3 and analog switches 88-1 and 88-3 on the top surface of the single crystal silicon wafer. There are also cases that the diffusion process used for fabricating strain gauges is different from the diffusion process for fabricating differential amplifiers and analog switches, and a series of the two manufacturing processes like this is complicated. In this configuration, Fx-detection strain gauges 54xt and 54xc, Fy-detection strain gauges 54yt and 54yc, Fz detection strain gauges 54zt and 54zc, conductors connecting those strain gauges to form bridge and power terminals $V_1$ and $V_2$, are fabricated on the top surface of ring like cells just as in the embodiment in FIG. 50. Then, the differential amplifiers 104-1 to 104-3 for amplifying bridge outputs and analog switches 88-1 to 88-3 for controlling whether or not the output signals of differential amplifier will be supplied to an external destination, are diffusion-grown on the surface of another single crystal silicon wafer. The chips having the above devices on them are cut from the single crystal silicon wafer, positioned in the center hole of the ring like cell 53, and the chips and the ring like cells are connected by metal conductors 71 serving also as buffer therebetween. If thus configured, the differential amplifiers 104-1 to 104-3 and the analog switches 88-1 to 88-3 will not receive stress from load, and reliability of the device will be improved. The diffusion process for strain gauge fabrication and the diffusion process for differential amplifier and analog switch fabrication can be performed in parallel, so that the manufacturing process can be arranged flexibly.

As stated above, the number of the output conductors 90 on the base plate 55 can be decreased from 6×mn to 3×mn, thereby enabling each module 51 to be wired to the scanners 105 and 106, through the incorporation of the differential amplifiers 104-1 to 104-3 for amplifying the bridge output, and the analog switches 88-1 to 88-3 for controlling whether or not the differential amplifier output will be derived therefrom, in adiition to the strain gauges 54 and the three bridge circuits 54x, 54y and 54z formed by those strain gauges into the unit cell 53 and common output conductors for each column in the plurality of pressure sensor modules 51.

Figure 70:
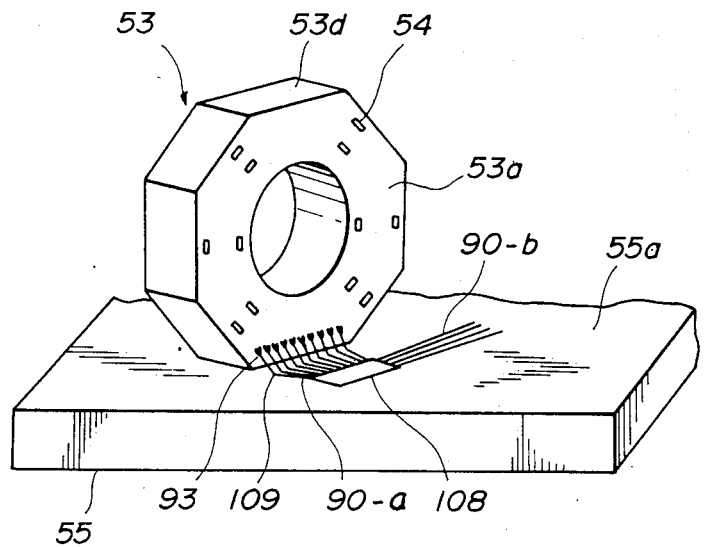
FIG. 70 is a perspective view showing one embodiment in which an integrated circuit is formed on the base plate.

FIG. 70 shows an embodiment of a pressure sensor module of the present invention, in which an electronic circuit 108, which processes signals from the strain gauge bridges, is integrated into the base plate 55 supporting the cell 53, thus making small wiring space on the base plate. Both the cell 53 and the base plate 55 as shown are made of single crystal silicon. By integrated circuit technology, conductors 90-a, and the electronic circuit 108 for processing signals outputted from the strain gauge bridges are fabricated into the support surface 55a of the base plate 55 to which the cell 53 is attached. Wiring intervals of 10 μm pitch are easily realized by integrated circuit technology. Integrated circuit technology saves wiring space compared to the minimum 100 μm wiring interval pitch obtained by printing a conductive film on a ceramic plate or by the metal vapor deposition process. Therefore, the cells 53 can be integrated at a high density. The electronic circuit 108 is constructed as an arithmetic/logic operational amplifier, and is connected to the terminal 93 on the cell 53, through a connecting conductors 90-a and a bonding conductor 109. Signals from strain gauge 54 can be processed inside the body of pressure sensor array 50 by placing the electronic circuit 108 inside the base plate 55, thus reducing the number of external output conductors 90-b and providing a compact pressure sensor array of higher reliability. The base plate 55 does not necessarily have to be made by the same semiconductor as the cell 53, but extremely good effects are obtained, such as stability in temperature fluctuation, if the two are made by material having the same or similar coefficient of thermal expansion.

Figure 72:
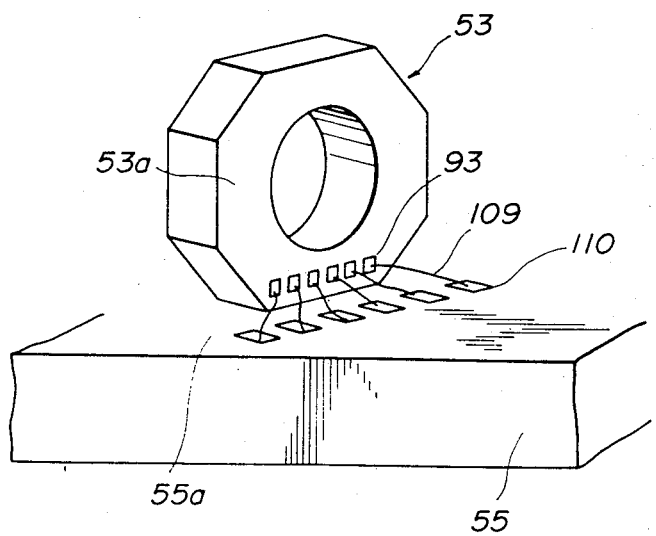
FIG. 72 is a perspective view showing the pressure sensor cells shown in FIG. 71 which are attached to the base plate.
Figure 71:
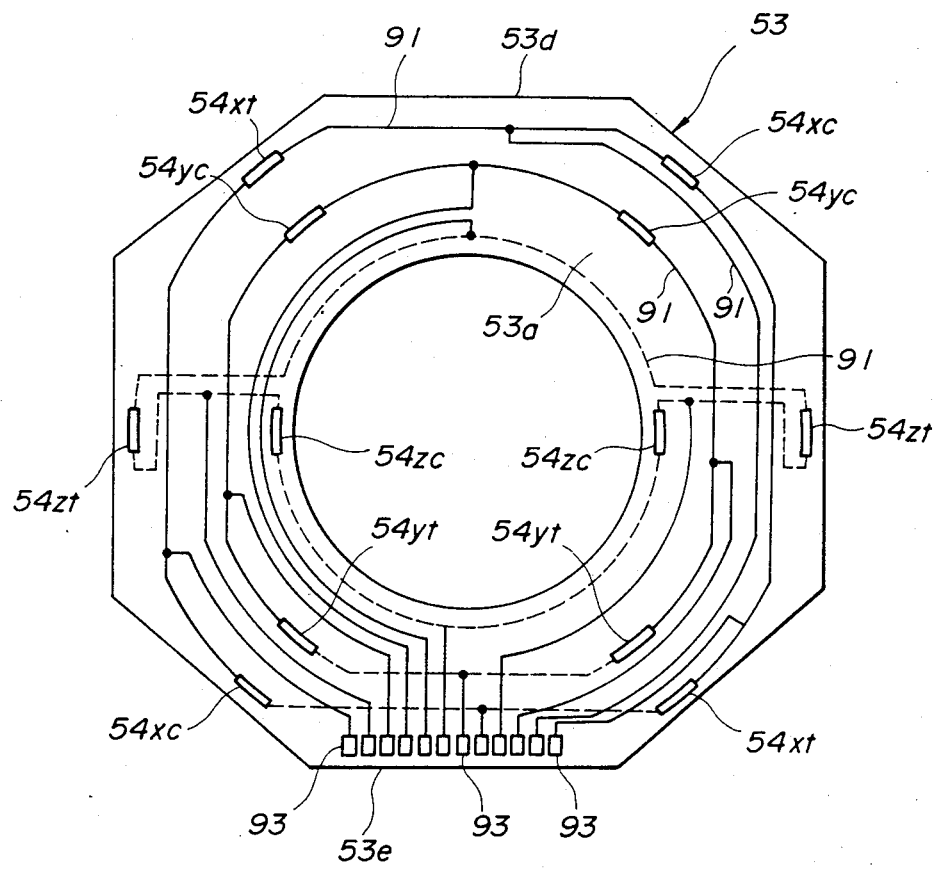
FIG. 71 is a schematic view showing a prior art arrangement of pressure sensor cells.

The wiring on the pressure sensor cell unit will be described. FIG. 71 shows an embodiment of wiring on the main surface of the cell unit 53. FIG. 72 shows an embodiment of the connection of the terminals 93 on the surface of the cell unit 53 to terminals 110 on the base plate 55. As shown in FIG. 72, the terminals 110 are previously positioned on the base plate 55, corresponding to the terminals 93, respectively. Thus, after the cell 53 has been fixed to the base plate 55, the terminals 83 and 110 are respectively bonded by lead conductor 109 of bonding conductor. Because the cell 53, as stated above, is very small, and moreover, because the surfaces holding the terminals 93 and 110 face each other at a right angle, viz. these terminals are formed installed on the surface 53a and the upper surface 55a of the base plate 55, connecting bonding between these terminals is not only extremely difficult, but also there is a probability of breaks or shorts in connections and consequent deficiencies in reliability. In addition, a need arises to provide dual layer wiring on the extremely limited surface 53a because conductor intersections of the conductor 91 as indicated by the broken line in FIG. 71, require dual layer wiring.

FIGS. 73 to 76 show wiring means for eliminating those problems.

Figure 73:
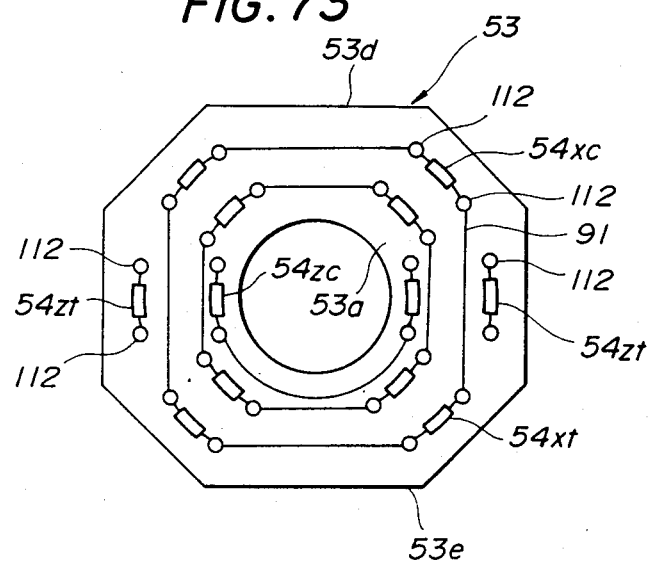
FIG. 73 is a schematic view showing one embodiment of an arrangement of the pressure sensor cells in the present invention.
Figure 74:
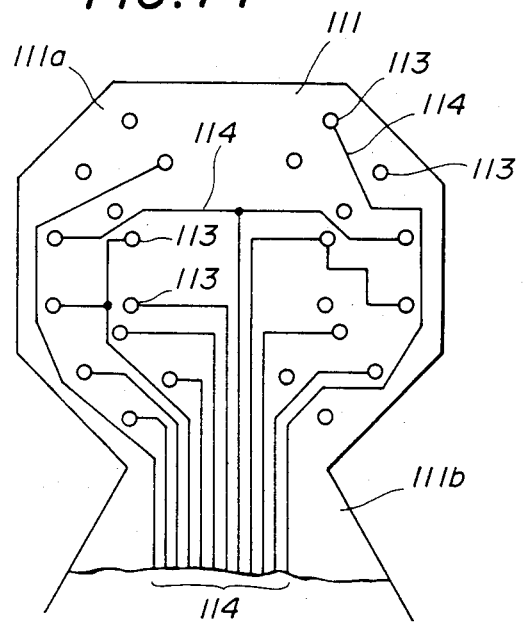
FIG. 74 is a schematic view showing one embodiment of a film carrier applied to the present invention.
Figure 76:
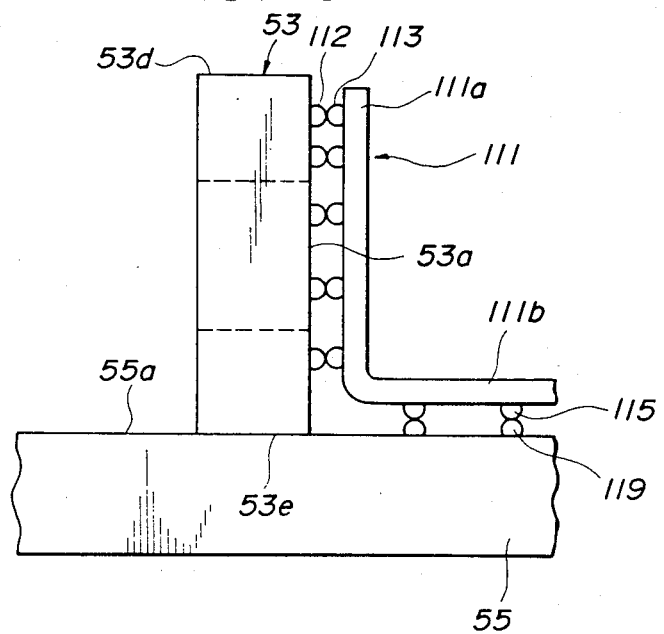
FIG. 76 is a side view showing an embodiment of pressure sensors shown in FIG. 73 which are attached to the substrate.

The 111 shown in FIGS. 74 and 76 is a film carrier which lays conductors on a flexible film. The film carrier electrically connects bumps 112 as terminals on the surface 53a of the cell unit 53 to bumps 119 as terminals on the base plate 55. As shown in FIG. 73, bumps 112 on the cell 53 are made of solder or gold and formed close to both ends of strain gauge 54 on the cell unit 53, and are connected to the strain gauge 54 by the conductor 91. For this reason, the conductors 91 between strain gauges 54 have no crossover and wiring is compeleted by only one layer.

FIG. 74 is a partial view of a film carrier 111. The film carrier 111 is made, for example, of elastic material such as polyimide resin and bumps 113 are constructed on the film carrier 111 in positions corresponding to the bumps 112 in FIG. 73. Wires 114 are fabricated only between those bumps 113 that require wiring. The conductors 114 are led in the downward direction, as viewed in the drawing, into the base plate mounting block 111b on the film 111.

FIG. 76 shows that bumps 115, connected to the conductors 114 and used for signal extraction terminals, are fabricated on the base plate mounting block 111b.

Figure 75:
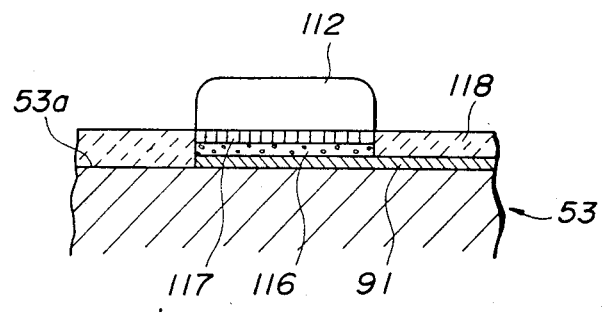
FIG. 75 is a cross sectional view showing an embodiment of a pad formed in the pressure sensor cells shown in FIG. 73.

FIG. 75 shows the state of bumps 112 formed on the main surface 53a of the cell 53. In the figure, reference numeral 116 designates the adhesive metal for attaching bumps 112 to the top of the conductor layer holding the wiring 91, 117 is the metal for diffusion prevention when the bumps 112 are formed and 118 is the insulating layer mounted on the surface 53a.

FIG. 76 shows a state of the cell 53 attached to the top of the the base plate 55 and emphasizes only the bumps installed on the cell 53, the base plate 55 and the film 111. Further, the wiring, strain gauges, etc. on the base plate 55 and the film 111 are not illustrated in FIG. 76. As shown, the film 111 is bent at right angles, the bumps 113 on the film 111 contact the bumps 112 on the cell 53, the bumps 115 installed on the base plate mounting block 111b of the film 111 contact the bumps 119 on the base plate 55, and both are joined by thermocompression bonding. Thus, there is no need to use difficult processes such as bonding conductor connection between signal extraction terminals on the cell 53 and connection terminals on the base plate 55. Therefore, a high probability of broken conductors or shorts is eliminated. The dual layer wiring on the surface of the cell 53 is also unnecessary. Advantages of both simplified processing and high reliability are achieved.

The preprocessing and scanning of signals output from the pressure sensor array 50 will be explained.

Figure 77:
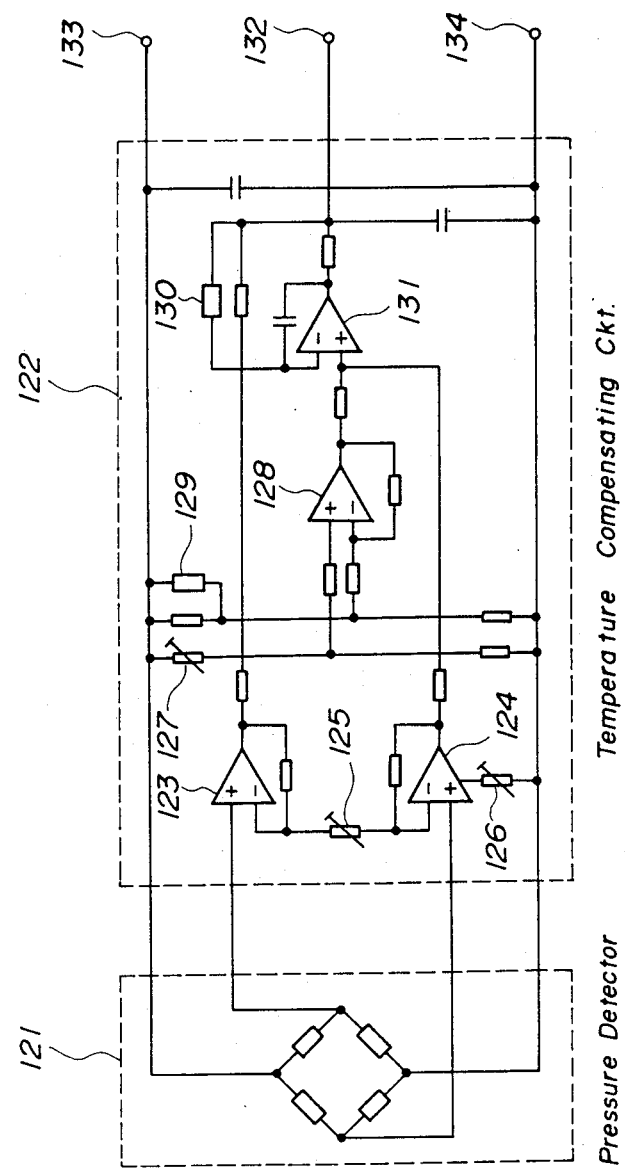
FIG. 77 is a circuit diagram showing a prior art pressure sensor temperature compensating circuit.

There are no pressure sensor output signal preprocessors available at present for simple computer processing of pressure sensor output signals used in detecting gripping states, e.g., grasping, releasing and sliding of objects, etc., through measurements of pressure distribution on the gripping section attached to robot hands. But conventional technology that comes close to that goal is shown in FIG. 77. A temperature compensation circuit 122 eliminates the effects of temperature on the output of a pressure detection section 121, which is a semiconductor bridge such as a semiconductor strain gauge. More specifically, a signal from a pressure detection block 121 is received by an analog integrated circuit 123 and an analog integrated circuit 124. These integrated circuits, in coorporation with a span adjustment resistor 125 and an offset adjustment resistor 126, adjust signal span and offset. A zero point adjustment resistor 127 and an analog integrated circuit 128 also adjust the zero point of the signal. After a zero point temperature characteristics compensation resistor 129, an analog integrated circuit 128 and a span temperature characteristic compensation resistor 130 compensate for temperature in the pressure signal, the signals are outputted from the signal output terminal 132. A power terminal is designated by 133, and a ground terminal for analog use by 133.

Figure 78:
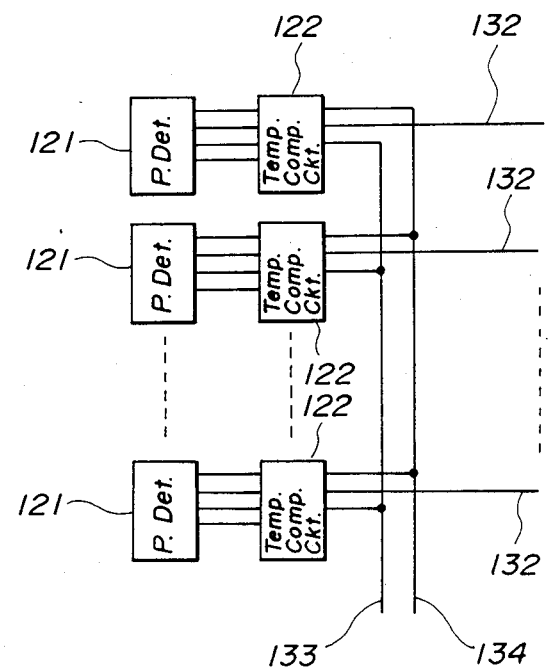
FIG. 78 is a block diagram showing a system configuration for measuring pressure distribution using prior art pressure sensors and temperature compensating circuits.

But, using this conventional technology to measure the previously stated distribution of a force over a surface would be extremely uneconomical because the pressure detection block 121 would have to be rowed in multiples, as shown in FIG. 78, and the temperature compensation circuits 122 would have to also be rowed in multiples corresponding to the detection blocks 121. The technology would have the further disadvantage of remarkably increasing electrical power consumption because power would have to be constantly supplied to a pressure detector block 121.

Figure 79:
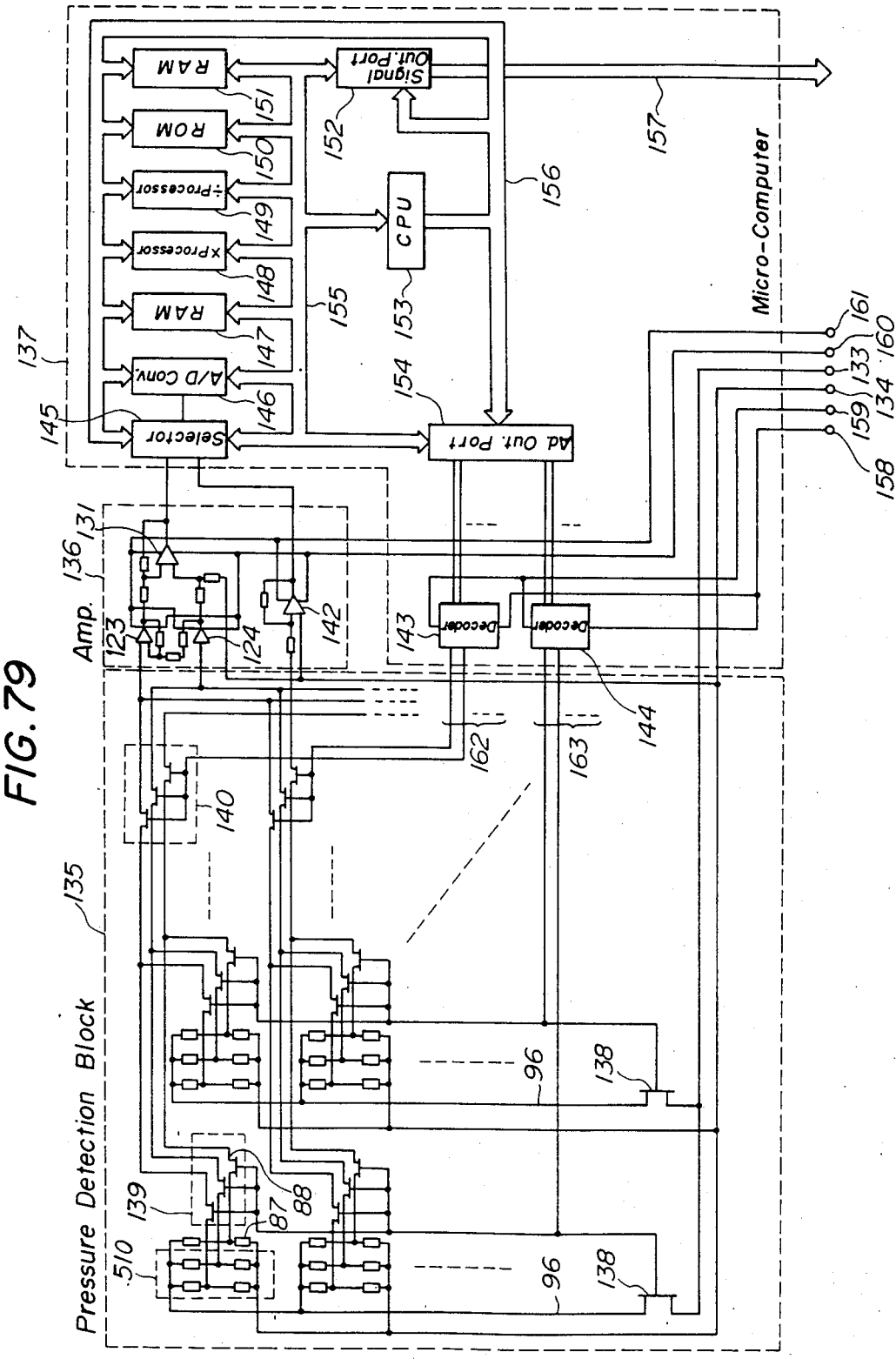
FIG. 79 is a circuit diagram showing an embodiment of a pressure sensor output signal pre-processor in the present invention.
Figure 80:
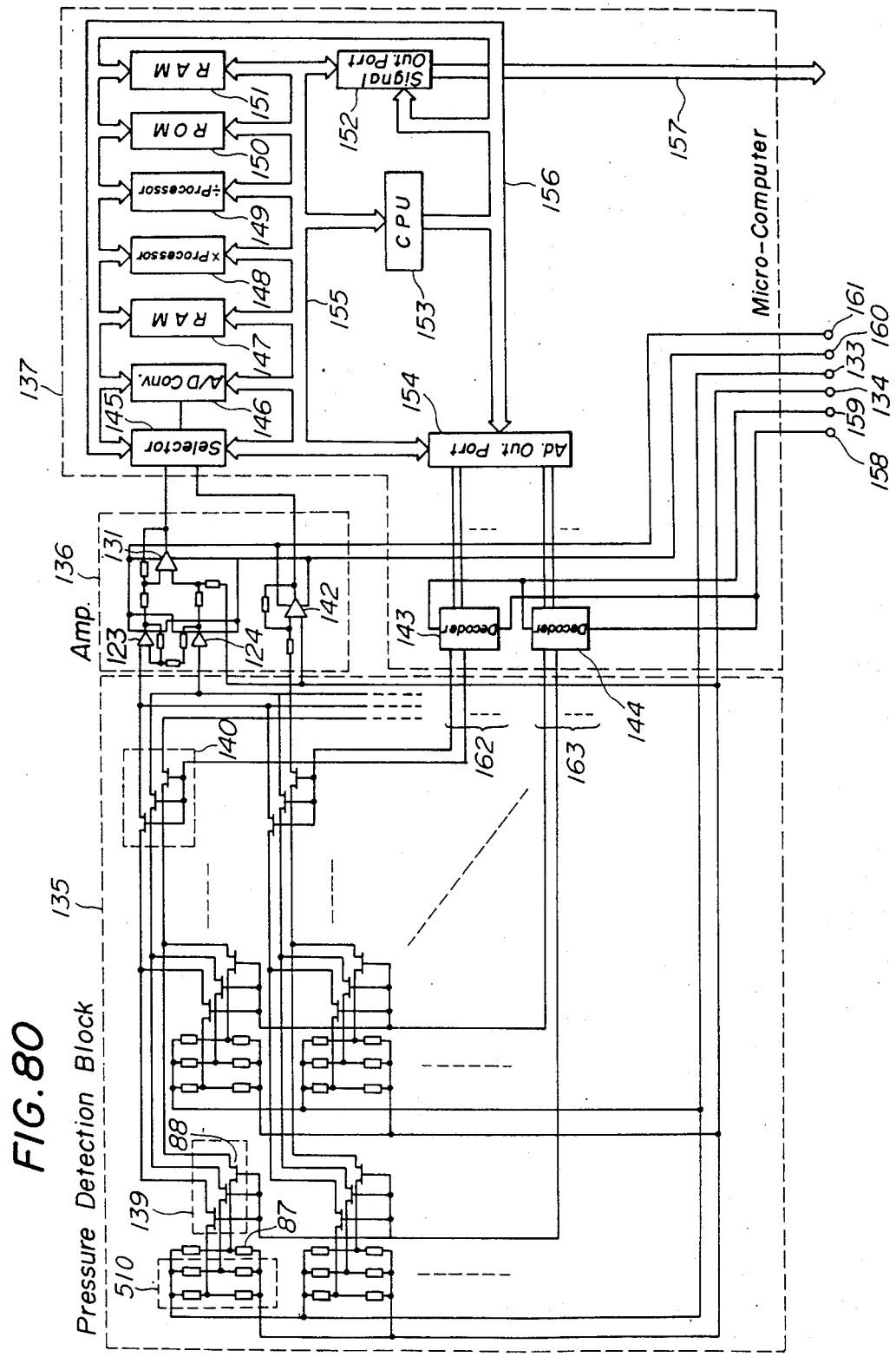
FIGS. 80 and 81 are circuit diagrams showing two other embodiments of a pressure sensor output signal pre-processor in the present invention.
Figure 81:
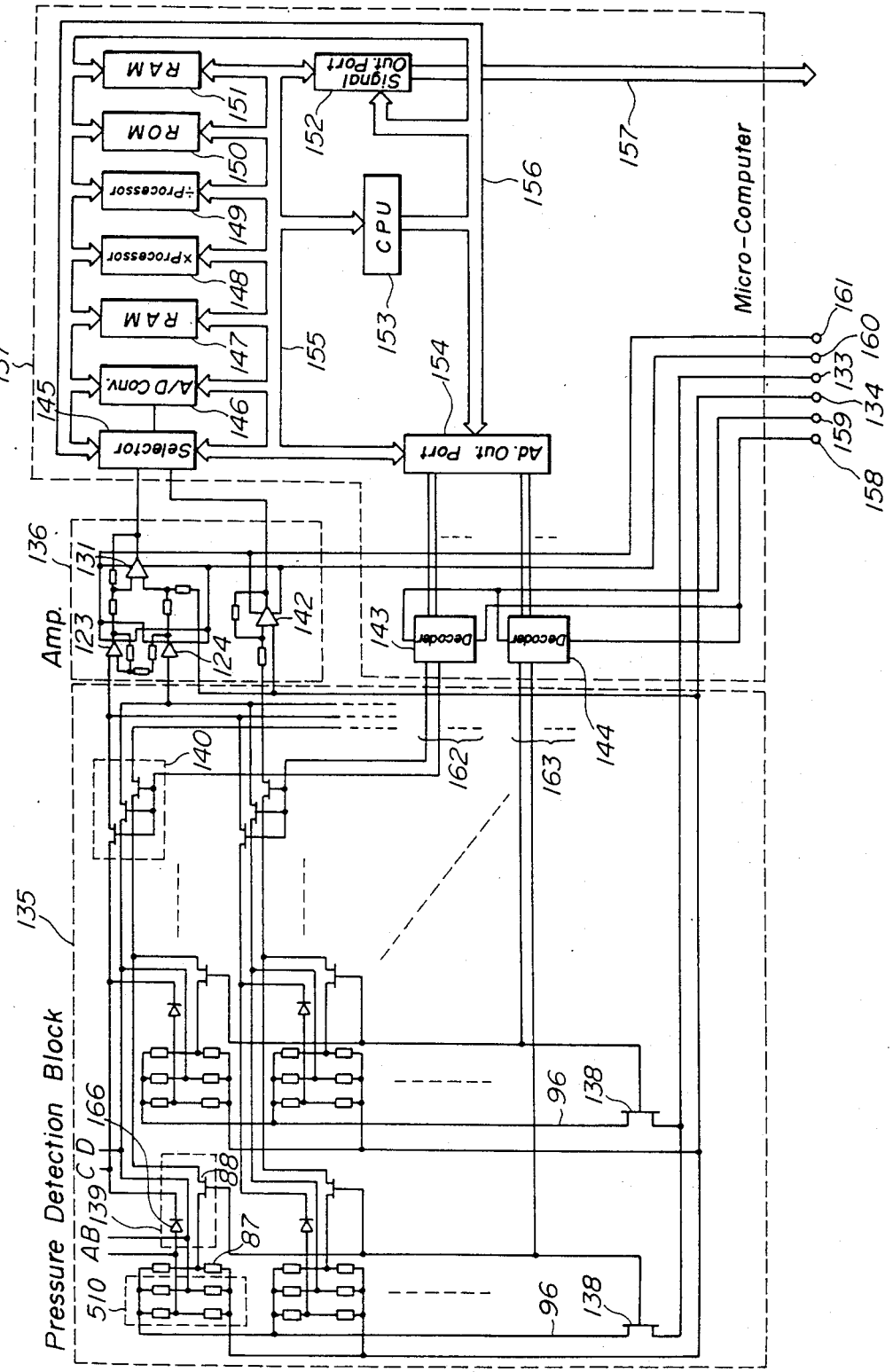

FIGS. 79 to 81 show embodiments of a pressure sensor output signal preprocessor that eliminates these disadvantages.

FIG. 79 shows a pressure sensor output signal preprocessor designed so as to economically measure the pressure distribution at low power consumption by using the output signals from the pressure detectors and a microprocessor to compensate for temperature influences upon drift and sensitivity in each pressure detection block, through the sweeping of the output signals of the pressure detectors by the row and column addresses. Further, by sweeping the power sources of a plurality of pressure detectors arrayed in a matrix, the low power consumption is realized.

As shown, the preprocessor is comprised of a pressure detection block 135, an amplifier block 136 and a microprocessor block 137. The pressure detection block 135 includes the following coponents and circuits: a bridge circuit or bridge circuits 510 formed by semiconductor strain gauges; a temperature sensing elements 87 made by, e.g., thermistors, and connected in parallel to each pressure detection block 51; an analog switch block 139 in the column or vertical direction each connected to each bridge circuit 510 and a set of temperature sensing elements 87, which opens and closes the outputs from those groups for each row; a power analog switches 138 in the column or vertical direction, each of which is turned ON (conductive) by the control voltage to the analog switch block 139, thus opening and closing the power line 96 of the bridge circuit 510 and the temperature detection device 87; an analog switch blocks 140 in the row or horizontal direction, each connected to the final stage of the analog switch block 139 to open and close the output from the bridge circuit 510 and the temperature sensing element 87 for each column, etc. The analog switch block 139 and the analog switch block 140 are each made up of three analog switches (semiconductor switches) 88, which are simultaneously turned on and off by the control voltage and are connected to the output of the bridge circuit 510 and the outputs of the temperature sensing elements 87.

An amplifier block 136 is a single amplifier block that is connected to the outputs of all the analog switch blocks 140. The amplifier block 136 is made up of three analog integrated circuits 123, 124 and 131 used for amplifying pressure signals, and the analog integrated circuit 142 used for amplifying temperature signals.

A microprocesscer block 137 comprises the following components: a column decoder 143 that applies control voltage to all the analog switch blocks 140 in the row direction according to column addresses (to be described later) and controls the on and off of those switches; a row decoder 144 that applies control voltage to the vertical axis analog switch block 139 in the column direction according to row addresses (to be described later) and controls the on and off of those switches; an analog signal selector block 145 that connects to the output of amplifier block 136 and alternately selects the amplified analog output signal and the temperature signal; an A/D (analog to digital) converter 146 that converts the output signal of an analog signal selector block 145 to a digital signal; an RAM 147 (random access memory) that temporarily stores digital signals outputted from the A/D converter 146; a multiplication co-processor 148 and a division co-processor 149 that perform arithmetic/logic operations on data digitized by the A/D converter 146 for temperature compensation; an ROM (read only memory) 150 which have stored operational equations, constants, control programs, etc ; an RAM (random-access memory) 151 for storing the detected data temperature compensated by the operation; a signal output port 152 that externally outputs the temperature compensated data; a CPU (central processing unit) 153 that controls all processing; and an address output port 154 that outputs an address of the pressure detection block from the CPU 153 to the column decoder 143 and the row decoder 144.

In the figure, an internal data bus for the microprocessor block 137 is designated by 155; an address bus for the microprocessor block 137, by 156; a signal output data bus for the microprocessor block 137 by 157; a digital ground terminal for the microprocessor block 137, by 158; a digital power terminal for the microprocessor block 137, by 159; 160 designates an operational amplifier negative power terminal for the amplifier block 136; an operational amplifier positive power terminal for the amplifier block is denoted by 161; 162 indicates a column line group from the column decoder 143 and is connected to gates in each analog switch block 140; 163 indicates a row line group that comes out of the row decoder 144 and is connected to gates in the analog switch block 139 for each row, and to gates in each power analog switch block 138. The power analog switch 138 is connected through the power line 96 to the bridge circuit 510 and to the temperature sensing element 87.

The scanner amplifier 57 shown in FIGS. 8 and 44 has the power analog switch 138 and the analog switch block 140 in addition to the amplifier block 136, or all of these and the microprocessor block 140. Consequently, the pressure sensor array 50 in the same figures includes the pressure sensing block 135, the amplifier block 136, etc.

When the CPU 153 decides which signal of those bridge circuits 510, will be sent to the signal output data bus 157. The CPU 153 outputs the address of that pressure detection block through address output port 154 to the column decoder 143 and the row decoder 144. Here, the address of the pressure detection block is a specific address assigned to each of the pressure detection blocks and it consists, for example, of a row address and a column address. Each decoder 143 and 144 decodes those input addresses and selects a row line and a column line as specified by those addresses from the row line address group 163 and the column line group 162, and places in ON (conductive) state only the analog switch block 139, the power analog switch 138 and the analog switch 140, which are connected to those lines.

As a result, only the bridge circuit 510 and the temperature detection device 87 in the designated row address are conductive. The specific bridge circuit 510 in a pressure detection block address is designated by the CPU 153, and a temperature sensing element 87 for measuring the temperature of that bridge circuit 510, is selected and their output signals are amplified by the amplifier block 136. To be more specific, analog integrated circuits 123, 124 and 131 amplify the pressure signals of the bridge circuit 510 and an analog integrated circuit 142 amplifies temperature signals from temperature sensing element 87.

These amplified pressure signals and temperature signals are switched by analog signal switching block 145, and alternately and sequentially A/D converted by A/D converter 146. The A/D converted digital pressure signals and temperature signals pass through the internal data bus 155 to be stored in the temporary storage RAM 147 and then CPU 153, the multiplication co-processor 148 and the division co-processor 149 perform arithmetic/logic operations for temperature compensation for pressure signal. The multiplication co-processor 148 and the division co-processor 149 speed up the above compensation operations.

The compensation operation is shown below First, since pressure signals inputted to the analog signal switching block 145 can be approximately expressed by using a constant of proportionality to determine a span, and an offset produced when no pressure is applied to the bridge circuit 510, $$V_{OP} = a_0 + a_1 T + a_2 T^2 + (b_0 + b_1 T + b_2 T^2) \cdot P$$

|Drift|  |Proportion Constant|

Pressure P can thus be obtained by equation (10).

$$P = \frac{a_0 + a_1 T + a_2 T^2 - V_{OP}}{b_0 + b_1 T + b_2 T^2} \quad (10)$$

Where,
$V_{OP}$: Pressure signal input to the analog switching block 145
T: Absolute temperature of the bridge circuit 510
P: Pressure applied to the bridge circuit 510
$a_0, a_1, a_2, b_0, b_1, b_2$: Known constants for the bridge circuit 510

Also, because the temperature signal input to the analog signal switching block 145, when the pressure sensing element 87 is, for example, a thermistor, can be expressed in the approximation, $$V_{0T} = C_0 + C_1 T$$

Temperature T can be obtained by the following equation (11), $$T = \frac{V_{0T} - C_0}{C_1} \quad (11)$$

Where,
$V_{0T}$: *Temperature signal input to the analog signal switching block* 145
$C_0, C_1$: Known constant determined for each temperature sensing element 87
T: Absolute temperature of the temperature sensing element 87

Consequently, if the temperature detection device 87 is arranged in the vicinity of the bridge circuit 510 in a manner such that the temperature of temperature detection device 87 is considered as the temperature of the bridge circuit 510, an accurate pressure value free from the temperature effects can be computed from the above equation (10) by using temperature T calculated by the equation (11). Thus computed output data passes through the signal output port 152 to an external destination and that data is stored in the RAM 151 and can be read out at any time required.

As described above, the output signal of one specific bridge circuit 510 is operationally processed in the microprocessor block 137 and outputted to the signal output data bus 157. In the same way, output signals from other bridge circuits 510 are sequentially addressed by the row decoder 144 and the column decoder 143, and operationally processed by the microprocessor block 137 and then output to the signal output data bus 157. The pressure distribution data storage into the RAM 151 is completed after all of the bridge circuits 510 have been swept in this manner.

There is no need to use the temperature sensing element 86 and the bridge circuit 510 in one-to-one relationship. For example, one temperature sensing element 87 may be provided for three bridge circuits 510 and temperature is measured and compensation is completed by equations (10) and (11). It is evident that using one temperature sensing element 87 for the pressure detection blocks 135, temperature is measured and compensation is completed in the same way.

As described above, the outputs of a number of the bridge circuits 510 arrayed in the form of matrix are swept by the row and column addresses, and the temperature compensation of the offset and the span for each bridge circuit 510 is performed by the microcomputer 137. Thus, in this embodiment, there is no need for the provision of the temperature compensating circuits 122 respectively for the pressure detection blocks, as shown in FIG. 78.

Therefore, as a whole, a cheap and economical measurement of the pressure distribution is realized. As for the power supply, power consumption by the pressure detection block 135 can be reduced, because using the power analog switch 138, only the power line specified by the decoder 144 is placed into conductive state. More specifically, when the CPU 152 in the microprocessor block 137 sequentially addresses and specifies the output of the bridge circuits 510 and the temperature sensing elements 87, low power consumption is required for the sweep of all the bridge circuits 510 and the temperature sensing elements 87 because the configuration is one in which power is supplied only to the bridge circuits 510 and the temperature sensing element 87 at specified addresses, not to other bridge circuits 510 and the temperature sensing elements 87.

Power can also be constantly supplied to all the bridge circuits 510. An embodiment of this arrangement is shown in FIG. 80. The embodiment in FIG. 80 differs from the previous embodiment only in that power is constantly supplied to the bridge circuits 510, the remaining configuration and operations are the same. Consequently, row addresses and column addresses are used, as mentioned above, to sweep the output of the bridge circuits 510 arrayed in matrix form. The microprocessor 137 is used to compensate for the temperature of the offset and the span for each bridge circuit 510. Thus, in this embodiment, there is no need for provision of the temperature compensating circuits 122 respectively for the pressure detection blocks, as shown in FIG. 78. Therefore, as a whole, a cheap and economical measurement of the pressure distribution is realized.

FIG. 81 shows yet another embodiment. To reduce power consumption, the row address is used and the analog switch 138 sweeps the power supply to the matrix-arrayed bridge circuits 510. At the same time, the analog switch 140 specified by the column address and the switching diode 166 are used to sweeps the outputs of the bridge circuits 510. Using the row addresses and the column addresses, the analog switch 88 also sweeps the output of the attached temperature sensor 87. Using temperature data thus obtained, the temperature sensor output and the microprocessor are used for the temperature compensate of the offset and the span for each bridge circuit 510. To explain this in further detail, as shown, the analog switch block 139 includes one switching diode 166 and one analog switch 88. The analog switch block 140 includes three analog switches 88 that are simultaneously turned on and off by the control voltage. The analog switch block 140 is connected to the output of the bridge circuit 510 and to the output of the temperature sensing element 87.

The anode of the switching diode 166 in each analog switch block 139 is connected one of the output lines of the bridge circuit 510. The cathode of the switching diode 166 in each analog switch block 139 is connected to one analog switch 88 of the analog switch block 140. The remaining output line of each bridge circuit 510 is connected to the remaining analog switch 88 in the analog switch block 140. Each analog switch 88 which is connected to the output of the temperature sensing element 87 and is also connected to the remaining analog switches 88 in the analog switch block 140.

One switching diode 166, of the plurality of switching diodes 166, which is connected to the bridge circuit 510, to which an electrical power is fed by the power supply analog switch 138 rendered conductive, is forward-biased to be conductive. The other switching diode 166 is reverse-biased and no current passes through it. The remaining configuration and operations are the same as those in FIG. 79.

Figure 82:
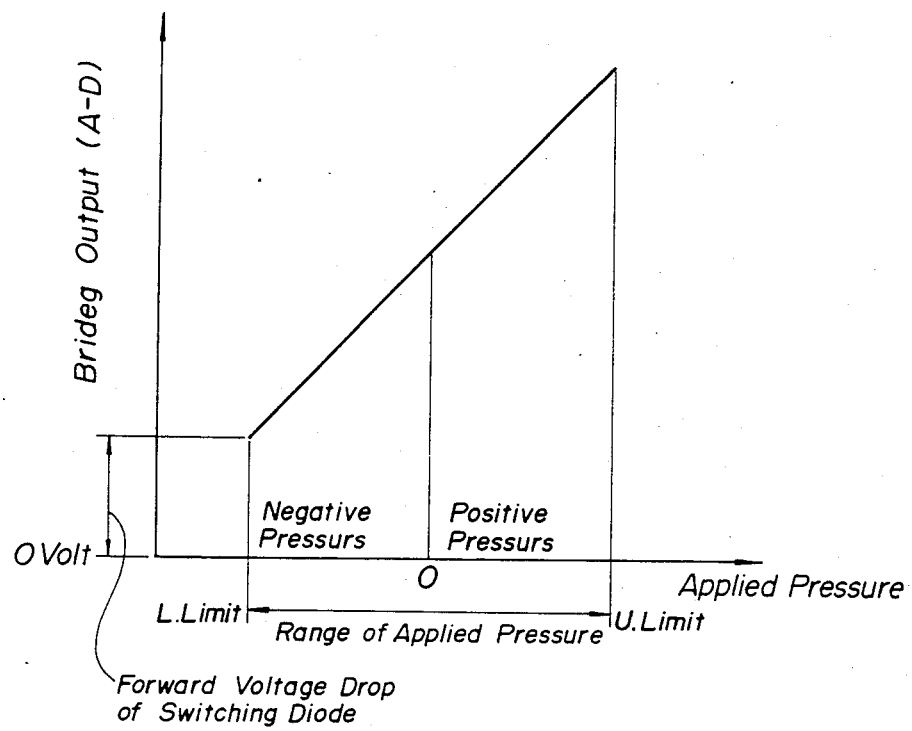
FIG. 82 is an explanatory diagram showing the output voltage characteristics of pressure detector block 51 in FIG. 81.
Figure 83:
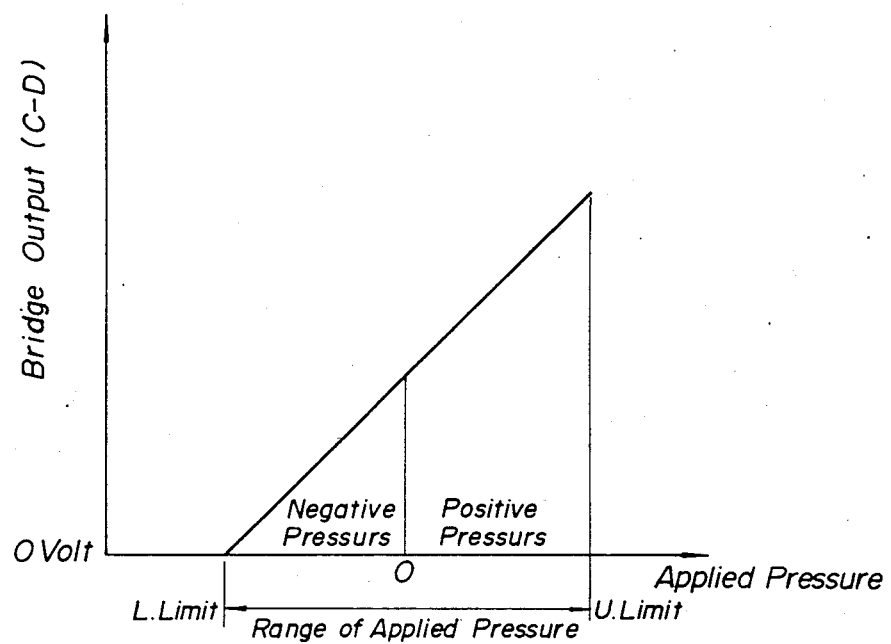
FIG. 83 is an explanatory diagram showing the output voltage characteristics between an output voltage between points C and D and a pressure applied to the pressure detector block 51 when the switching diode 88 is connected to the output of the pressure detector block 51.

It is assumed that the output between points A and B in the bridge circuit 510, in the embodiment in FIG. 81, has characteristics shown in FIG. 82, and that the bridge is designed in unbalanced form so that, at the lower limit of the applied pressure range, the voltage output from the bridge is the same as the forward direction voltage drop of the switching diode 166. Through this design, the output characteristic between points C and D is as shown in FIG. 83, the output voltage between points C and D is zero at the lower limit of the applied pressure. This eliminates the effects of the forward direction voltage of the switching diode 166 on the pressure signal.

The switching diode 166 and the analog switch 88 can also scan the output of the bridge circuit 510. A pressure distribution can be measured at much lower power consumption than by conventional means. The same effects, such as simplified temperature compensation circuits, are obtained in this circuit as in the circuit in FIG. 79.

An arrangement of a body of the pressure recognition controller for executing control operations according to the signal outputted from a pressure sensor array 50, which is an embodiment of the present invention will be explained.

The signal outputted from the scanner amplifier 57 in FIG. 8, is applied, through the A/D (analog to digital) converter to be described later to the CPU. The CPU operates three-directional components of force, resultant force, three-directional moments, etc. at each module, according to predetermined operation algorithms. The results of the operations are stored in the memory file to be described later.

Through a time variation in a pressure surface force distribution read from the memory file, arithmetic/logic operations are performed on slip arising from inadequate gripping force, as a result, soft handling is made possible through the use of holding force control operational algorithm in which slip does not arise. Using arithmetic/logic operations for basic manipulatory operations such as grip, lift, insertion and rotation, an independent closed local control or a supervisory control by a host computer can be possible with high speed, quick response and high precision. Soft handling, in which deformation and loss in the object is avoided, and auxiliary input is possible, since if a material distribution of the pressure receiving plate 52 is selected suitably, elasticity of objects can be calculated. Therefore, the auxiliary imputs for deciding material and a physical configuration of the object are available.

Figure 84:
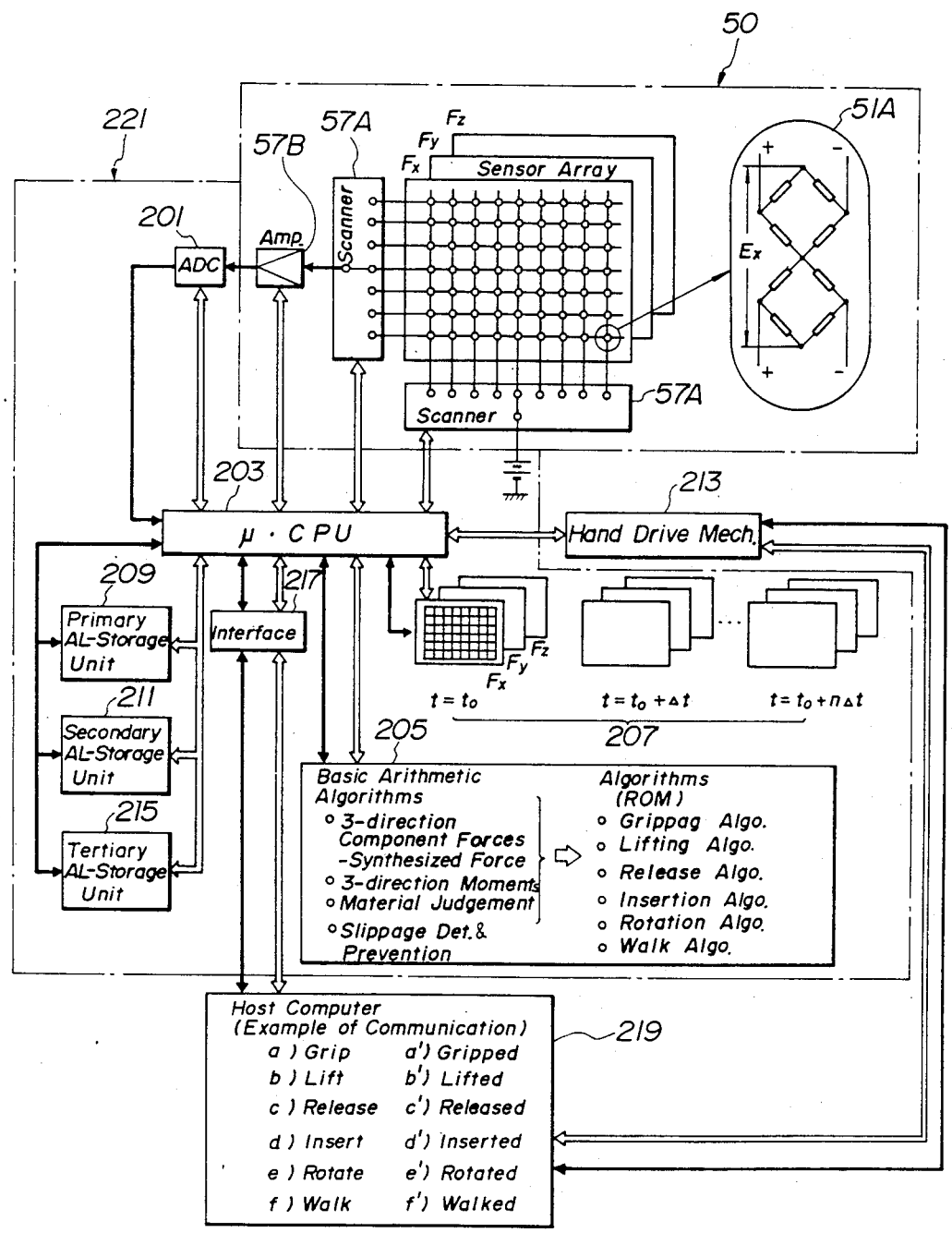
FIG. 84 is a block diagram showing an entire arrangement of one embodiment of the present invention.

FIG. 84 is a schematic illustration of an entire embodiment of the present invention. As shown, the scanner 57A sequentially reads for each raw and column, at a high speed, electrical signals Ex, Ey and Ez representing the three force components outputted from a bridge circuit 51A which are located at each cross point of a matrix in the pressure sensor array 50. In this circuit arrangement, an analog switch 88 (FIG. 79) is provided for each bridge circuit 51A of the pressure sensor module 51. The analog switch 88 is formed in each pressure sensor 53 or on the base plate 55, and is turned on or off by the row and column address signals (control voltages) of the scanner 57A. In addition, the power consumption is saved by controlling the power supply to the pressure sensor cell 53 so that the power is supplied to each of the column.

An amplifier 57B amplifies pressure signals read out by the scanner 57A. An A/D (analog-to-digital) converter 201 converts the amplified signals to digital signals, and the digital signals are then inputted into a microprocessor CPU ($\mu$-CPU) 203. According to a predetermined formula stored in an ROM (read-only-memory) 205, CPU compensate for temperature characteristics of each strain gauge 54, non-linearity of sensitivity, dispersion in the sensitivities of the cells 53 and interference among the force components in different directions. The signals are then converted into pressure units, the converted pressure data is arranged into pressure sensitive data form distributed in two dimensions for each force component and the data is then stored, in time sequence, in a signal processing storage device 207. The temperature compensation described above is worked out using the signals from the temperature sensor 87 (See FIG. 58), e.g., a thermistor, etc., placed in or close to the pressure sensor cell 53.

Next, $\mu$·CPU uses the basic operation algorithms pre-stored in the ROM 205 and the pressure sensing data read from the signal processing storage device 207 to compute a distribution of the force components in three directions (e.g., a pressure isometric line or a pressure distribution map), the three total pressures of the respective component forces in the respective three directions and a total resultant pressure (the sum of the pressures applied to all the cells 53 that is equivalent to a total acting force), the center of pressure (the center of force action where the sum of the moment of force at that point becomes zero), three-directional moments, a pressure receiving area (computed from the array pitch of the cells 53 and total of pressure sensing data which is not zero), and then stores the basic computed data, in time sequence, in a primary arithmetic operation and storage device 209.

The $\mu$·CPU then uses basic operation algorithm pre-stored in the ROM 205 and data stored in both the signal processing storage device 207 and the primary arithmetic operation (AL) and storage unit 209, to compute the senses of touch, slippage, hardness, form of a contacted object, etc., required to control robot hands and feet, and stores the necessary operation results into the secondary arithmetic operation and storage unit 211. Sense of touch is determined by a signal exceeding a predetermined threshold value. In sense of slippage, because pressure data has been stored in time sequence in the storage unit 207 and the primary arithmetic operation and storage unit 209, slip due to inadequate gripping force is computed by using a time variation in the distribution of force on the pressure surface. Then grip control operation algorithm (grip algorithms) stored in ROM 205 are used to perform soft handling having no occurrence of slip for a hand drive mechanism 213. Recognition of a form of a contacted object is acquired by using a time variation in the distribution of pressure and an algorithm for recognizing typical forms, through an appopriate operation. Then, by appropriate selection of material distribution in the pressure receiving plate 52, an elasticity of the object is computed to have material determination and sense of hardness of the contacted object.

Meanwhile, according to supervisory commands or autonomous commands outputted from the host computer 219 through interface 217, the $\mu$·CPU 203 uses data stored in the signal processing storage device 207, the primary arithmetic operation and storage unit 209, the secondary arithmetic operation and storage unit 211 as well as basic robot manipulatory algorithms (work operation algorithms) pre-stored in the ROM 205, to rapidly compute the basic operating control quantities (or control positions) of a smooth run of robot, grip, lift, release, insertion, rotation, etc. The computed results are sent through an interface 217 to the external robot control unit, i.e., the host computer 219, and required operation results to a tertiary arithmetic operation and storage unit 215. A host computer 219 smoothly drives a hand drive mechanism 213 based on the computed control quantities or control position data.

Based on the control commands from the host computer 219, supervisory and autonomous controls are performed in fast, quick response and high precision manner, and the robot performs advanced soft handling operations equivalent to the human hand such as gripping objects (e.g., fruit) with a minimum amount of force so the object retains its shape, lifting and releasing gripped objects without shock, inserting objects into mounting holes, rotating gripped objects, etc. Feedback signals representing held, lifted, released, inserted, turned are also outputted from the hand drive mechanism 213 to the host computer 219, but the command signals necessary for pressure recognition based on those feed-back signals are sent from the external host computer 219 through the interface 217 to the $\mu$·CPU 203. Since the $\mu$·CPU 203 performs various arithmetic/logic operations and manipulatory operations stated above remarkably decreases the load on external host computer 219, the control operations are performed at greater speed and smoothly. It should noted that memory units 207, 209, 211 and 215, used to control arithmetic/logic operations, may be either independently provided or overlapped and operated in common. It should also be noted that the scanner 57A and the amplifier 57B may normally be installed on or close to the sensor array 50, but the microcomputer 221 constructed with several LSI (large scale integrated circuit) chips, including the A/D converter 201, the $\mu$·CPU 203, the interface 217, etc., and should be installed close to the hand drive mechanism 213 or within the hand arm.

The following describes the contents of the main operation algorithms as stated above that are used in the unit of the present invention.

(1) Three-directional moments

Each moment Mx, My and Mz can be calculated by the equations below, using the total outputs X, Y and Z and X', Y' and Z' of the three force components on the pressure sensor arrays 50 and 50 mounted on both sides of an object 61, a distance lz between the two pressure sensor arrays, 50 and 50, the Y direction outputs Y and (Y) when the pressure sensor arrays 50 and 50 are set on the same surface and a distance lx between the arrays 50 and 50 on the same plane surface (see FIG. 85).

$$\left. \begin{array}{l} Mx = \text{(difference between } Y \text{ and } Y') \times lz \\ My = \text{(difference between } X \text{ and } X') \times lz \\ Mz = \text{(difference between } Y \text{ and } (Y)) \times lx \end{array} \right\} \quad (12)$$

These moments are dynamic values indispensable to the fitting at the object assembling and to the gripping of varying weight and to the turning actions which will be described later.

(2) Sense of slip

Because a force distribution in the sensor array 50 will vary with time $t_0$, $t_0 + \Delta t$ . . . , if slippage occurs due to inadequacy of gripping force, etc., as shown in FIG. 86. That slippage can be determined by operating the time variation. Consequently, slip prevention can be controlled at a high speed with no relation to the algorithms for soft-handled object gripping and lifting to be described later.

(3) Recognition of shape

Figure 87:
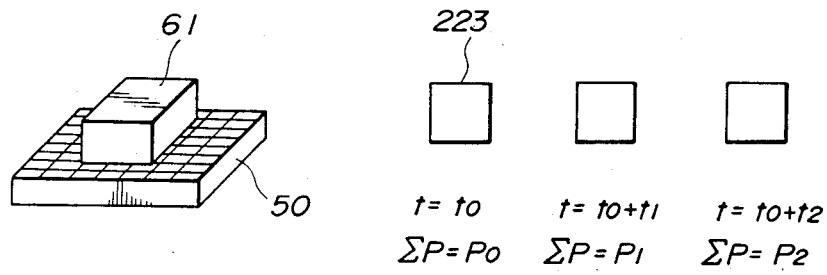
Figure 87:
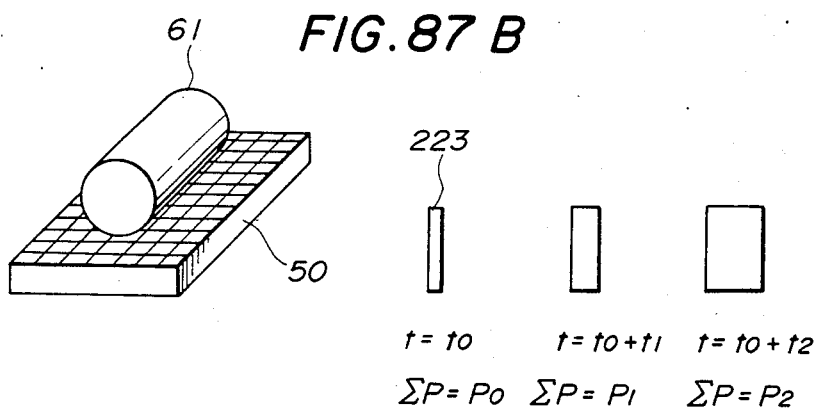
Figure 87:
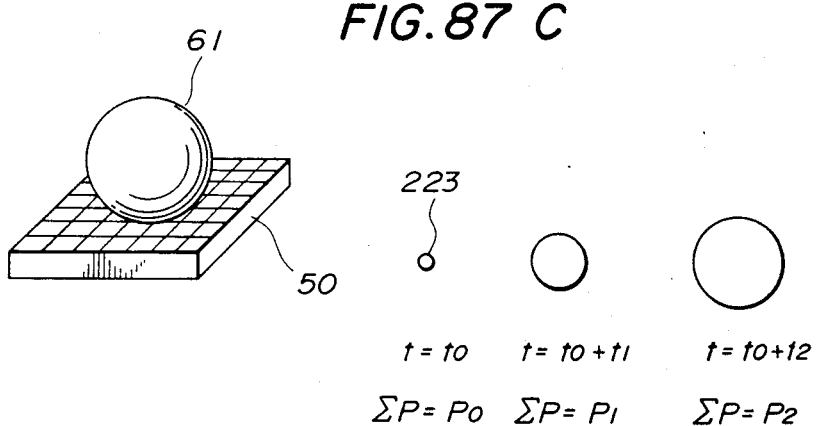

If an object 61 has a flat surface as in FIG. 87A, a pressure distribution 223 on the pressure surface does not vary with respect to increase ($P_0 \rightarrow P_2$) of gripping force $\Sigma P$. However, as shown in FIG. 87B, when the object 61 is cylindrical, the pressure distribution 223 on the pressure surface varies in only one direction, as gripping force $\Sigma P$ increases ($P_0 \rightarrow P_2$). As shown in FIG. 87C, when the object 61 is spherical, the pressure distribution 223 on the pressure surface changes in all directions as gripping force $\Sigma P$ increases ($P_0 \rightarrow P_2$). Consequently, the form of an object can be recognized by the differences of the time variations of the pressure distribution on the pressure surface. In the figures, initial time is expressed by $t_0$ and time is incremented by $t_1$ and $t_2$, successively.

(4) Determination of elasticity or material

Figure 89:
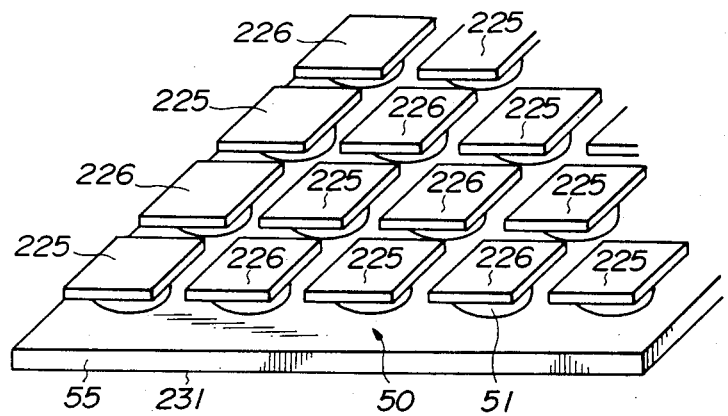
Figure 90:
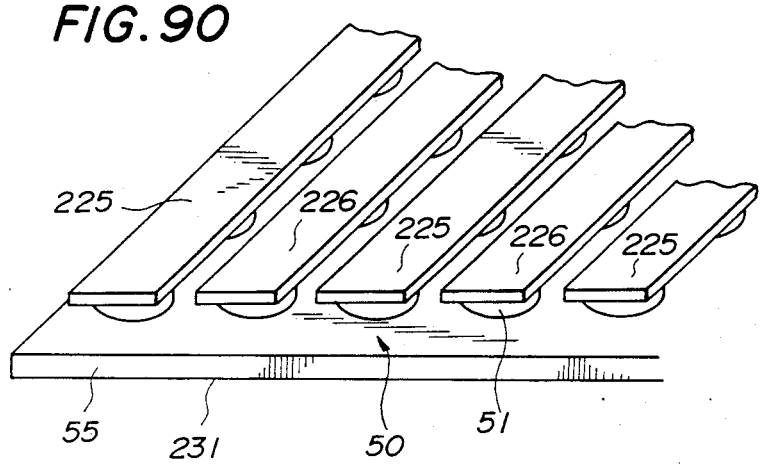

FIGS. 88 to 90 show that different elastic pads 225 and 226 (having compliances $C_1$ and $C_2$) are placed on the pressure receiving plate 52 of the pressure sensor array 50. When loads applied onto each sensor are $P_1$ and $P_2$, the compliance of the gripped object 61 is calculated by the following equation, $$C_0 = \frac{P_1 C_1 - P_2 C_2}{P_2 - P_1} \quad (13)$$

Here, the compliance is given by $$\text{Compliance} = \frac{1}{\text{spring constant}} = \frac{\text{flexure}}{\text{force}} \quad (14)$$

and the object selection and the soft handling are possible if the compliance $C_0$ is used for the object selection or the soft handling algorithm data.

By determining the elasticity of the gripped object and indirectly estimating material quality, soft handling can be controlled which controls the lowest gripping force without deformation of the held object or without damaging the object. The selection of objects cannot always be appropriate, but such data is available for the selection, as auxiliary data.

The determination of elasticity and material will be explained in detail referring to drawings.

Figure 91:
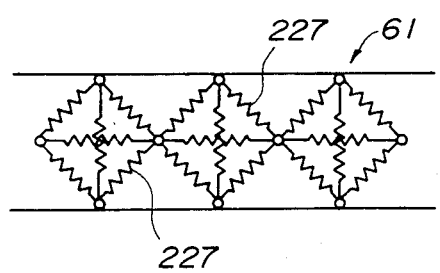
FIGS. 91, 92, 93, 94A and 94B are model diagrams used to explain the principles of those algorithms.
Figure 92:
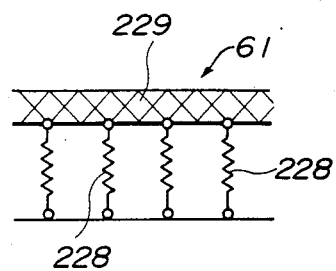
Figure 93:
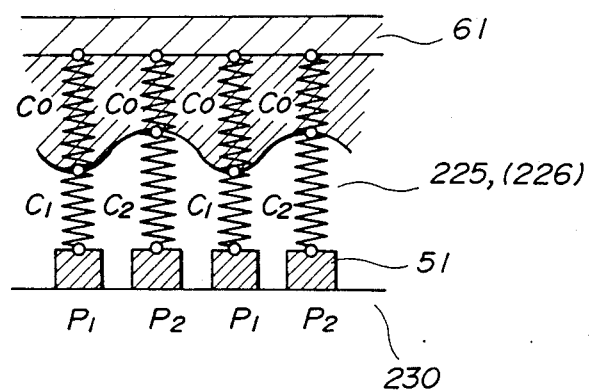
Figure 94:
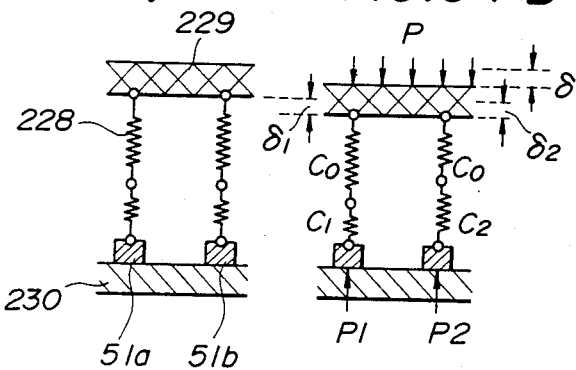

An aggregation of fine springs 227 in FIG. 91 can be considered as a model of elasticity of an object 61 as a measured object. FIG. 92 shows a more simplified model in which springs 228 represent object elasticity, and those springs can be considered as connected to a fixed object 229 located some distance from the surface FIG. 93 illustrates a model in which the pressure sensor modules 51, having the elastic pads 225 or 226 as the elastic bodies, are held in position by a supporting base 230 and connected in paralle to the object 61 illustrated in FIG. 92. FIG. 94 is a further simplification in which the model in FIG. 93 is represented by two pressure sensor modules 51a and 51b (FIG. 94A), and each module is in contact with force P (FIG. 94B). Taking total compliance (=1/spring constant) as $\Sigma c$ and contact pressure as P, total flexure $\delta$ is given by:

$$\delta = P \times \Sigma c$$

Also, $c_0$ is the compliance of the object 61, $c_1$ and $c_2$ are the compliances of the elastic pads 225 and 226 that are attached to the top surfaces of the sensor modules 51a and 51b. $c_8$ is the compliance of the sensor modules 51a and 51b. $P_1$ and $P_2$ are the forces applied, respectively, to the sensor modules 51a and 51b. Also, $\Sigma c_1$ and $\Sigma c_2$ are the total compliances which are the resultant compliance of the pressure contacted objects for the respective sensor modules 51a and 51b, and then $$\Sigma c_1 = c_0 + c_1 + c_8 \approx c_0 + c_1 \quad (15)$$

$$\Sigma c_2 = c_0 + c_2 + c_8 \approx c_0 + c_2 \quad (16)$$

As for the flexures $\delta$, flexures $\delta_1$ and $\delta_2$ corresponding to the modules 51a and 51b are, $$\delta_1 = P_1 \times \Sigma c_1 \quad (17)$$

$$\delta_2 = P_2 \times \Sigma c_2 \quad (18)$$

The compliances of the modules 51a and 51b are negligible because they are small, and $\delta = \delta_1 = \delta_2$ because the object 61 is in parallel pressure contact, so that equations (15) to (18) are rearranged by using $\delta = \delta_1 = \delta_2$. Therefore, the compliance $c_0$ of the object 61 is biven by $$c_0 = (P_1 c_1 - P_2 c_2)/(P_2 - P_1).$$

Since the compliances $c_1$ and $c_2$ can be known in advance, elasticity (compliance) $c_0$ of the object can be obtained by the signals $p_1$ and $p_2$ outputted from the modules 51a and 51b.

Consequently, based on this principle, the CPU 203 can use the following equation $$c_0 = (p_1 c_1 - p_1 c_2)/(p_2 - p_1)$$

to calculate the above stated compliance $c_0$ of the object from at least two pressure sensors placed at an interval on the same surface of the support base 230, elastic bodies having different compliances and located on each pressure sensor, a gripping means which contacts both the detected object surface and the support base in a manner that the detected surface of the object and the support base are held in parallel, the signals $p_l$ and $p_2$ outputted from a set of pressure sensors, and from compliances $c_l$ and $c_2$ of the elastic bodies corresponding to said sensors.

Configuration of this sort of elasticity measurement means is simple and moreover, and its range of application is extremely wide.

For example, if this means is used for the gripping means of an industrial robot and if the support base is the one gripping side surface of the hand having sensors placed on it, a robot hand can be provided having functions to determine not only the gripping force of the hand but a degree of elasticity in the gripped object. In this case, it is highly preferable that the hand for gripping the object, as the gripping means, is in pressure contact with the object in parallel to the elastic bodies, and that the elastic pads also act as shock absorbers for the gripping surface of the hand.

In FIG. 88, there is shown an embodiment in which a plurality of elastic pads 225 and 226 with different compliance are placed on a matrix array of the pressure sensor modules 51 formed on the hand gripping surface 231. The pads 225 and 226 are made of material having two different elasticities, corresponding to each pressure sensor module 51, are attached to the pressure receiving plate 52, respectively. The object 61 is made to contact these pads 225 and 226. In this example, there are two types of pad elasticity. By arranging elastic pads with the same elasticity (compliance) alternately in line, the configuration is such that the pads 225 and 226 having different elasticities are uniformly distributed on the gripping surface of the hand.

Figure 95:
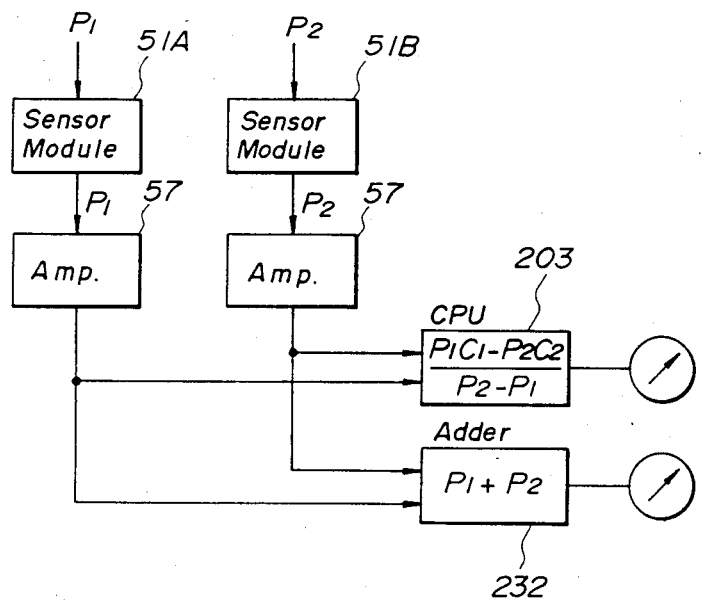
FIG. 95 is a block diagram showing an embodiment of an arithmetic/logic unit that executes the above algorithms.

When the object 61 is gripped by a robot hand thus arranged, the pressure sensor modules 51A and 51B corresponding to a set of the elastic pads 225 and 226 with different elasticities produce respectively signals $p_1$ and $p_2$ representing forces $P_1$ and $P_2$ received. As shown in FIG. 95, these signals $p_1$ and $p_2$ are applied, through the amplifier 57 to the CPU 203 as an operating unit. The CPU 203 computes an elasticity (compliance $c_0$) of the object, using pre-stored compliances $c_1$ and $c_2$ of the elastic pads 225 and 226 and the amplified signals $p_1$ and $p_2$, according to equation (15).

An adder 232 computes the sum of all the sensor outputs $\Sigma p = p_1 + p_2 + \ldots + p_n$ (n is the number of sensors) obtained through the amplifier 57, and also simultaneously obtain a gripping force of the robot hand on the object.

It should be understood that although two types of elastic pads are used here for the sake of clarity in the embodiment, this means is not limited to the two types. By increasing the types of elasticity and changing the combinations of the set of elasticities, plural pieces of data for object elasticity (compliance $c_0$) are obtained and a preferable value suitable to the object can be selected as the elasticity of the object or this value is averaged by the operational unit to have a mean value $\overline{c_0}$. This is desirable for expanding the measurement range of the object elasticity.

By changing the elastic pads without changing elasticity combinations of the above set of elastic pads, plural pieces of data on the object elasticity (compliance $c_0$) is obtained and the data is averaged by the operating unit to have a mean value $\overline{c_0}$ derived.

Additionally, it is important that elasticity means (pads) is pressed against an object under a condition that the supporting base (gripping surface of the hand in the above embodiment) having the pressure sensor arrays 50 arrayed thereon, is in parallel with the detected object surface. This establishes the above conditions of flexure $\delta = \delta_1 = \delta_2$. Even when this means is applied to a robot hand, and $\delta = \delta_1 = \delta_2$ is not satisfied if a relation between the forces $p_1$ and $p_2$ received by the respective sensors and object compliance $c_0$ has been derived in experiment, any problem will not be caused in practical use because flexure $\delta_1$ and $\delta_2$ are in direct proportion to pressure contact force P. Also, it is not necessary that the object elasticity required for the gripping object is a strictly determined value, but a relative value is fully adequate.

FIGS. 89 and 90 show yet another embodiment in which a plurality of elastic pads with differing compliances are alternately arranged on each pressure sensor module. The pressure sensor modules are arranged in matrix form on the gripping surface of a robot hand.

FIG. 89 shows a configuration in which the elastic pads 225 and 226 with equal compliances each other are arranged in diagonally. This configuration is used when the detected surface of the body in pressure contact with the elastic pads is of irregular form.

FIG. 90 shows a configuration in which the elastic pads 225 and 226 with equal compliances each other form a continuous strip. This configuration is used when the detected surface of the object in pressure contact to the elastic pads has a linear form, i.e., when the gripped object is tubular.

The configuration in either embodiment flexibly conforms to the size and shape of the object to be measured, because the plurality of elastic pads with different elasticities are distributed uniformly on the gripping surface of the hand.

(5) Gripping and lifting of an object

In FIG. 96A, a force Q to lift an object 61 can be obtained as the resultant force of the component forces Fx and Fy on each sensor array 50. After the object is lifted, Q=W. FIGS. 96B and 96C show that a gripping force R is expressed by Fz. That is, $Q \leq \mu R = \mu Fz$ ($\mu$ is friction coefficient) must be satisfied in order that there is no slippage between the object 61 and the hand 59. Assume now that, after the object 61 has been gripped by the hand 59, the raising of the hand is only $\Delta\delta$. When there is no slippage in the hand, Q increases at $$\Delta Q = \Delta\delta / C$$

Here, C is the total compliance of the floor surface and the object. In this case, the gripping force of the hand must be increased so that $$\Delta R \geq \Delta Q / \mu$$

for the increase in Q to execute soft handling. If slippage is detected as discussed in item (2), R increases and $\mu$ that does not produce slippage is newly defined (irrespective of this equation). By changeing $\mu$, R is increased (Q is known). When Q=W, the object 61 is separated from the floor surface 239 and gripped by the hand. There are no subsequent increases in Q and R for the increase of $\delta$.

Figure 97:
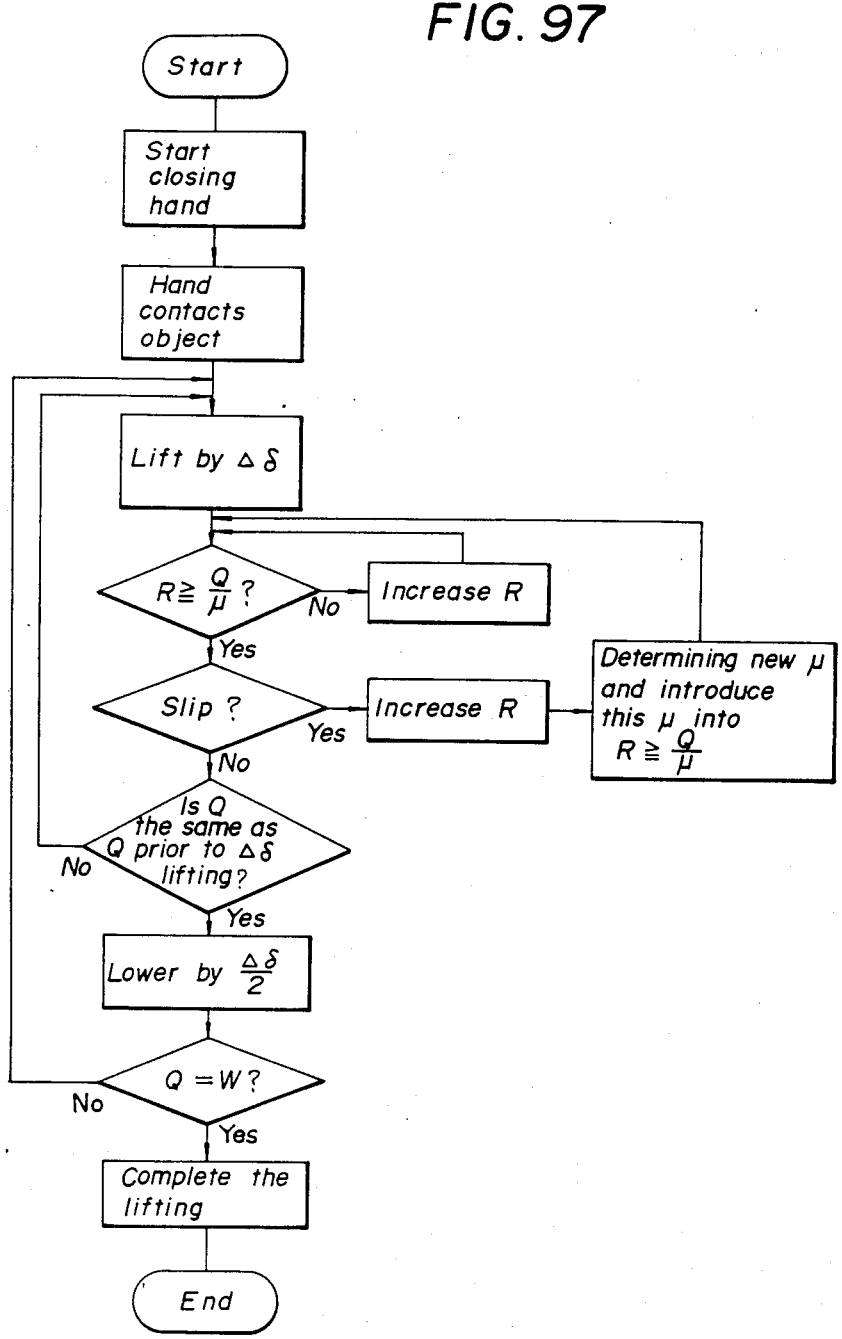
FIG. 97 is a flow chart showing one embodiment of steps executing the process shown in FIGS. 96A, 96B and 96C.

FIG. 97 is a flowchart showing these relationships.

Soft handling such as laying down and releasing an object can be performed by reversing the operation to allow the object to be released without shock. At this time, the approach of the object 61 is detected by a separate proximity sensor and soft handling is simplified by either reducing $\Delta\delta$ or increasing the compliance of the hand.

(6) Insertion

Operations such as inserting the object 61 into a hole 241, or fitting the object 61 into the hole 241 are basic operations in assembly work. FIG. 98A shows the basic pattern of these operations. FIGS. 98B and 98C show cases where insertion is imperfect and a moment M is produced against an insertion force P. After deciding the magnitude and the direction of the moment M, an operation is conducted in order to secure a normal insertion of the object as shown in FIG. 98A, viz. the object 61 is moved so that the moment is zero.

(7) Application as a forward-motion control sensor

Previous items have discussed the application of a sensor device according to the present invention in a robot hand. But, as shown in FIG. 99, this sensor can also be applied, as a pressure sensor, to the forward-motion control of a robot foot.

(a) Detecting the movement of the center of gravity in the body during forward-motion and raising the foot at the optimum moment.

Movement of center of gravity

Time sequence operations at the position of the center of gravity from a distribution of a pressure on the surface of the foot.

Lifting and dropping of the foot

Figure 96:
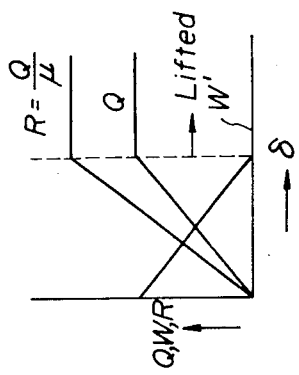
Figure 96:
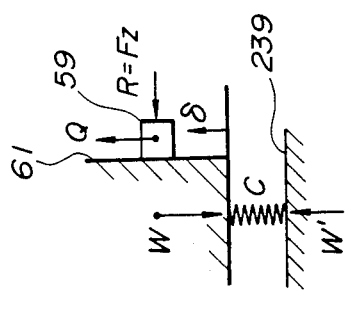
Figure 96:
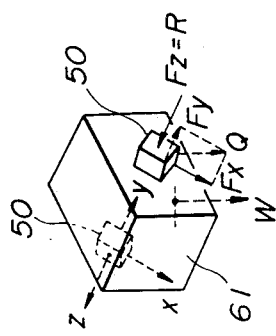

Operation basically similar to the lifting of objects shown in FIGS. 96 and 97.

(b) Kicking of the foot for forward movement.

Detecting the surface pressure on the foot and sense of slippage, kicking force (force of forward movement) matched to that detection is added.

In the diagram, Fz is the surface pressure and Fx is the kicking force.

As described above, according to the present invention, a pressure sensor array capable of detecting a two-dimensional distribution of three-directional force components is provided. After signal processing of signals sequentialy derived from the sensors, the processed signals are stored as data. The data read out is converted into various types of foundamental quantities on the pressure, according to a predetermined algorithm. The converted data is stored. Using the stored data, it is converted into various basic control signals necessary for the control of an object to be controlled, e.g. a robot. These basic signals are sent to an external control device of a robot or the like. This arrangement highly precisely recognizes senses that are equivalent to the senses of touch, pressure, slippage, hardness etc., in the human being. Based on this recognition, the hands of an intelligent robot, automatic assembly manipulators or the feet of a mobile robot, etc., can be safely, securely and smoothly controlled. Particularly, advanced, high precision operations, such as soft handling, can easily be controlled.

A pressure sensor array according to the present invention is an array of a number of pressure sensor modules capable of detecting three-directional force components by forming sex conductor strain gauges on a single crystal silicon wafer. This allows the modules as one unit load meter to be extremely small in size. These modules may be integrated at a high density in fabrication. In measuring a distributed load, it can be considered that a substantially uniform load is applied to each unit module. Therefore, it is not necessary to consider the moment, unlike the conventional unit load meter. Therefore, the rectangular type module can be used to substantially eliminate the interference among the force components. As a result, the three force components of a distributed load are measured to provide an accurate pressure recognition control.

What is claimed is:

1. A pressure sense recognition control system for controlling the driving of an object, said system comprising:
    pressure detection means mounted on the object for detecting the distribution, in a plane, of the components of a force in three selected directions of a rectangular coordinate system, said detection means including a plurality of pressure sensor modules, each said module having at least one pressure sensor cell having a pressure sensing member made of single crystal silicon, said pressure sensing member having a pressure receiving surface lying in the plane for receiving the force, and a plurality of diffusion type strain gauges provided on at least one surface of said pressure sensing member which is substantially perpendicular to said pressure receiving surface for detecting the three force components in the three directions applied to said pressure receiving surface, said strain gauges being electrically connected to constitute at least one bridge circuit for producing detection signals indicative of the amplitude of the three force components;
    signal processing and storing means for deriving the detection signals from said pressure detection means sequentially, for converting said detection signals into pressure sense detection data, and for storing the converted pressure sense detection data corresponding to each said pressure receiving surface for each of said component forces in the three directions;
    primary arithmetic operation and storage means for processing said pressure detection data derived from said signal processing and storing meansin accordance with a predetermined basic arithmetic/logic operation algorithm to obtain basic pressure data and for storing said basic pressure data;
    secondary arithmetic operation and storage means for processing said basic pressure data read out from said primary arithmetic operation and storage means and said pressure sense detection data read from said signal processing and storing means in accordance with a predetermined pressure recognition algorithm to obtain pressure sense recognition data and for storing said pressure recognition data;
    tertiary arithmetic operation and storage means responsive to command data from an external control means for controlling the drive of said object for processing said pressure sense detection data read out from said signal processing and storing means, said basic pressure data read out from said primary arithmetic operation and storage means and said pressure sense recognition data read out from said secondary arithmetic operation and storage means in accordance with a predetermined control algorithm to obtain control data required to control the drive of the object and for outputting said control data to the external control means; and
    data communication means for communicating data between said tertiary arithmetic operation and storage means and the external control means.

2. A pressure sense recognition control system as claimed in claim 1, wherein the object is a hand or foot of a robot or a manipulator of an automatic assembler, said basic data is representative of the total pressures of the force components in the respective three directions, the total resultant pressure of the force components in the three directions, the center of pressure, the pressure distribution and the pressure receiving area with respect to the plane, and moments of the force components about the three axes of the coordinate system, said pressure sense recognition data relates to the sense of touch, the sense of slippage, the sense of hardness, form recognition and material substance recognition, and said control data relates to gripping, lifting, insertion, rotation, releasing, and walking.

3. A pressure sense recognition control system as claimed in claim 1 wherein, said primary arithmetic operation and storage means computes the total resultant pressure, the center of pressure, the pressure distribution, the pressure receiving area and the moments in the three direction from said pressure sense detection data stored in said processing and storing means and the computed results are time sequentially stored.

4. A pressure sense recognition control system as claimed in claim 1 wherein said pressure sensor modules are physically arranged as an array in the form of a matrix of modules, which matrix has rows and columns, and said signal processing and storing means sequentially derives, in every column and in every row of said matrix, electrical signals corresponding to the size of said three component forces from said pressure detection means, converts said derived signals into digital signals, compensates said digital signals for temperature and sensitivity characteristics of said bridge circuits, corrects said digital signals for interference from component forces in other directions, and converts said compensated and corrected signals are converted into said pressure sense detection data which is stored time sequentially.

5. A pressure sense recognition control system as claimed in claim 1 wherein said pressure sensor modules are physically arranged as an array in the form of a matrix or modules, which matrix has rows and columns, and said pressure detection means further comprise a base plate supporting said modules, and said pressure sensor modules detect a force applied to said pressure receiving surface in the form of three component forces in the three directions consisting of a component force Fz in the direction perpendicular to said pressure receiving surface and two component forces Fx and Fy perpendicular to each other in and parallel to said pressure receiving surface.

6. A pressure sense recognition control system as claimed in claim 5 wherein each said pressure sensor module consists of at least one pressure sensor cell which has a pressure sensitive structure formed of a single crystal semiconductor having a surface layer of one conductivity type on which a plurality of strain gauge regions of the other conductivity type is formed, and said strain gauges form said bridge circuits which correspond to said three component forces Fx, Fy and Fz and which produce output voltages when a pressure is applied to each of said pressure sensor modules in a manner that the output voltages produced by said bridge circuits detect the distribution in the plane of each of said three component forces of the applied force.

7. A pressure sense recognition control system as claimed in claim 6 wherein said pressure sensor array has a differential amplifier which differentially amplifies the respective outputs from said bridge circuit and a switching device which switches the output from said differential amplifier, both incorporated in said pressure sensor module, the output conductors of said switching device are led to the output scanner arranged outside said pressure sensor array in common to the output conductors of the switching devices corresponding to the respective ones of a plurality of sensor modules in a given column, and the control conductors of said switching device are led to the control scanner arranged outside said pressure sensor array in common to the control conductors of the switching devices corresponding to the respective ones of a plurality of pressure sensor modules in a given same row.

8. A pressure sense recognition control system as claimed in claim 7 wherein said differential amplifier and said switching device are formed on a first base plate separated from a second base plate for mounting said pressure sensor cells and said first base plate is incorporated via a buffer in a portion of said pressure sensor cells.

9. A pressure sense recognition control system as claimed in claim 5 wherein said matrix of modules has a plurality of diffusion type strain gauge groups that are formed along the longitudinal direction of a surface of rectangular single crystal silicon which is perpendicular to the pressure receiving surface, a plurality of cell holes and at least one cell-separation hole are opened in said rectangular single crystal silicon alternately, corresponding to said strain gauge groups, said plurality of cells are separated by cut grooves communicating with said cell separation hole to form a plurality of idependent modules, so that a force applied to said pressure receiving surface is divided into the three force components which are detected as changes in output voltages by said bridge circuit, and said cells formed by said rectangular single crystal silicon are arranged in array form on said base plate in manner that said pressure receiving surface is disposed upward.

10. A pressure sense recognition control system as claimed in claim 5, wherein said pressure sensor array forms a pressure sensor unit in which a plurality of said pressure sensor modules are arranged in single or plural rows on said base plate, and terminals which are attached to said base plate and connected to said bridges are mechanically connected to terminals on a motherboard, so that a required number of the pressure sensor units are ottained.

11. A pressure sense recognition control system as claimed in claim 5 wherein said base plate has a plurality of grooves running in parallel with each other in the direction of the columns; said pressure sensor cells are engaged in said grooves on said base plate so that a predetermined number of cells are distributed in each groove and aligned in the direction of the rows, and are connected by conductors to said base plate; and said pressure detection means further comprise a pressure receiving plate of said pressure sensor modules formed by dividing a base pressure plate provided in common to said plurality of pressure sensor cells which are fixed to said base plate into each of said pressure sensor modules.

12. A pressure sense recognition control system as claimed in claim 1 wherein each of said pressure sensor modules consists of at least two pressure sensor cells.

13. A pressure sensor recognition control system as claimed in claim 12 wherein said pressure sensor modules are so configured that two of said pressure sensor cells are arranged between a pressure receiving plate and a base plate which are parallel to each other, and the sides of said pressure sensor cells are disposed parallel to each other and fixed to said base plate and said pressure receiving plate in a manner that said surfaces of said pressure sensor cells are substantially perpendicular to said base plate and said pressure receiving plate.

14. A pressure sense recognition control system as claimed in claim 1 wherein a plurality of said pressure sensor cells are fixed to and disposed between a pressure receiving plate and a base plate which are in parallel to each other in a manner that the sides of said pressure sensor cells are substantially perpendicular to said base plate and said pressure receiving plate, so that component forces of a load applied to said pressure receiving plate is divided for measurement, at least two of said pressure sensor cells are so arranged that the surfaces of said at least two pressure sensor cells are substantially perpendicular to each other, and only an output signal in response to a component force in the direction parallel to said surface of said pressure sensor cell is obtained from said pressure sensor cell.

15. A pressure sense recognition control system as claimed in claim 14 wherein four pressure sensor cells are arranged to form a box.

16. A pressure sense recognition control system as claimed in claim 14 wherein two pressure sensor cells are arranged to form a T shape.

17. A pressure sense recognition control system as claimed in claim 14 wherein three pressure sensor cells are arranged to form an I shape.

18. A pressure sense recognition control system as claimed in claim 1 wherein each of said pressure sensor modules has two pressure sensor cells and said pressure sensing member of each pressure sensor cell has one half of the strain gauge region forming a bridge for detecting three component forces.

19. A pressure sense recognition control system as claimed in claim 1 wherein said pressure sensor module has two pressure sensor cells, the pressure sensing member one of said pressure sensor cells has s strain gauge region for detecting two of said three components of a force applied to the upper surface of a pressure receiving plate provided on the pressure receiving surfaces of said two pressure sensor cells, and the pressure sensing member of the other pressure sensor cell has a strain gauge region for detecting the remaining one component force.

20. A pressure sense recognition control system as claimed in claim 1 wherein, in said pressure sensor cell, said strain gauges for detecting two of the three component forces are formed on said surface on one side substantially perpendicular to said pressure receiving surface and said strain gauges for detecting the remaining one component forces are formed on said surface on the other side substantially perpendicular to said pressure receiving surface.

21. A pressure sense recognition control system as claimed in claim 1 wherein said surface which is substantially perpendicular to said pressure receiving surface and on which said diffusion type strain gauges of said pressure sensor cells are formed is lattice plane {111}.

22. A pressure sense recognition control system as claimed in claim 21 wherein type silicon is used for said single crystal silicon and P-type diffusion layer is used for said diffusion type strain gauges.

23. A pressure sense recognition control system as claimed in claim 21 wherein said pressure sensor cell has a ring like form.

24. A pressure sense recognition control system as claimed in claim 1 wherein a temperature sensor region is formed in said pressure sensor cell.

25. A pressure sense recognition control system as claimed in claim 24 wherein said temperature sensor is a diffusion resistance.

26. A pressure sense recognition control system as claimed in claim 24 wherein said temperature sensor is formed by diode.

27. A pressure sense recognition control system as claimed in claim 24 wherein said temperature sensor is formed by transistor.

28. A pressure sense recognition control system as claimed in claim 24 wherein said temperature sensor region is formed in a region which experiences a low level of strain when a force is applied to said pressure receiving surface of said pressure sensor cell.

29. A pressure sense recognition control system as claimed in claim 1 wherein said pressure sensor cells are provided on a base plate made of a material having a thermal expansion coefficient substantially equal to or similar to that of the material of said pressure sensor cells.

30. A pressure sense recognition control system as claimed in claim 1 wherein said pressure sensor cells are provided on a base plate made of single crystal semiconductor in which conductors and a control circuit for processing signals outputted from resistance elements of a bridge formed by said strain gauges are integrated.

31. A pressure sense recognition control system as claimed in claim 1 wherein said pressure sensor cell has output terminals on the surface of said pressure sensor cells for deriving output signals from said strain gauges, a base plate for supporting said pressure sensor cells has input terminals for receiving output signals from pressure sensor cells, and said output terminals and said input terminals are connected to each other through conductors provided on a flexible film.

32. A pressure sense recognition control system as claimed in claim 31 wherein at least one terminal group of said output terminals of said pressure sensor cells and the terminals of said conductors on said flexible film are formed as raised conductors and are engaged with and connected to the other terminal group.

33. A pressure sense recognition control system for controlling the driving of an object, said system comprising:
pressure detection means mounted on the object for detecting the distribution, in a plane, of the components of a force in three selected directions of a rectangular coordinate system, said detection means including a plurality of pressure sensor modules, each said module having at least one pressure sensor cell having a pressure sensing member made of single crystal silicon, said pressure sensing member having a pressure receiving surface for receiving the force, and a plurality of diffusion type strain gauges provided on at least one surface of said pressure sensing member which is substantially perpendicular to said pressure receiving surface for detecting the three force components in the three directions applied to said pressure receiving surface, said strain gauges being electrically connected to constitute at least one bridge circuit for producing detection signals indicative of the amplitide of the three force components;
temperature detector means for detecting the temperature of said modules and producing temperature-representative analog signals; and
signal processing and storing means for deriving the detection signals from said pressure detector means sequentially, for converting said detection signals into pressure sense detection data, and for storing the converted pressure sense detection data corresponding to said pressure receiving surface for each of said component forces in the three directions; wherein:
each said bridge circuit and said temperature detector means is associated with a respective characteristic address composed of a first address part and a second address part; and
said signal processing and storing means comprise:
a plurality of connecting lines each associated with a respective second address part;
first analog switches associated with the first address parts and each connected between a respective bridge circuit or said temperature detector means and a respective connecting line for selectively connecting each said bridge circuit and said temperature detector means to a respective connecting line;

second analog switches associated with the second address parts and connected to the connecting lines;

an address generator for sequentially generating successive ones of the first and second parts of the characteristic addresses:

a first switch driver connected between said first analog switches and said address generator for actuating each first analog switch in response to generation of its assoiated first address part;

a second switch driver connected between said second analog switches and said address generator for actuating each second analog switch in response to generation of its associated second address part;

analog/digital converter means connected to said second analog switches for converting into digital signals the analog signals produces by each bridge circuit or said temperature detector means when said first analog switch associated therewith is actuated and said second analog switch whose associated connecting line is connected to an actuated first analog switch is also actuated; and microprocessor means connected to said digital-/analog converter means for inserting the digital signals from said converter means into predetermined arithmetic operation equations, performing computations according to the equations, and compensating the digital signals derived from the analog signals produced by said bridge circuits on the basis of the digital signals derived from the temperature-representative analog signals.

34. A pressure sense recognition control system as claimed in claim 33, wherein said bridge circuits are arranged at crossing points of a wiring matrix consisting of control lines for driving said first analog switches and said connecting lines which cross said control lines.

35. A pressure sense recognition control system as claimed in claim 33, wherein said address generator, said first switch driver, said second switch driver and said analog/digital converter means are included in said microprocessor means.

36. A pressure sense recognition control system as claimed in claim 33, wherein said first and second analog switches are formed in said pressure sensor cells and are connected to input/output conductors.

37. A pressure sense recognition control system for controlling the driving of an object, said system comprising:

pressure detection means mounted on the object for detecting the distribution, in a plane, of the components of a force in three selected directions of a rectangular coordinate system, said detection means including a plurality of pressure sensor modules, each said module having at least one pressure sensor cell having a pressure sensing member made of single crystal silicon, said pressure sensing member having a pressure receiving surface for receiving the force, and a plurality of diffusion type strain gauges provided on at least one surface of said pressure sensing member which is substantially perpendicular to said pressure receiving surface for detecting the three force components in the three directions applied to said pressure receiving surface, said strain gauges being electrically connected to constitute at least one bridge circuit for producing detection signals indicative of the amplitude of the three force components;

a plurality of temperature detectors each associated with a respective cell for detecting the temperature of said cell and producing temperature-representative analog signals; and signal processing and storing means for deriving the detection signals from said pressure detector means sequentially, for converting said detection signals into pressure sense detection data, and for storing the converted pressure sense detection data corresponding to said pressure receiving surface for each of said component forces in the three directions; wherein:

each said bridge circuit and each said temperature detector is associated with a respective characteristic address composed of a first address part and a second address part, and each said bridge circuit includes two first connecting lines; and said signal processing and storing means comprise:

a plurality of second connecting lines each associated with a respective second address part, with one first connecting line of each said bridge circuit being connected to a respective second connecting line;

first analog switches each associated with a respective first address part and each connected between a respective temperature detector and a respective second connecting line for selectively connecting each said temperature detector to a respective second connecting line;

a plurality of switching diodes each having an anode connected to the other first connecting line of a respective bridge circuit and a cathode connected to a respective second connecting line;

with those of said second connecting lines which are connected to those of said one first connecting line, said diode and said first analog switch which are associated with the same cell having the same second address part;

second analog switches associated with the second address parts and connected to the second connecting lines;

an address generator for sequentially generating successive ones of the first and second parts of the characteristic addressess:

a first switch driver connected between said first analog switches and said address generator for actuating each first analog switch in response to generation of its associated first address part;

a second switch driver connected between said second analog switches and said address generator for actuating each second analog switch in response to generation of its associated second address part;

analog/digital converter means connnected to said second analog switches for converting the analog signals produced by each respective bridge circuit and said temperature detector into digital signals when the first analog switch associated with said temperature detector is actuated and said second analog switches connected to the actuated first analog switch and to said diode and one first connecting line of the same cell are actuated; and microprocessor means connected to said digital-/analog converter means for inserting the digital signals from said converter means into predetermined arithmetic operation equations, performing computations according to the equations, and compensating the digital signals derived from the analog signals produced by said bridge circuits on the basis of the digital signals derived from the temperature-representative analog signals.

38. A pressure sense recognition control system as claimed in claim 37, wherein said signal processing and storing means further comprises power switches for switching operating power to said bridge circuits and said temperature detector having the same first addresses part, and said first switch driver actuates said first analog switches having the same first address part and the associated power switch.

* * * * *